United States Patent

Abileah et al.

[11] Patent Number: 5,907,378
[45] Date of Patent: May 25, 1999

[54] NORMALLY WHITE TWISTED NEMATIC LIQUID CRYSTAL DISPLAY INCLUDING RETARDATION FILMS FOR IMPROVING VIEWING CHARACTERISTICS

[75] Inventors: Adiel Abileah, Farmington Hills; Gang Xu, Northville; John Z. Z. Zhong, Novi, all of Mich.

[73] Assignee: OIS Optical Imaging Systems, Inc., Northville, Mich.

[21] Appl. No.: 09/003,799

[22] Filed: Jan. 6, 1998

Related U.S. Application Data

[63] Continuation-in-part of application No. 08/711,797, Sep. 10, 1996, Pat. No. 5,706,068, which is a continuation of application No. 08/167,652, Dec. 15, 1993, Pat. No. 5,570,214.

[51] Int. Cl.⁶ .................................................. G02F 1/1337
[52] U.S. Cl. ........................ 349/123; 349/120; 349/124
[58] Field of Search ................................ 349/123, 117, 349/118, 129, 120

[56] References Cited

U.S. PATENT DOCUMENTS

| | | | |
|---|---|---|---|
| 3,900,248 | 8/1975 | Nagasaki | 349/81 |
| 4,385,806 | 5/1983 | Fergason | 349/96 |
| 4,436,379 | 3/1984 | Funada et al. | 349/75 |
| 4,632,514 | 12/1986 | Ogawa et al. | 349/160 |
| 4,652,088 | 3/1987 | Kando et al. | 349/101 |
| 4,674,841 | 6/1987 | Buzak | 349/98 |
| 4,686,519 | 8/1987 | Yoshida et al. | 349/95 |
| 4,693,562 | 9/1987 | Hasegawa et al. | 349/180 |
| 4,701,028 | 10/1987 | Clerc et al. | 349/98 |
| 4,844,569 | 7/1989 | Wada et al. | 349/117 |
| 4,852,976 | 8/1989 | Suzuki | 349/119 |
| 4,889,412 | 12/1989 | Clerc et al. | 349/118 |
| 4,909,606 | 3/1990 | Wada et al. | 349/117 |
| 4,957,349 | 9/1990 | Clerc et al. | 349/117 |
| 4,973,137 | 11/1990 | Kozaki | 349/181 |
| 4,984,873 | 1/1991 | Takiguchi et al. | 349/101 |
| 4,984,874 | 1/1991 | Yamamoto et al. | 349/119 |
| 4,991,941 | 2/1991 | Kalmanash | 349/33 |
| 4,995,704 | 2/1991 | Yamamoto et al. | 349/119 |
| 5,018,839 | 5/1991 | Yamamoto et al. | 349/121 |
| 5,032,008 | 7/1991 | Yamamoto et al. | 349/119 |
| 5,071,997 | 12/1991 | Harris | 528/353 |
| 5,107,356 | 4/1992 | Castleberry | 349/119 |
| 5,124,824 | 6/1992 | Kozaki et al. | 349/76 |
| 5,132,826 | 7/1992 | Johnson et al. | 349/80 |
| 5,136,405 | 8/1992 | Wada et al. | 349/76 |
| 5,138,474 | 8/1992 | Arakawa | 349/120 |
| 5,150,235 | 9/1992 | Haim et al. | 349/107 |
| 5,150,237 | 9/1992 | Iimura et al. | 349/118 |

(List continued on next page.)

FOREIGN PATENT DOCUMENTS

| | | |
|---|---|---|
| 0 349 900 | 1/1990 | European Pat. Off. . |
| 0 576 931 | 1/1994 | European Pat. Off. . |
| 0 667 553 | 8/1995 | European Pat. Off. . |
| 0 679 921 | 11/1995 | European Pat. Off. . |
| 0 774 682 | 5/1997 | European Pat. Off. . |
| 5545037 | 3/1980 | Japan . |
| 313916 | 1/1991 | Japan . |
| 2 171 549 | 8/1986 | United Kingdom . |

OTHER PUBLICATIONS

"The Symmetry Property of a 90 Degree Twisted Nematic Liquid Crystal Cell" By Lien, Jun. 8, 1990.
"Wide Viewing Angle LCD Using Retardation Films" By Yamagishi, Japan Display, 1989.
Patent Abstracts of Japan, 07253573, Mar. 10, 1995.
WO96/15473, Pub. Date May 23, 1996, PCT.

Primary Examiner—William L. Sikes
Assistant Examiner—Dung Nguyen
Attorney, Agent, or Firm—Joseph A. Rhoa

[57] ABSTRACT

A liquid crystal display in which a negatively birefringent layer is used as both an orientation film and as a retarder in the display. An improved method of making such a display is also disclosed. In preferred embodiments, each of the orientation layers has a retardation value of from about −80 to −200 nm.

15 Claims, 48 Drawing Sheets

U.S. PATENT DOCUMENTS

| | | | |
|---|---|---|---|
| 5,157,529 | 10/1992 | Koopman et al. | 349/117 |
| 5,179,457 | 1/1993 | Hirataka et al. | 349/119 |
| 5,184,236 | 2/1993 | Miyashita et al. | 349/99 |
| 5,189,538 | 2/1993 | Arakawa | 349/118 |
| 5,194,975 | 3/1993 | Akatsuka et al. | 349/119 |
| 5,196,953 | 3/1993 | Yeh et al. | 349/119 |
| 5,227,903 | 7/1993 | Miyazawa et al. | 349/119 |
| 5,229,039 | 7/1993 | Ikeda et al. | 349/106 |
| 5,231,521 | 7/1993 | Johnson et al. | 349/18 |
| 5,237,438 | 8/1993 | Miyashita et al. | 349/119 |
| 5,241,408 | 8/1993 | Ishikawa et al. | 349/76 |
| 5,250,214 | 10/1993 | Kanemoto et al. | 349/76 |
| 5,344,916 | 9/1994 | Harris et al. | 349/120 |
| 5,369,513 | 11/1994 | Akatsuka et al. | 349/118 |
| 5,440,413 | 8/1995 | Kikuchi et al. | 349/118 |
| 5,480,964 | 1/1996 | Harris et al. | 528/353 |
| 5,550,662 | 8/1996 | Bos | 349/117 |
| 5,570,214 | 10/1996 | Abileah et al. | 349/117 |
| 5,583,678 | 12/1996 | Ito et al. | 349/118 |
| 5,594,568 | 1/1997 | Abileah et al. | 349/120 |
| 5,657,140 | 8/1997 | Xu et al. | 349/118 |
| 5,706,068 | 1/1998 | Abileah et al. | 349/120 |
| 5,750,641 | 5/1998 | Ezzell et al. | 528/353 |

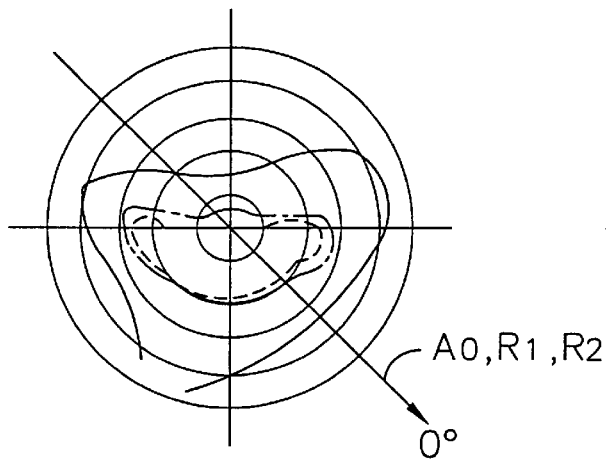
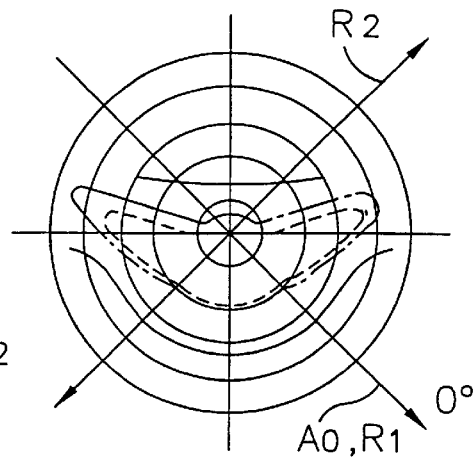
Fig. 5A (Prior Art)   Fig. 5B (Prior Art)
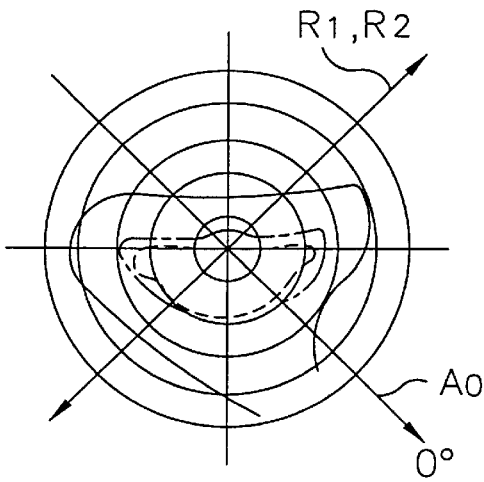
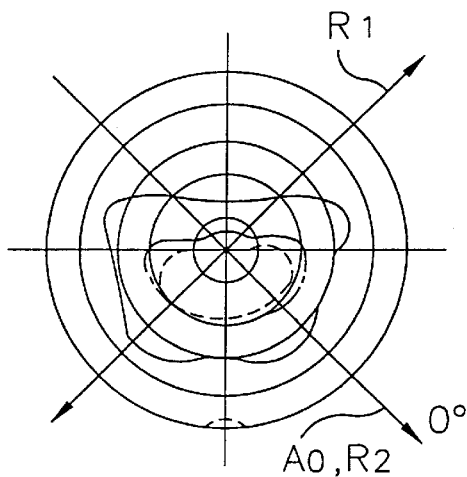
Fig. 5C (Prior Art)   Fig. 5D (Prior Art)
--------- 100:1
— — — — 50:1
———— 10:1

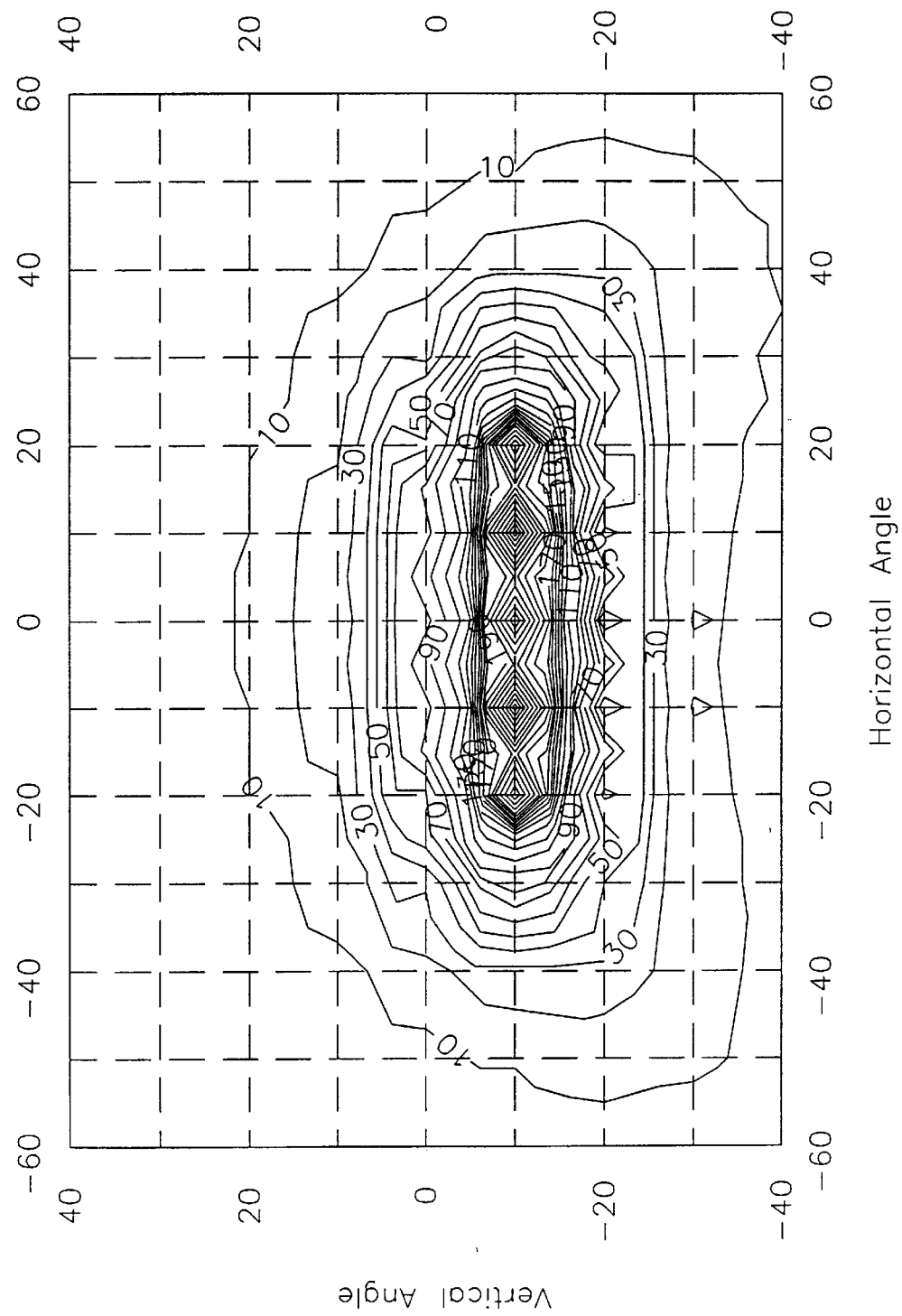

normally incident light

NORMALLY WHITE TWISTED NEMATIC LIQUID CRYSTAL DISPLAY INCLUDING RETARDATION FILMS FOR IMPROVING VIEWING CHARACTERISTICS

This application is a continuation-in-part (CIP) of U.S. Ser. No. 08/711,797, filed Sep. 10, 1996 (now U.S. Pat. No. 5,706,068), which is a continuation of U.S. Ser. No. 08/167,652, filed Dec. 15, 1993 (now U.S. Pat. No. 5,570,214), the disclosures of which are hereby incorporated herein by reference.

This invention relates to a liquid crystal display having at least two retardation films, one on each side of a liquid crystal layer. More particularly, this invention relates to a normally white liquid crystal display which includes at least one retardation film having a retardation value of 80–200 nm on each side of the liquid crystal layer.

RELATED PATENTS

This application is related to commonly owned U.S. Pat. Nos. 5,706,068; 5,570,214; 5,694,187; 5,657,140; 5,576,861; and 5,594,568, the disclosures of which are hereby incorporated herein by reference.

BACKGROUND OF THE INVENTION

Liquid crystal materials are useful for electronic displays because light traveling through a layer of liquid crystal (LC) material is affected by the anisotropic or birefringent value ($\Delta N$) of the material, which in turn can be controlled by the application of a voltage across the liquid crystal material. Liquid crystal displays are desirable because the transmission or reflection of light from an external source, including ambient light and backlighting schemes, can be controlled with much less power than was required for the illuminance materials used in other previous displays. Liquid crystal displays (LCDs) are now commonly used in such applications as digital watches, calculators, portable computers, avionic cockpit displays, and many other types of electronic devices which utilize the liquid crystal display advantages of long-life and operation with low voltage and power consumption.

The information in many liquid crystal displays is presented in the form of a matrix array of rows and columns of numerals or characters, which are generated by a number of segmented electrodes arranged in such a matrix pattern. The segments are connected by individual leads to driving electronics, which apply a voltage to the appropriate combination of segments to thereby display the desired data and information by controlling the light transmitted through the liquid crystal material. Graphic information in, for example, avionic cockpit applications or television displays may be achieved by a matrix of pixels which are connected by an X-Y sequential addressing scheme between two sets of perpendicular conductor lines (i.e. row and column lines). More advanced addressing schemes use arrays of thin film transistors, diodes, MIMS, etc. which act as switches to control the drive voltage at the individual pixels. These schemes are applied predominantly to twisted nematic liquid crystal displays, but are also finding use in high performance versions of super twisted liquid crystal displays.

Contrast is one of the most important attributes determining the quality of both normally white (NW) and normally (NB) liquid crystal displays. Contrast, or the contrast ratio, is the difference between OFF state transmission versus ON state transmission. In normally black liquid crystal displays, the primary factor limiting the contrast achievable in these LCDs is the amount of light which leaks through the display in the darkened or OFF state. In normally white (NW) LCDs, the primary factor limiting the contrast is the amount of light which leaks through the display in the darkened or ON state. These problems are compounded in a bright environment, such as sunlight, where there is a considerable amount of reflected and scattered ambient light. In color liquid crystal displays, light leakage causes severe color shifts for both saturated and gray scale colors. These limitations are particularly important for avionic applications, where the copilot's viewing of the pilot's displays is important.

In addition, the legibility of the image generated by both normally black (NB) and normally white (NW) liquid crystal display devices depends on the viewing angle, especially in the matrix address device with a large number of scanning electrodes. Absent a retardation film, the contrast ratio of a typical NB or NW liquid crystal display is usually at a maximum only within a narrow viewing (or observing) angle centered about normal incidence (0° horizontal viewing angle and 0° vertical viewing angle) and drops off as the angle of view is increased.

It would be a significant improvement in the art to provide a liquid crystal display capable of presenting a high quality, high contrast image over a wide field of view.

Normally black liquid crystal displays are quite sensitive to cell gap, or the thickness "d" of the liquid crystal material, as well as to the temperature of the liquid crystal material. Therefore, normally black liquid crystal displays must be manufactured in accordance with rather specific tolerance parameters related to the cell gap of the display making them both difficult and expensive to make. One way in which to compensate for the normally black displays high sensitivity to cell gap is to provide such a multi-colored display with a multi-gap design wherein the thickness "d" of the liquid crystal material for each colored subpixel is matched to the first transmission minimum of the color of that subpixel. See, for example, U.S. Pat. No. 4,632,514 which utilizes the multi-gap approach by varying the liquid crystal material thickness "d" for the red, green, and blue subpixels therein so as to match the thickness "d" of each subpixel to the three different transmission minimums representative of the colors red, green, and blue. This increases, of course, the difficulty and expense of manufacturing this type of LCD.

Although a normally black display is rather sensitive to temperature and cell gap "d", a significant advantage associated with this type of liquid crystal display is that it provides good contrast ratios at wide viewing angles. Thus, a viewer may satisfactorily observe the data of the display throughout a wide range of viewing angles. Contrast ratio curves of, for example, 10:1 in normally black displays often extend up to viewing angles of, for example, 0° vertical, ±60° horizontal. The fact that normally black displays have such good contrast ratios at such large horizontal viewing angles enables them to be used in commercial applications where such viewing angles are required or preferred. Furthermore, NB displays generall experience more darkened state leakage than do NW displays.

Turning now to normally white liquid crystal displays, NW displays are fairly insensitive to the temperature and cell gap "d" of liquid crystal material. This allows for the manufacturing tolerances associated with the development of normally white displays to be lessened. Hence, normally white displays are easier and cheaper to manufacture then their normally black counterparts. However, while normally white LCDs are less sensitive to temperature and cell gap than normally black LCDs, their contrast ratios at large viewing angles are generally small relative to those of normally black displays. For example, 10:1 contrast ratio curves in normally white displays often only extend up to horizontal viewing angles of about 0° vertical, ±35° horizontal. This is significantly less than the extent to which the same contrast ratio curves extend horizontally in normally black displays. Therefore, while normally white LCDs are easier and cheaper to manufacturer than normally black liquid crystal displays, they have a smaller range of satisfactory viewing angles than do normally black displays. It would satisfy a long felt need in the art if one could provide a NW display which had good contrast ratios at large viewing angles.

Several types of liquid crystal pixels or cells are in widespread use in flat panel displays. Active matrix addressing allows such displays to present a full color image with high resolution. When viewed directly at a normal or ON axis viewing angle (0° vertical, 0° horizontal viewing angle), a liquid crystal display of either the normally black or normally white type provides a generally high quality output, especially when the cell gap "d" is matched to the first transmission minimum, but the image degrades and contrast ratios decrease at increased viewing angles. This occurs because liquid crystal cells operate by virtue of the anisotropic or birefringent effect exhibited by their liquid crystal layer which includes a large number of anisotropic liquid crystal molecules. Such a material will be positively uniaxially birefringent (i.e., the extraordinary refractive index is larger than the ordinary refractive index). The phase retardation effect such a liquid crystal material has on light passing through it inherently varies or increases with the inclination angle of light, leading to lower contrast ratios and a lower quality image at larger viewing angles. By introducing an optical compensating element (or retarder) into the liquid crystal pixel or cell, however, it is possible to correct for the unwanted angular effects and thereby maintain higher contrast at both normal and larger viewing angles than otherwise possible.

The type and orientation of optical compensation or retardation required depends in part upon the type of display, normally black or normally white, which is used.

In a normally black (NB) twisted nematic display, the twisted nematic liquid crystal material is placed between polarizers whose transmission axes are parallel to one another. In the unenergized OFF state (no voltage above the threshold voltage $V_{th}$ is applied across the liquid crystal material), normally incident light from the backlight is first polarized by the rear polarizer and in passing through the pixel or cell has its polarization direction rotated by the twist angle of the liquid crystal material dictated by the buffing zones. This effect is known as the twisting effect. The twist angle is set, for example, to be about 90° so that the light is blocked or absorbed by the front or output polarizer when the pixel is in the OFF state. When a voltage is applied via electrodes across the normally black pixel, the liquid crystal molecules are forced to more nearly align with the electric field, eliminating the twisted nematic optical effect of the LC material. In this orientation, the optical molecular axes of the liquid crystal layer molecules are perpendicular to the cell walls. The liquid crystal layer then appears isotropic to normally incident light, eliminating the twist effect such that the light polarization state is unchanged by propagation through the liquid crystal layer so that light can pass through the output polarizer. Patterns can be written in a normally black display by selectively applying a variable voltage to the portions of the display which are to appear illuminated.

Turning again to normally white (NW) LCD cells, in a normally white liquid crystal display configuration, a twisted nematic cell preferably having a twist angle of about 80°–100° (most preferably about 90°) is placed between polarizers which have substantially crossed or perpendicular transmission axes, such that the transmission axis of each polarizer is either parallel (P-buffed) or perpendicular (X-buffed) to the buffing direction or orientation of the liquid crystal molecules in the interface region of the liquid crystal material adjacent each polarizer. In other words, normally white cells can be either P-buffed where both polarizer axes are substantially parallel to their respective adjacent buffing zones, or X-buffed where both polarizer axes are substantially perpendicular to their respective adjacent buffing zones.

This NW orientation of the polarizers reverses the sense of light and dark from that of the normally black displays discussed above. The OFF or unenergized (no applied voltage above $V_{th}$ across the liquid crystal, material) areas appear light in a normally white display, while those which are energized appear dark.

The problem of ostensibly dark areas appearing light or colored when viewed at large angles still occurs, however, thereby creating the aforesaid lowered contrast ratios at reasonably large viewing angles. The reason for the reduced contrast ratios at large viewing angles in normally white displays is different than the reason for the problem in normally black displays. In the normally white energized darkened areas, the liquid crystal molecules tend to align with the applied electric field. If this alignment were perfect, all of the liquid crystal molecules in the cell would have their long axes normal to the glass substrate or cell wall. In the energized state, the normal white display appears isotropic to normally incident light, which is blocked by the crossed polarizers, thus, resulting in a darkened pixel or subpixel.

The loss of contrast with increased viewing angles in normally white pixels or displays occurs primarily because the homeotropic liquid crystal layer does not appear isotropic to OFF axis or OFF normal light. Light directed at OFF normal angles through the liquid crystal material propagates in two modes due to the anisotropy or birefringence ($\Delta N$) of the liquid crystal layer, with a phase delay between these modes which increases with the incident angle of light. This phase dependence on the incident angle introduces an ellipticity to the polarization state which is then incompletely extinguished by the front or exit polarizer in the normally white cell, giving rise to light leakage. Because of the normally white symmetry the birefringence has no azimuthal dependence.

Accordingly, what is needed in normally white displays is an optical compensating or retarding element which introduces a phase delay that restores the original polarization state of the light, allowing the light to be blocked by the output polarizer in the ON state. Optical compensating elements or retarders for normally white displays are known in the art and are disclosed, for example, in U.S. Pat. Nos. 5,184,236; 5,196,953; 5,138,474; and 5,071,997, the disclosures of which are hereby incorporated herein by reference. It is known that the polyimides and copolyimides disclosed by aforesaid U.S. Pat. No. 5,071,997 can be used as negative birefringent retarding elements in normally white liquid crystal displays and are said to be custom tailorable to the desired negative birefringent values without the use of stretching. The polyimide retardation films of U.S. Pat. No. 5,071,997 are uniaxial but with an optical axis oriented in the Z direction which is perpendicular to the plane defined by the film.

Quite often, the retardation films or plates used in conjunction with normally white displays have a negative birefringent value. However, in certain cases, retardation films having a positive birefringent value are used in combination with such normally white cells. An example of this is U.S. Pat. No. 5,184,236 which will be discussed more fully below.

FIG. 1 is a contrast ratio curve graph for a prior art normally white light valve pixel. The light valve for which the contrast ratio curves are illustrated in FIG. 1 includes a rear polarizer having a transmission axis defining a first direction, a front or exit polarizer having a transmission axis defining a second direction wherein the first and second directions are substantially perpendicular to one another, a liquid crystal material having a cell gap "d" of 5.86 $\mu$m, a rear buffing zone oriented in the second direction, and a front buffing zone orientated in the first direction. The temperature was 34.4° C. when the graph illustrated by FIG. 1 was plotted. This light valve pixel did not include a retarder. The above-listed parameters with respect to FIG. 1 are also applicable to FIGS. 2 and 3.

The contrast ratio graph of FIG. 1 was plotted utilizing a 6.8 V driving voltage $V_{ON}$, and a 0.2 volt $V_{OFF}$. As can be seen in FIG. 1, the 10:1 contrast ratio curve extends along the 0° vertical viewing axis only to angles of about −40° horizontal and +38° horizontal. Likewise, the 30:1 contrast ratio curve extends along the 0° vertical viewing axis only to horizontal angles of about ±30°. This graph is illustrative of the problems associated with normally white liquid crystal displays in that their contrast ratios at large horizontal and vertical viewing angles are fairly low.

FIG. 2 is a contrast ratio curve graph for the normally white light valve described above with respect to FIG. 1. However, the FIG. 2 graph was plotted utilizing a $V_{ON}$ of 5.0 volts and a $V_{OFF}$ of 0.2 volts. Again, the temperature was 34.4° C. As can be seen by comparing the graphs of FIG. 1 and FIG. 2, as the voltage applied to the liquid crystal material decreases, as in FIG. 2, the contrast ratio curves expand horizontally and contract vertically. The 10:1 contrast ratio curve of FIG. 2 along the 0° vertical viewing axis extends a total of about 85° as opposed to only 78° in FIG. 1. Also, the 30:1 contrast ratio curve of FIG. 2 along the O vertical viewing axis extends horizontally about 67° as opposed to only about 58° in FIG. 1. With respect to vertical viewing angles, the contrast ratio curves of 10:1 and 30:1 in FIG. 2 do not extend along the 0° horizontal viewing axis to the negative vertical extent that they did in FIG. 1. Accordingly, while the normally white light valve of FIGS. 1–3 has less than desirable contrast ratios at large viewing angles, the contrast ratios expand horizontally and contract vertically as the voltage across the liquid crystal material decreases.

FIG. 3 is a driving voltage versus intensity plot for the light valve pixel described above with respect to FIGS. 1–2 illustrating the gray level characteristics of the pixel. The various curves represent horizontal viewing angles from −60° to +60° along the 0° vertical viewing axis.

Gray level performance of a liquid crystal display is very important. Conventional liquid crystal displays utilize anywhere from about eight to sixty-four different driving voltages. The different driving voltages are referred to as "gray level" voltages. The intensity of the light transmitted through the pixel or display depends upon the driving voltage. Accordingly, gray level voltages are used to generate different shades of different colors and to create different colors when these shades are mixed with one another. Preferably, the higher the driving voltage in a NW display, the lower the intensity of light transmitted therethrough. Likewise then, the lower the driving voltage, the higher the intensity of light emitted from the preferred forms of a normally white display. The opposite is true in a normally black display. Thus, by utilizing multiple gray level driving voltages, one can manipulate either an NW or NB liquid crystal display pixel to emit a desired intensity of light. A gray level $V_{ON}$ is any voltage greater than $V_{th}$ up to about 5.0–6.5 V.

Gray level intensity performance for LCDs is dependent upon the displays' driving voltage. It is desirable in gray level performance of NW displays to have an intensity versus driving voltage curve wherein the intensity of the light emitted from the pixel continually and monotonically decreases as the driving voltage increases. In other words, it is desirable to have gray level performance in a pixel such that the intensity at 6.0 volts is less than that at 5.0 volts, which is in turn less than that at 4.0 volts, which is less than that at 3.0 volts, which is in turn less than that at 2.0 volts, etc. Such good gray level curves across wide ranges of viewing angles allow the intensity of radiation emitted from the pixel to be easily controlled.

Turning again now to FIG. 3, the intensity versus driving voltage curves illustrated therein with respect to the prior art light valve pixel of FIGS. 1–2 having no retardation film are undesirable because of the inversion hump present in the area of the curves having voltages greater than about 3.2 volts. The term "inversion hump" means that the intensity aspect of the curve monotonically decreases as the driving voltage increases in the range of about 1.6–3.0 volts, but at a driving voltage of about 3.2 volts, the intensities at a plurality of viewing angles begin to rise as the voltage increases from about 3.2 volts to 6.8 volts. This rise in intensity as the voltage increases is known as an "inversion hump." The inversion hump of FIG. 3 includes only a rise portion. However, such inversion humps often include both a rise and fall portion. The presence of this inversion hump with respect to a plurality of horizontal viewing angles as shown in FIG. 3 means that as gray level voltages between, for example, 1.6 and 3.0 volts increase, the intensity of radiation emitted from the pixel decreases accordingly. However, as gray level voltages above 3.0 volts increase from 3.2 volts all the way up to 6.8 volts, the intensity of radiation emitted from the pixel increases. This,is undesirable. A perfect driving voltage versus intensity curve would have a decreased intensity for each increase in gray level driving voltage. In contrast to this, the inversion hump represents an increase in intensity of radiation emitted from the light valve pixel for each increase in gray level driving voltage above about 3.2 volts for certain viewing angles. Accordingly, it would satisfy a long felt need in the art if a liquid crystal display and pixels therein could be provided with no or little inversion. In other words, the smaller the rise in intensity for an increase in driving voltage at all gray levels, the better.

FIG. 4 is a schematic illustration showing an optical arrangement of a normally white liquid crystal display device disclosed in U.S. Pat. No. 5,184,236. As illustrated, the LCD includes a rear polarizer 111, a rear retardation plate or film 113, a liquid crystal cell 119 including a liquid crystal material sandwiched between a rear orientation or buffing zone oriented in direction $A_0$ and a front orientation or buffing zone oriented in direction $A_1$, a front retardation film 114, and finally a front polarizer 112.

The rear polarizer ill is provided at the light incident side of the liquid crystal layer 119, a front or exit polarizer 112 is provided at the light exit side of the liquid crystal layer 119, a rear retardation film 113 is provided between the liquid crystal layer and the polarizer 111, and a front retardation film 114 is provided between the liquid crystal layer and the front polarizer 112. This prior art NW display is "P-buffed" because the rear polarizer transmission axis $P_1$ is parallel to the rear orientation direction $A_0$, and the front polarizer transmission axis $P_2$ is parallel to the front orientation direction $A_1$.

The product of parameters "$\Delta N \cdot d$" of the liquid crystal layer 119 is set in the range of 450–550 nm. The liquid crystal material of U.S. Pat. No. 5,184,236 is left handed as defined in the art. The aligning direction of the rear orientation film on the light incident side of the liquid crystal layer 109 is a rubbing direction $A_0$ inclined at approximately 45° with respect to the side of the liquid crystal cell. The aligning direction of the orientation or buffing film on is the front side of the liquid crystal layer is oriented in direction $A_1$ which is rotated about 90° in a counterclockwise direction from the orientation direction $A_0$ of the orientation film on the rear side of the liquid crystal material. Therefore, the liquid crystal layer 119 sandwiched between the opposing orientation films is twisted substantially 90°. The pretilting angle of the liquid crystal molecules is approximately 1°.

The rear linear polarizer 111 has a transmission axis $P_1$ which is parallel to the orientation direction $A_0$, while the front polarizer 112 has a transmission axis direction $P_2$ which is parallel to the front orientation direction $A_1$. The transmission axes of the front and rear polarizers 112 and 111 are perpendicular to one another thereby defining a normally white liquid crystal display. The rear retardation plate or film 113 is so arranged that its optical axis $R_1$ is either parallel to or crosses at 90° to the rear rubbing direction $A_0$. The front retardation film 114 is so arranged that its optical axis $R_2$ is either parallel to or crosses at 90° to the rubbing direction $A_1$. These retardation films 113 and 114 are formed to have equal retardation values ($d \cdot \Delta N$) where "d" is the thickness of the retardation film and "$\Delta N$" is the anisotropic or birefringent value of the retardation film. The retardation values of the retardation films 113 and 114 are set in the range of 300–400 nm. The front and rear retardation films are formed of the same material such as, for example, a polycarbonate or polyvinyl alcohol, and the outer surfaces thereof are preferably covered with a protective film made of triacetyl cellulose or the like.

The orientation or buffing directions of prior art FIG. 4 are "six o'clock buffed." The term "six o'clock buffed" means that the rear and front orientation directions $A_0$ and $A_1$ are oriented in directions so as to provide a viewing zone having an extended region in the six o'clock area of the graphs shown in FIGS. 5A–5D. In other words, because the orientation direction $A_0$ goes from the upper left to the lower right as shown in FIG. 4, and orientation direction $A_1$ goes from lower left to upper right, the resulting viewing zone has better contrast as shown in FIGS. 5A–5D in the negative vertical region below the 0° vertical viewing axis. This is what is meant by the phrase "six o'clock buffed."

Alternatively, if the orientation direction $A_0$ went from the lower right to the upper left, and the orientation direction $A_1$ was directed from the upper right to the lower left, then the display of FIG. 4 would have been "twelve o'clock buffed" and would have provided a viewing zone having better contrast ratios in the positive vertical viewing angles instead of the negative vertical viewing angles. The six o'clock buffed LCDs of FIGS. 4 and 5A–5D illustrate viewing zones with better contrast ratios in the negative vertical area below the 0° vertical viewing axis as opposed to the positive vertical viewing area above the 0° vertical viewing axis.

In the prior art liquid crystal display of FIG. 4, the contrast ratios are measured in FIGS. 5A–5D for the four possible cases of retardation film orientation, when the value of $d \cdot \Delta N$ of a liquid crystal layer 119 is set to 510 nm and the retardation value of both retardation films 113 and 114 is set to 350 nm (the value measured by the light having a wavelength of 589 nm). The four cases are as follows.

FIG. 5A shows contrast ratio curves for the case where the optical axes of the rear and front retardation films 113 and 114 are disposed together in parallel to the rear rubbing direction $A_0$. The solid or outer contrast ratio curve in FIGS. 5A–5D represents a contrast ratio of 10:1. The inner or equally broken contrast curve in FIGS. 5A–5D represents a contrast ratio of 100:1. The intermediate contrast ratio curve in FIGS. 5A–5D represents a contrast ratio of 50:1. Furthermore, in the graphs of FIGS. 5A–5D, each circle represents a 10° shift in viewing angle. In other words, the center of the graph represents a 0° vertical and 0° horizontal viewing angle, the first circle represents 10°, the second circle 20°, etc. As can be seen in FIG. 5A, the 10:1 contrast ratio curve extends horizontally along the vertical 0° viewing axis to about −37° and +40°, and extends upwardly along the 0° horizontal viewing axis to about 15° vertical.

FIG. 5B shows contrast ratio curves for the case where the optical axis $R_1$ of the rear retardation film 113 is disposed in parallel to the orientation direction $A_0$, and the optical axis $R_2$ of the front retardation film 114 is disposed perpendicular to the rubbing direction, $A_0$. The direction $R_1$ is parallel to the rear polarizer axis $P_1$, and $R_2$ is parallel to the front polarizer axis $P_2$. As can be seen in FIG. 5B, the 10:1 contrast ratio curve extends along the 0° horizontal viewing axis only to about 15° vertical. Also, the 50:1 contrast ratio curve extends along the 0° horizontal viewing axis only to about 5° vertical.

FIG. 5C shows contrast ratio curves for the case where the optical axes of the rear and front retardation films 113 and 114 are arranged in parallel with one another and cross at 90° to the rear buffing direction $A_0$. In FIG. 5C, the 10:1 contrast ratio curve extends upward along the 0° horizontal viewing axis only to about 15° vertical. Also, the 10:1 contrast ratio curve extends along the 0° vertical viewing axis a total of about 75°–80°.

FIG. 5D shows contrast ratio curves for the case where the optical axis $R_1$ of the rear retardation film 113 is arranged to cross at 90° to the rubbing direction $A_0$, and the optical axis $R_2$ of the front retardation film 114 is arranged in parallel to rear orientation direction $A_0$. In FIG. 5D, the 10:1 contrast ratio curve extends horizontally along the 0° vertical viewing axis a total of about 60°–65°. Also, the 10:1 contrast ratio curve in FIG. 5D extends upward along the 0° horizontal viewing axis only to about +15° vertical.

It was known prior to our invention to rotate retardation films to adjust the viewing zones of LCDs. For example, U.S. Pat. No. 5,184,236 teaches rotating the optical axes of retardation films ±15° or less when two such films are disposed on a single side of the liquid crystal material. The axes of the retardation films are rotated either in the clockwise or counterclockwise direction for the purpose of adjusting the viewing zone. However, when the retardation films of this patent are rotated, the symmetry of the viewing zone is substantially distorted thereby creating viewing zones which are not substantially symmetrical about the 0° horizontal viewing axis. Furthermore, this patent does not teach rotating one or both optical axes of rear and front retardation films ±15° or less for the purpose of adjusting the location of the display's viewing zone when the display includes rear and front retardation films with a liquid crystal layer therebetween.

FIG. 6 illustrates the angular relationships between the horizontal and vertical viewing axes and angles described herein relative to a liquid crystal display and conventional LCD angles $\phi$ and $\Theta$. The +X, +Y, and +Z axes shown in FIG. 6 are also defined in other figures herein. Furthermore, the "horizontal viewing angles" (or $X_{ANG}$) and "vertical viewing angles" (or $Y_{ANG}$) illustrated and described herein may be transformed to conventional LCD angles $\phi$ and $\Theta$ by the following equations:

$$TAN (X_{ANG}) = COS (\phi) \cdot TAN (\Theta)$$

$$SIN (Y_{ANG}) = SIN (\Theta) \cdot SIN (\phi)$$

or $$COS (\Theta) = COS (Y_{ANG}) \cdot COS (X_{ANG})$$

$$TAN (\phi) = TAN (Y_{ANG}) \div SIN (X_{ANG})$$

FIGS. 7–10 are computer simulation contrast ratio curve graphs of a normally white liquid crystal display having a cell gap "d" of 5.70 $\mu$m. The display includes a rear polarizer having a transmission axes defining a first direction, a rear retardation film having an optical axis parallel to the first direction, a rear buffing zone oriented perpendicular to the first direction, a front buffing zone parallel to the first direction, a front retardation film having an optical axis perpendicular to the first direction, and a front or exit polarizer having a transmission axis perpendicular to the first direction. The retardation films are of the positively birefringent uniaxial type. This LCD of FIGS. 7–10 is not prior art to this invention but is included in this section for the purpose of later comparison with certain embodiments of this invention.

FIG. 7 is a computer simulation contrast ratio graph of the aforesaid normally white liquid crystal display wherein the wavelength of light utilized was red at 630 nm, $V_{ON}$ was 6.8 volts, and $V_{OFF}$ was 0.9 volts. The retardation value of both the front and rear retardation films of the display simulated in FIGS. 7–10 was 320 nm. As can be seen in FIG. 7, the 10:1 contrast ratio curve extends along the 0° vertical viewing angle from horizontal angles of about −40° to +40° thereby defining along the 0° vertical viewing axis a 10:1 total viewing zone of about 80°.

FIG. 8 is a computer simulation graph of the aforesaid display also simulated by FIG. 7. The, difference between the graph of FIG. 8 and the graph of FIG. 7 is that a 5.0 $V_{ON}$ was used as a parameter in FIG. 8. As can be seen, a reduction in $V_{ON}$ results in a shifting upward of the viewing zone to a position centered substantially above the 0° vertical viewing axis. Also, a reduction in $V_{ON}$ results in a vertical shrinking of the viewing zone.

FIG. 9 is a computer simulation graph illustrating the contrast ratios of the aforesaid display wherein the retardation value of the front and rear retardation films is 320 nm, and the parameter $V_{ON}$ is 6.8 volts. The difference between the graph of FIG. 7 and the graph of FIG. 9 is that a green wavelength of 550 nm was used in FIG. 9. The reason for the higher contrast for the green wavelength as opposed to the red wavelength of FIG. 7 is that the cell gap of 5.70 $\mu$m is more nearly matched to the first transmission minimum for the green wavelength than that of the red wavelength. Accordingly, the green wavelength experiences higher contrast ratios in the center of its viewing zone. Again, the 10:1 contrast ratio curve in FIG. 9 extends horizontally along the 0° vertical viewing axis a total of about 75°.

FIG. 10 is a computer simulation graph of the aforesaid display wherein a blue wavelength of 480 nm was used. As in the graphs of FIGS. 7–9, the retardation value for the rear and front retardation films or plates was 320 nm. The 10:1 blue contrast ratio curve shown in FIG. 10 extends horizontally along the 0° vertical viewing axis a total of about 75°. The blue contrast ratio viewing zone is shifted slightly upward from that shown in FIG. 7 with respect to the red wavelength.

As can be seen from the contrast ratio curves of FIGS. 1, 2, and 7–10, it would be highly desirable if one could provide a normally white liquid crystal display with a viewing zone including contrast ratio curves which extended to large horizontal and vertical viewing angles.

U.S. Pat. No. 4,984,874 discloses a liquid crystal display device having front and rear retardation films having retardation values of about 300 nm. A liquid crystal layer including front and rear buffing zones is sandwiched between the retardation films. The rear retardation film functions so as to convert linearly polarized light into elliptically polarized light while is the front retardation film converts elliptically polarized light exiting the liquid crystal material into linear polarized light before it reaches the front or exit polarizer. The twist angle of the liquid crystal material of U.S. Pat. No. 4,984,874 is about 180°–270°.

U.S. Pat. No. 5,107,356 discloses a normally black liquid crystal display including first and second polarizers having parallel transmission axes. A liquid crystal material of this patent is sandwiched between front and rear retardation films.

While it is known to dispose rear and front 300–600 nm retardation films or plates on opposite sides of a liquid crystal layer of a P-buffed display, the prior art does not disclose providing a normally white X-buffed liquid crystal display or pixel with rear and front retardation films having 80–200 nm retardation values in order to achieve a high contrast ratio over a predetermined range of viewing angles. The prior art also does not disclose symmetrically rotating the optical axes of such rear and front retardation films so as to shift the centered position of the display's viewing zone to a point below the 0° vertical viewing axis, and, thus, away from inversion areas present above the 0° vertical viewing axis.

The terms "clockwise" and "counterclockwise" as used herein mean as viewed from the viewer's or observer's side of the liquid crystal display or pixel.

The term "rear" when used herein but only as it is used to describe substrates, polarizers, electrodes, buffing zones, retardation films, and orientation films means that the described element is on the incident light side of the liquid crystal material, or in other words, on the side of the liquid crystal material opposite the viewer.

Each of the displays and light valves described herein is/was "X-buffed" unless otherwise shown or described.

The term "front" when used herein but only as it is used to describe substrates, polarizers, electrodes, buffing zones, retardation films, and orientation films means that the described element is located on the viewer side of the liquid crystal material.

The LCDs and light valves of FIGS. 1–3 and 7–45 herein include left handed liquid crystal material with a birefringence ($\Delta N$) of 0.084 at room temperature.

The term "retardation value" as used herein means "d·$\Delta N$" of the retardation film or plate, wherein "d" is the film thickness and "$\Delta N$" is the film birefringence (either positive or negative).

The term "interior" when used herein to describe a surface or side of an element, means the side or surface closest to the liquid crystal material.

The term "light valve" as used herein means a liquid crystal display pixel including a rear polarizer, a rear retardation film (unless otherwise specified), a rear transparent substrate, a rear continuous electrode, a rear orientation film, a LC layer, a front orientation film, a front continuous pixel electrode, a front substrate, a front retardation film (unless otherwise specified), and a front polarizer in that order, without the presence of color filters and driving active matrix circuitry such as TFTs.

The term "contrast ratio" as used herein means the transmission of light through the display or pixel, in the OFF or white state versus the amount of transmission through the display or pixel in the ON or darkened state.

It is apparent from the above that there exists a need in the art for a normally white liquid crystal display wherein the viewing zone of the display includes high contrast ratios at extended or large vertical and horizontal viewing angles. There also exists a need in the art to center the viewing zone of a NW LCD at a position distant from inversion areas present at or above the 0° vertical viewing axis.

SUMMARY OF THE INVENTION

Generally speaking this invention fulfills the above-described needs in the art by providing a liquid crystal display comprising:

a plurality of pixels, each of these pixels being comprised of a pair of driving electrodes and a twisted nematic liquid crystal material located therebetween, the liquid crystal material being of a thickness "d" and having an anisotropy $\Delta N$ such that the product of d·$\Delta N$ is about 400–550 nm and wherein the liquid crystal material is capable of twisting at least one normally incident visible wavelength of light passing therethrough in an amount of about 80°–100°;

a rear, light-entrance polarizer having a transmission axis oriented in a first direction;

a front, light-exit polarizer having a transmission axis oriented in a second direction with respect to the first direction thereby to define a normally white display;

a rear retardation film disposed between the rear polarizer and the twisted nematic liquid crystal material;

a front retardation film disposed between the front polarizer and the liquid crystal material; and wherein the transmission axes of the polarizers and optical axes of the retardation films are so arranged each with respect to the others so as to achieve a white light contrast ratio of at least about 10:1 over a horizontal angular span of at least about 100° and over a vertical angular span of greater than about 55°.

In the preferred forms of this invention contrast ratios of at least about 10:1 over a horizontal angular span of at least about 120° and over a vertical angular span greater than about 60° are achieved; particlarly when about 6.0 volts is applied to the display.

In still further preferred forms of this invention the above-described 10:1 contrast ratios are achieved while at the same time 30:1 contrast ratios of at least about 80° over the horizontal angular span and about 30° over the vertical angular span are also achieved. In a particularly preferred form of this invention, furthermore, not only are the above-described ratios achieved but a contrast ratio of about 50:1 is also achieved over a horizontal angular span of about 85° and over a vertical angular span of about 30°. In such embodiments, furthermore, it is preferred to design the display so that the product of $$\frac{d \cdot \Delta N}{\lambda}$$

is approximately matched to the first minimum of a single, pre-selected color whose wavelength is $\lambda$. Such a color is usually red, green, or blue, but may be any other color desired.

In addition, this invention further fulfills the above-described needs in the art by providing a normally white liquid crystal display including a plurality of pixels comprising: a twisted nematic liquid crystal layer which twists at least one normally incident visible wavelength of light about 80°–100° as it passes therethrough; a first retardation film on a first side of said liquid crystal layer; a second retardation film on a second side of said liquid crystal layer whereby said liquid crystal is disposed between said first and second retardation films; and wherein said first and second retardation films each are uniaxial and have positive or negative retardation values of from about 80–200 nm, and wherein the optical axes of the retardation films are so arranged each with respect to the other so as to achieve a high contrast ratio over a predetermined range of viewing angles.

In certain preferred embodiments of this invention, the first and second retardation films each have an optical axis, and wherein the optical axis of the first retardation film defines a first direction and the optical axis of the second retardation film defines a second direction, and wherein the first and second directions are different by about 75°–100°.

In certain other preferred embodiments of this invention the display further includes a first polarizer substantially adjacent the first retardation film and a second polarizer substantially adjacent the second retardation film, whereby the first and second retardation films are disposed between the first and second polarizers.

In certain further preferred embodiments of this invention the display when about 6.0 volts is applied thereto has a white light contrast ratio of at least about 20:1 at viewing angles of about 0° vertical, ±45° horizontal.

In still further preferred embodiments of this invention the display when about 6.0 volts is applied thereto has a white light contrast ratio of at least about 20:1 at viewing angles of about −20° vertical, ±40° horizontal.

This invention further fulfills the above-described needs in the art by providing a pixel for a liquid crystal display comprising: a rear, light-entrance polarizer having a transmission axis oriented in a first direction; a front, light-exit polarizer having a transmission axis oriented in a second direction with respect to the first direction thereby to define a normally white pixel; a rear uniaxial retardation film disposed between the rear polarizer and a twisted nematic liquid crystal material, wherein the liquid crystal material twists at least one normally incident visible wavelength of light about 80°–100° as it passes therethrough; a front uniaxial retardation film disposed between the front polarizer and the liquid crystal material; and wherein the front and rear retardation films have positive birefringent values and both have retardation values of from about 80–200 nm, and wherein the transmission axes of said polarizers and optical axes of said retardation films are so arranged each with respect to the others so as to achieve a high contrast ratio over a predetermined range of viewing angles.

In still other preferred embodiments of this invention the pixel has a white light contrast ratio when about 6.0 volts is applied to the pixel of at least about 30:1 at viewing angles of about (i) 0° vertical, −40° horizontal; (ii) 0° vertical, 30° horizontal; (iii) 25° vertical, 0° horizontal; and (iv) −5° vertical, ±25° horizontal.

In certain further preferred embodiments of this invention a pixel has a white light contrast ratio when about 6.0 volts is applied to the pixel of at least about 10:1 at viewing angles of about (i) 0° vertical, ±60° horizontal; (ii) 30° vertical, 0° horizontal; and (iii) −15° vertical, ±30° horizontal.

In certain further preferred embodiments of this invention in angle of from about 80°–100° is defined between the optical axes of the rear and front retardation films. In still further preferred embodiments of this invention an angle of from about 85°–90° is defined between the optical axes of the rear and front retardation films.

This invention further fulfills the above-described needs in the art by providing a liquid crystal display having a viewing zone centered substantially below the 0° vertical viewing axis, comprising: a first polarizer having a transmission axis defining a first direction; a second polarizer having a transmission axis defining a second direction wherein the first and second directions are substantially perpendicular to one another thereby defining a normally white display; a first retardation film having an optical axis and a positive or negative retardation value of from about 80–250 nm; a second retardation film having an optical axis, a twisted nematic liquid crystal layer disposed between the first and second retardation films wherein the liquid crystal layer twists at least one normally incident visible wavelength of light about 80°–100° as it passes therethrough; wherein the optical axes of the first and second retardation films define an angle δ therebetween of from about 70°–89° thereby creating a display having its highest contrast viewing zone centered substantially below the 0° vertical viewing axis and remote from inversion areas present above said 0° vertical viewing axis when a voltage of from about 5.0–7.0 volts is applied to the liquid crystal layer.

In certain further preferred embodiments of this invention the angle δ between the optical axes of the rear and front retardation films is from about 75°–87° thereby positioning and centering the high contrast viewing zone so as to avoid an inversion area of viewing angles located above the 0° vertical axis viewing angle and wherein said retardation films are positively is birefringent.

In still further preferred embodiments of this invention the optical axis of the first retardation film and the transmission axis of the first polarizer define an angle Θ1 between the rear retardation film optical axis and the rear polarizer transmission axis of from about 1.5°–7.5° therebetween.

In still further preferred embodiments of this invention the optical axis of the second retardation film and the transmission axis of the second polarizer define an angle Θ2 between the front retardation film optical axis and the front polarizer transmission axis of from about 1.5°–7.5° therebetween.

In other preferred embodiments of this invention the angles Θ1 and Θ2 are substantially equal thereby creating a high contrast viewing zone which is substantially symmetrical about the 0° horizontal viewing axis.

This invention further fulfills the above-described needs in the arts by providing a method of shifting the highest contrast viewing zone of a liquid crystal display to a centered position away from an inversion area, comprising the steps of: a) providing the liquid crystal display with a first polarizer having a transmission axis defining a first direction; b) providing the display with a second polarizer having a transmission axis defining a second direction; c) positioning the first and second polarizers on opposite sides of a twisted nematic liquid crystal layer which twists at least one wavelength of normally incident visible light about 80°–100° when it passes therethrough; d) positioning first and second positively birefringent uniaxial retardation films with substantially equal retardation values on opposite sides of the liquid crystal layer wherein the first retardation film is substantially adjacent the first polarizer, and the second retardation film is substantially adjacent the second polarizer; e) orienting an optical axis of the first retardation film relative to the first polarizer axis so as to define an angle Θ1 therebetween; f) orienting an optical axis of the second retardation film relative to the second polarizer axis so as to define an angle Θ2 therebetween; g) selecting values for the Θ1 and Θ2 so as to center the highest contrast viewing zone of the display at a point substantially below the 0° vertical viewing angle axis, thereby positioning and centering the highest contrast viewing zone substantially distant from an inversion area located above the 0° vertical viewing axis.

In certain further preferred embodiments of this invention, the angles Θ1 and Θ2 are selected to be in the range of from about 3°–5°.

In certain further preferred embodiments of this invention, the angles Θ1 and Θ2 are selected to be in the range of from about 2°–10°.

In still further preferred embodiments of this invention, the retardation films are uniaxial and have negative birefringence.

In still other preferred embodiments of this invention, the retardation films are biaxial and are either positively or negatively birefringent.

This invention further fulfills the above described needs in the art by providing a pixel for a twisted nematic liquid crystal display, comprising: a rear, light-entrance polarizer having a transmission axis oriented in a first direction; a front, light exit polarizer having a transmission axis oriented in a second direction wherein said first and second directions are substantially perpendicular to one another thereby defining a normally white display; a rear biaxial retardation film disposed between said rear polarizer and a twisted nematic liquid crystal material, wherein the liquid crystal material twists at least one wavelength of normally incident visible light about 80°–100° as it passes therethrough; a front biaxial retardation film disposed between the front polarizer and the liquid crystal material; wherein the rear retardation film optical axis having the largest index of refraction is oriented in a direction substantially parallel to the first direction of the transmission axis of the rear polarizer, and the front retardation film optical axis having the largest index of refraction is oriented substantially parallel to the second direction of the transmission axis of the front polarizer; and wherein the optical axes of the rear and front retardation films with said largest indices of refraction each have retardation values $(d \cdot \Delta_{zx})$ in the range of from about −100 to −200 nm such that the viewing zone of the pixel has high contrast ratios at large predetermined horizontal viewing angles. In certain embodiments of this invention, each of first and second orientation or buffing layers has a retardation value of from about −80 to −200 nm. More particularly, in certain embodiments of this invention, each of the polyimide orientation layers has a retardation value of from about −80 to −200 nm.

This invention will now be described with respect to certain embodiments thereof, accompanied by certain illustrations, wherein:

IN THE DRAWINGS

FIGS. 5A–5D are specific wavelength contrast curve diagrams or graphs showing viewing angle characteristics of the prior art normally white liquid crystal display of FIG. 4. Each of the FIGS. 5A–5D represent different orientations of the optical axes of the front and rear polarizers of the FIG. 4 normally white display.

FIG. 38A is a measured contrast ratio curve of the light valve of FIG. 37 when 5.0 V was applied to the light valve.

Figure 43:
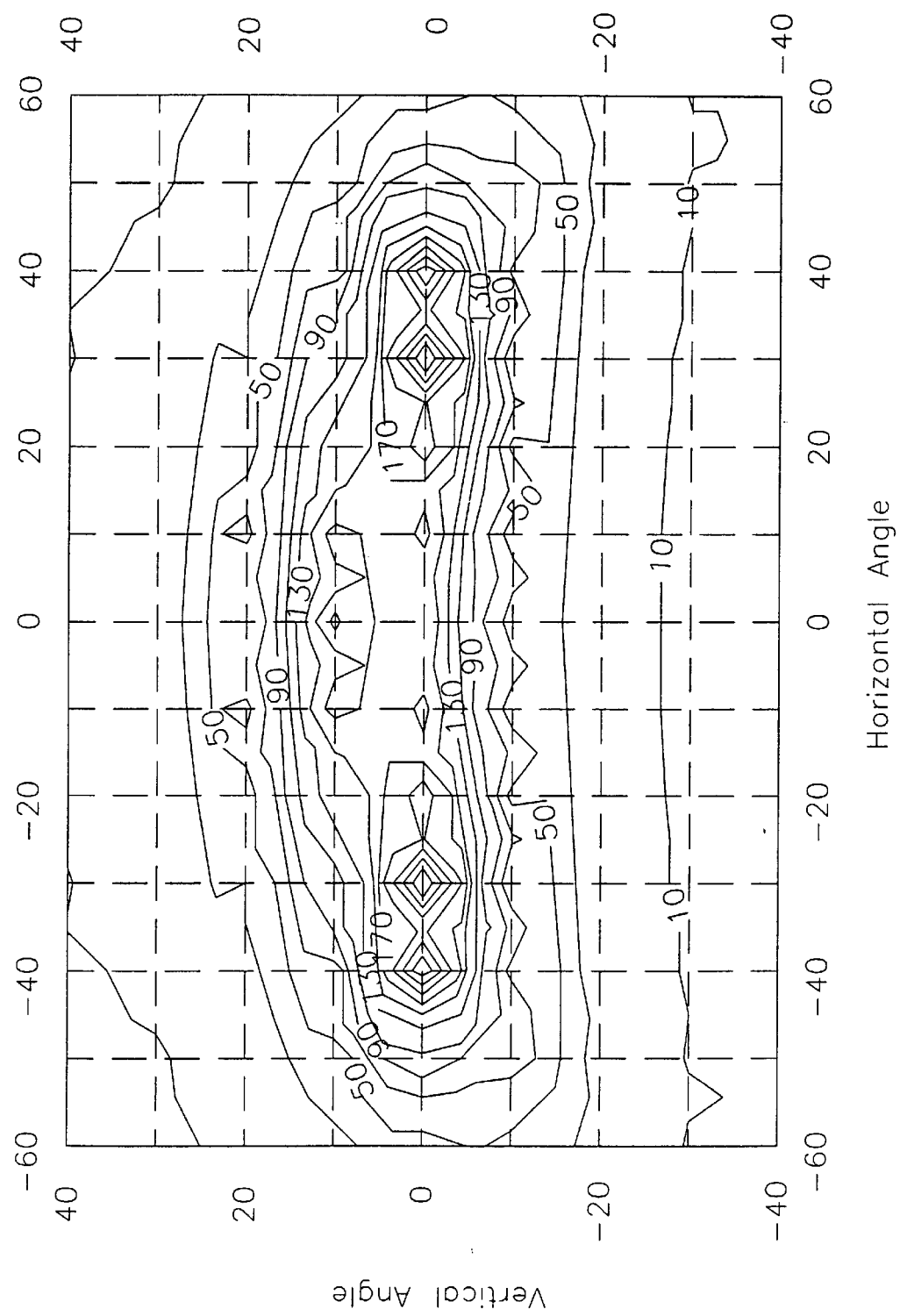

FIG. 43 is a computer simulation contrast ratio curve graph of an LCD according to another embodiment of this invention wherein the rear and front retardation films are uniaxial, but have negative birefringent values. The rear and front retardation films of this embodiment both have retardation values of $\Delta_{ZX}=\Delta_{ZY}=-160$ nm where $\Delta_{ZX}=d\cdot(n_Z-n_X)$, where "n" is the index of refraction and "d" is the thickness of the film. Therefore, the optical axes of these films are oriented in the "Z" direction.

Figure 44:
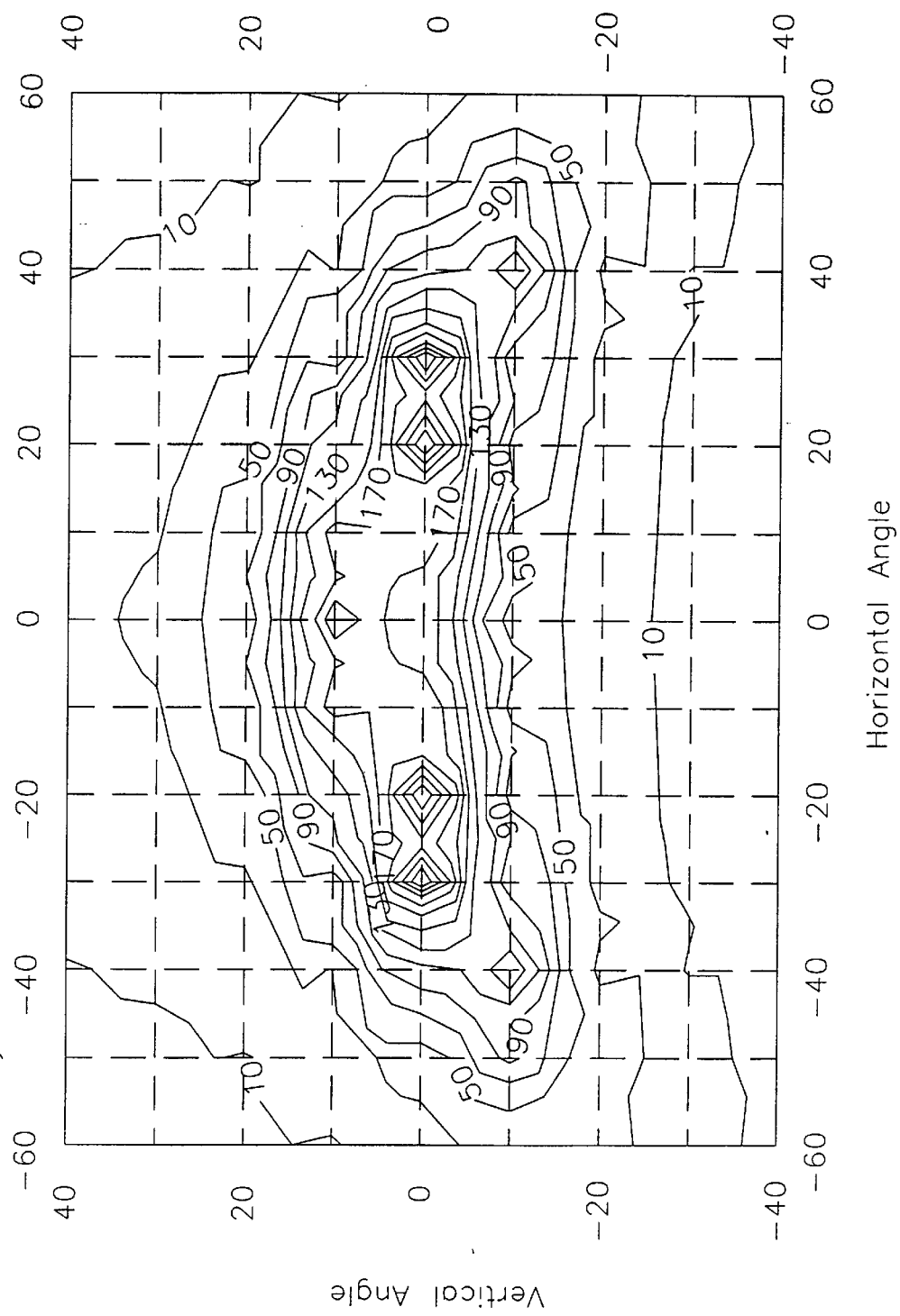

FIG. 44 is a computer simulation contrast ratio curve graph of an LCD according to yet another embodiment of this invention where the LCD has a cell gap of 5.7 μm, 6.0 V is applied, and the rear and front retardation films are biaxial with negative retardation values. The rear and front films of this embodiment have retardation values $\Delta_{ZX}$ and $\Delta_{ZY}$ of −160 nm and −60 nm respectively. A 550 nm wavelength was used in this graph.

Figure 45:
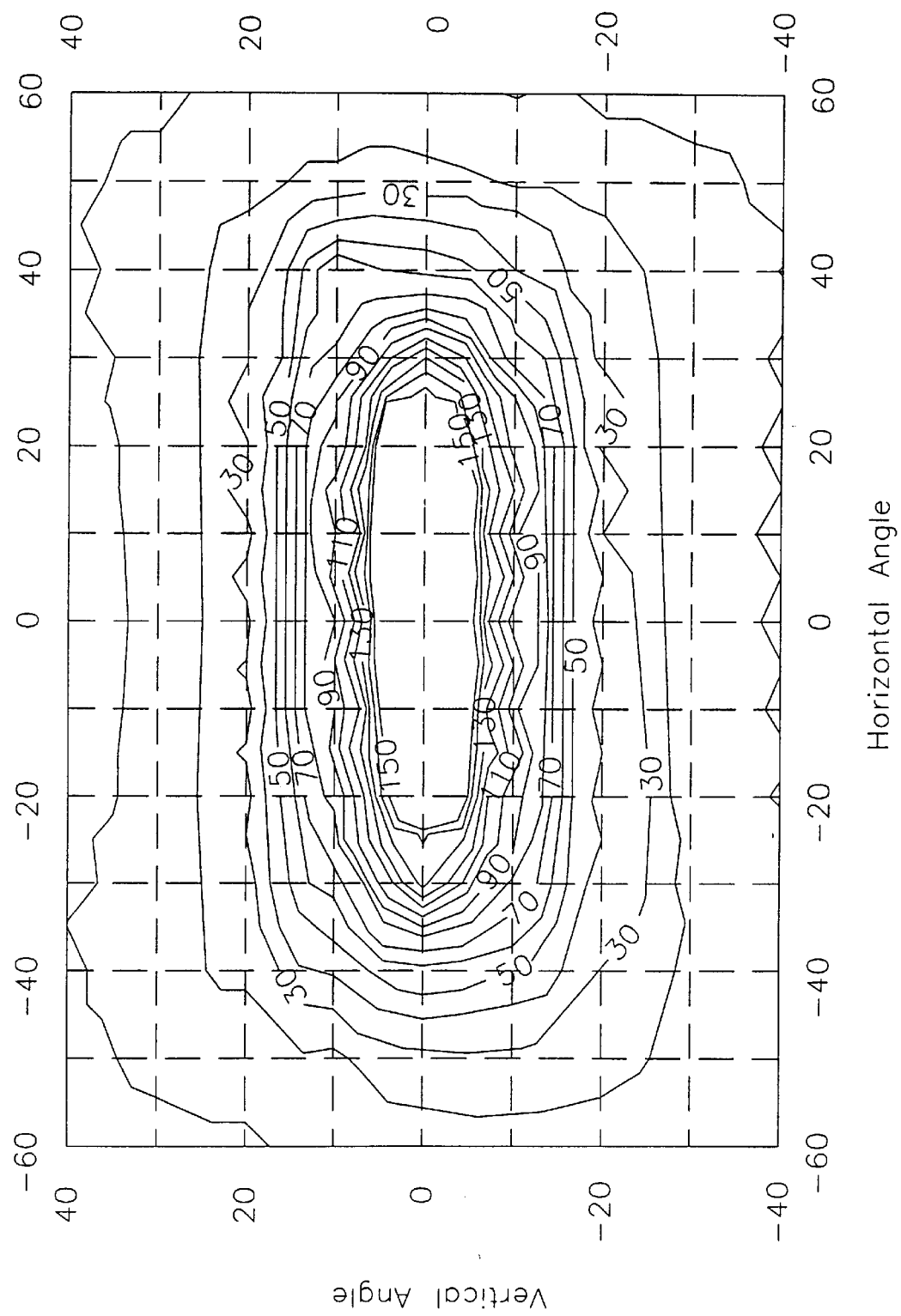

FIG. 45 is a measured contrast ratio graph of a light valve pixel according to another embodiment of this invention where 6.0 V was applied, biaxial rear and front retardation films obtained from Allied Signal Corporation were used, and the light valve was "X-buffed."

Figure 46:
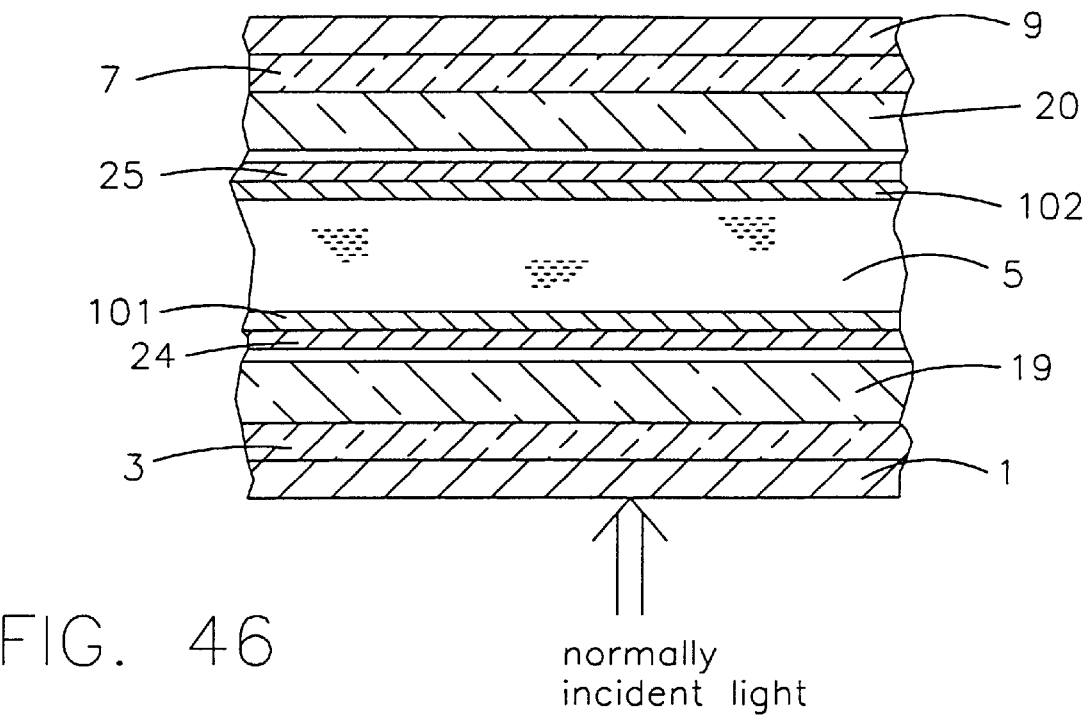

FIG. 46 is a side cross sectional view of a liquid crystal display according to another embodiment of this invention wherein a single layer on each side of the liquid crystal layer functions as both an orientation (or buffing) film and a retarder.

Figure 47:
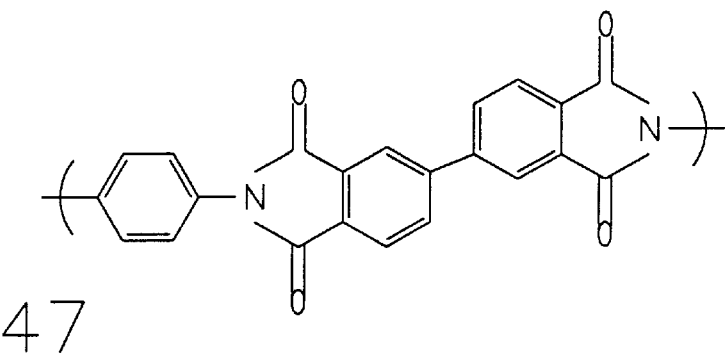

FIG. 47 illustrates a molecule of a polyimide is useable as C-plate retarder material in accordance, with the FIG. 46 embodiment of this invention.

Figure 48:
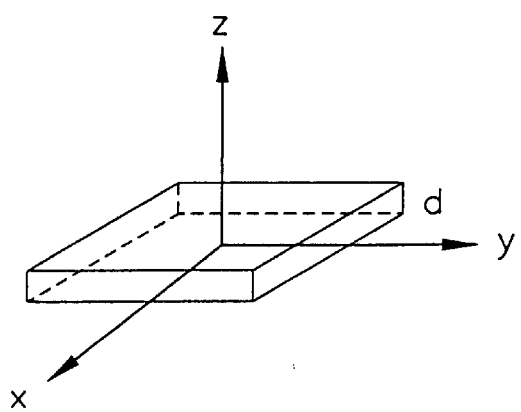

FIG. 48 illustrates a typical C-plate retarder and different axis directions in general.

Figure 49:
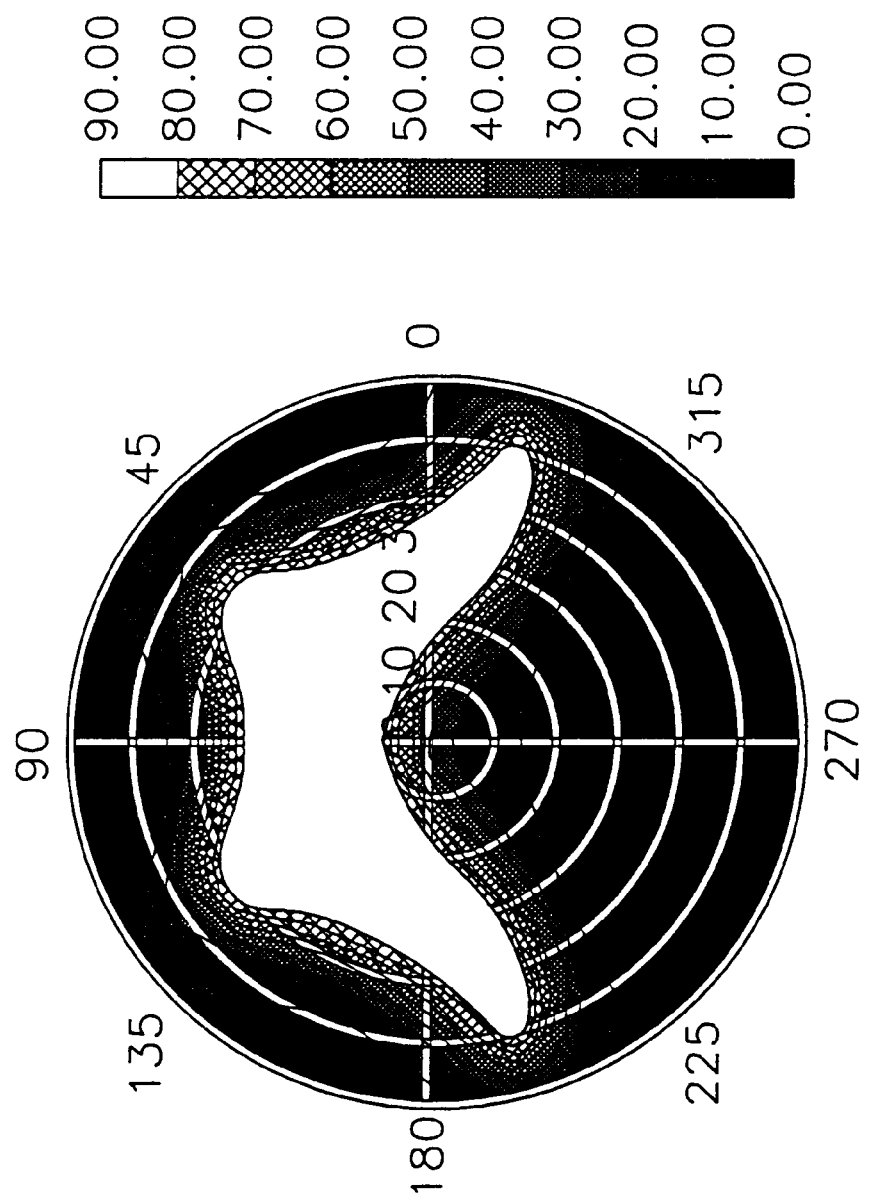

FIG. 49 is a contrast ratio hemispherical plot measured by Eldim EZContrast equipment of a TN light valve (4.75 um cell gap or LC thickness) including C and A retarder plates on each side of the LC material.

DETAILED DESCRIPTION OF CERTAIN EMBODIMENTS OF THIS INVENTION

Figure 11A:
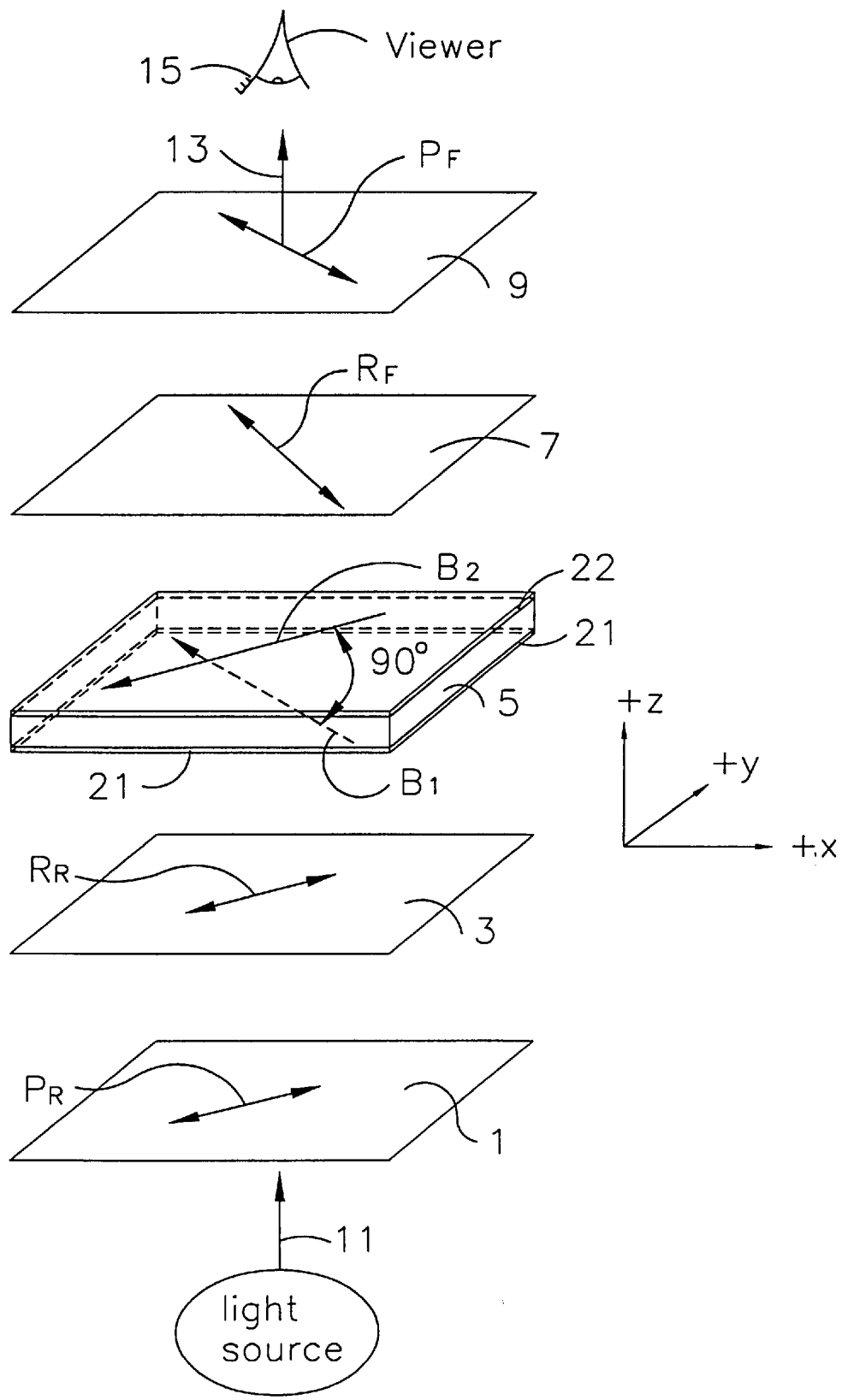
FIG. 11(a) is a schematic diagram of the optical components of a first embodiment of a normally white twisted nematic liquid crystal display of this invention.

FIG. 11(a) is a schematic view of the optical components and their respective orientations of a first embodiment of this invention. As shown in FIG. 11(a) the normally white "X-buffed" LCD (or pixel) of this embodiment discloses a rear linear polarizer 1 provided at the light incident side of the liquid crystal layer 5, an exit or front linear polarizer 9 provided at the light exit side of the liquid crystal layer 5, a rear retardation film or plate 3 provided between the liquid crystal layer and the rear polarizer 1, and a front retardation film or plate 7 provided between the liquid crystal layer 5 and the front linear polarizer 9. The retardation films of this embodiment preferably are uniaxial and have positive birefringent ($\Delta N$) values. An example of uniaxial positively birefringent retardation films useful in the practice of this invention are films commercially available from, for example, Nitto Corp., Japan, or Nitto Denko America, Inc., New Brunswick, N.J., as Model No. NRF-RF120 (120 nm retarder).

In addition, biaxial retardation films are obtainable, for example, from Allied Signal Corporation, and negatively birefringent uniaxial/biaxial soluble polyimide retardation films are obtainable from the University of Akron and may also be used in certain embodiments of this invention.

Normally incident light 11 is directed toward the rear linear polarizer 1 from a conventional backlighting system such as is disclosed, for example, in U.S. Pat. No. 5,161,041. The liquid crystal material 5 is preferably of the twisted nematic type and twists at least one normally incident visible wavelength of light about 80°–100° (most preferably about 90°) as it passes through the liquid crystal layer 5. The amount of twist provided by the liquid crystal layer depends upon:, the wavelength of light propagating therethrough, the thickness "d" of the liquid crystal layer 5, the birefringence of the liquid crystal layer, and the orientation of the rear and front buffing zones. The liquid crystal material or layer is preferably about 4.5–6.0 μm thick and has a birefringent value of 0.084 at room temperature.

Figure 4:
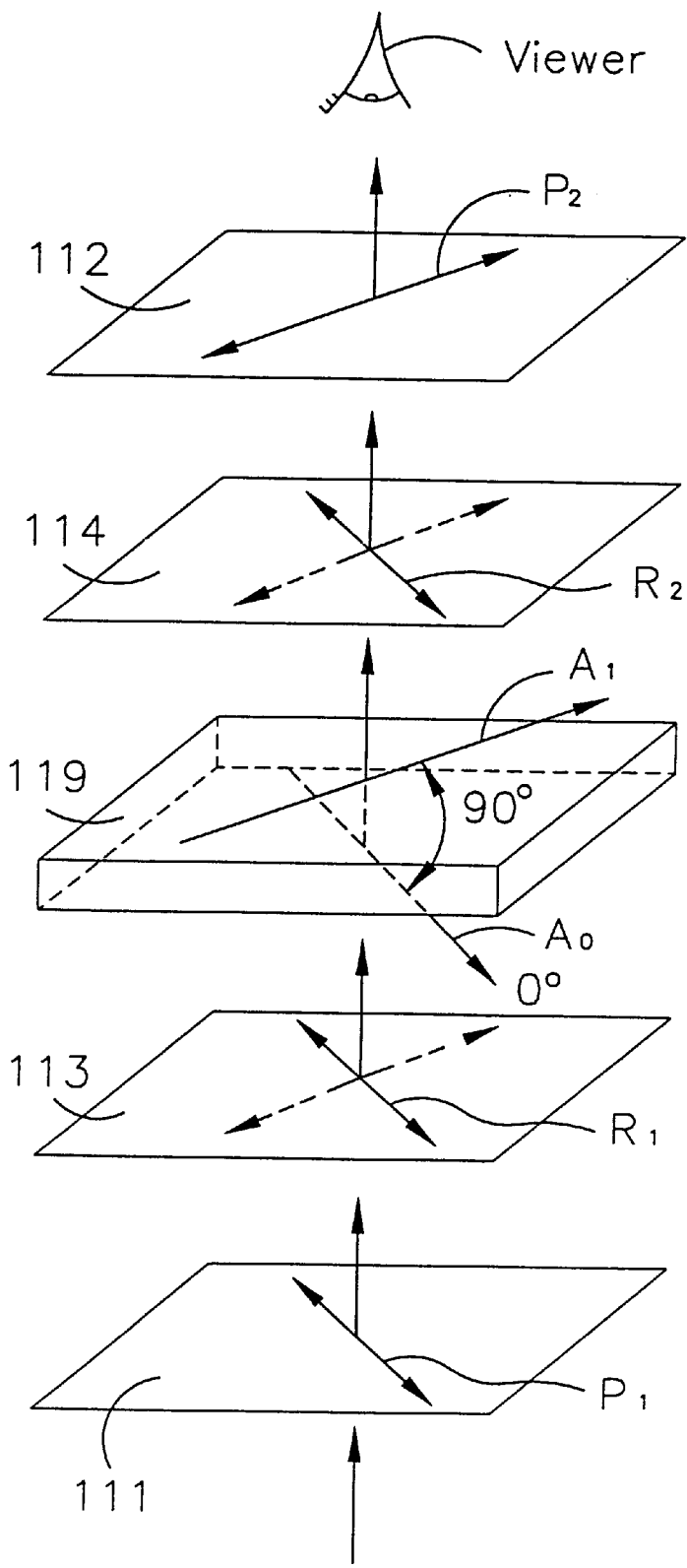
FIG. 4 is a schematic diagram of the optical components of a prior art "P-buffed" normally white twisted nematic liquid crystal display having retardation films with retardation values of at least 300 nm.

Between the rear retardation film 3 and the liquid crystal layer 5 is a rear orientation film 21 which has an orientation axis or buffing zone oriented in a direction $B_1$. The rear orientation film 21 oriented in direction $B_1$ acts to align the liquid crystal layer molecules adjacent the rear orientation film in this direction $B_1$. The display of FIG. 11(a) is also provided with a front orientation film 22 or buffing zone having an orientation direction $B_2$. The direction $B_2$ of the front orientation film is preferably substantially perpendicular to direction $B_1$ of the rear orientation film. As is the case with the rear orientation film, the purpose of the front orientation film is to align the liquid crystal molecules along the interface between the liquid crystal layer 5 and the front orientation film in direction $B_2$. As described hereinafter more fully, the rear orientation direction $B_1$ is aligned from the lower right to the upper left, and the front orientation direction $B_2$ is oriented from the upper right to the lower left which are not to be confused with the directions of the buffing in U.S. Pat. No. 5,184,236 shown in FIG. 4 herein. The effect of the alignment of these two orientation films is to provide for a liquid crystal layer twist of about 80°–100° (most preferably about 90°).

The rear linear polarizer 1 is arranged so that its transmission axis $P_R$ is substantially parallel with the orientation or buffing direction $B_2$ of the front orientation film. The front or exit linear polarizer 9 is arranged so that its transmission axis $P_F$ is substantially perpendicular to the transmission axis $P_R$ of the rear linear polarizer 1. Because the transmission axis $P_R$ of the rear linear polarizer 1 is substantially perpendicular to the orientation or buffing direction $B_1$ of its adjacent orientation film 21, this defines what is meant by "crossed" buffing (i.e. "X-buffed"). "P" (i.e. parallel) buffing simply means that the direction of buffing of the buffing film adjacent its respective polarizer is parallel to the direction of polarization. This arrangement of the transmission axes of the rear and front polarizers also defines a twisted nematic normally white liquid crystal display cell in that as light exits the front linear polarizer 9, it may be viewed by a viewer or observer 15 when the display is in the OFF state.

This embodiment utilizes an "X-buffed" optical arrangement because such an arrangement provides superior results with respect to a "P-buffed" orientation. However, a "P-buffed" arrangement could also be used in certain other embodiments of this invention.

The rear retardation film 3, which is preferably but not necessarily of the uniaxial type, has its optical axis $R_R$ arranged in a direction substantially parallel to the transmission axis $P_R$ of the rear linear polarizer 1. Also, the optical axis $R_R$ of the rear retardation film is arranged in a direction substantially perpendicular to the direction $B_1$ of the rear orientation film. The retardation value (d·ΔN) of the rear retardation film 3 is preferably in the range of about 80–200 nm, more preferably about 100–160 nm, and most preferably about 120–140 nm.

The front and rear retardation films are preferably positioned about equal distances away from the liquid crystal material in this and certain other embodiments of this invention.

The front retardation film 7, which is located on the opposite side of the liquid crystal layer 5 as the rear retardation film 3, is also preferably uniaxial. The optical axis $R_F$ of the front retardation film 7 is preferably oriented in a direction substantially parallel to the transmission axis $P_F$ of the front or exit linear polarizer 9. Also, the optical axis $R_F$ of the front retardation film 7 is preferably oriented in a direction substantially perpendicular to the orientation direction $B_2$ of the front orientation film. The terms "substantially parallel" and "substantially perpendicular" when used herein but only as used to define the orientation of the optical axes of the rear and front retardation films, means that the axes of the retardation films are arranged in such a manner±about 10° unless otherwise specified.

The retardation value of the front retardation film 7 is preferably the same as that of the rear retardation film 3. In other words, the retardation value (d·ΔN) of the front retardation film 7 is in the range of about 80–200 nm, more preferably about 100–160 nm and most preferably about 120–140 nm.

The advantages of utilizing about 80–200 nm retardation films according to the teachings of this invention include a resulting larger viewing zone, and the ability to shift the viewing zone vertically away from an inversion area without substantially distorting the viewing zone.

Also, the retardation values of the rear and front retardation films are preferably about the same so as to define a viewing zone substantially symmetrical about the 0° horizontal viewing axis. The greater the difference between the retardation values of the retardation films 3 and 7, the greater the loss of symmetry of the viewing zone about the 0° horizontal viewing axis. This may be desireable in certain embodiments of this invention.

Normally incident white light 11 from a conventional backlighting system is directed towards the normally white liquid crystal display shown by FIG. 11(a) and toward the rear linear polarizer 1 and its transmission axis $P_R$. The rear linear polarizer 1 linearly polarizes the normally incident white light 11 in a direction $P_R$. After being polarized by the polarizer 1, the light then proceeds toward and through the rear retardation film 3 which has a specific retardation value in the range of about 80–200 nm. After being transmitted through the rear retardation film 3 and being affected by its optical axis $R_R$, the white light then proceeds through the rear buffing or orientation film having an orientation direction $B_1$ and into the liquid crystal material 5. When proceeding through the liquid crystal material 5, the twisted nematic material twists the normally incident white light about 80°–100°, most preferably about 90°.

After exiting the liquid crystal layer 5 (with its molecules aligned along the front surface thereof in direction $B_2$), the light proceeds through color filters (not shown) and into and through the front retardation film 7. The color filters, may, for example, be red, green, blue, white, or combinations thereof as shown and discussed, for example, in U.S. Pat. No. 4,632,514, the disclosure of which is incorporated herein by reference. After proceeding through the front retardation film 7 and being affected by its optical axis $R_F$, the color filtered light approaches the front polarizer 9. When the liquid crystal display is in the unenergized or OFF state (no voltage above $V_{th}$, the threshold voltage, is applied across the liquid crystal material) the twisted light proceeds through the front polarizer 9 and the display appears bright, white, or colored. When the display is in its energized or ON state (a voltage greater than $V_{th}$ is applied across the liquid crystal material) the light is substantially blocked to a voltage dependent extent by the front polarizer 9 and the display appears darkened to a viewer.

Figure 11B:
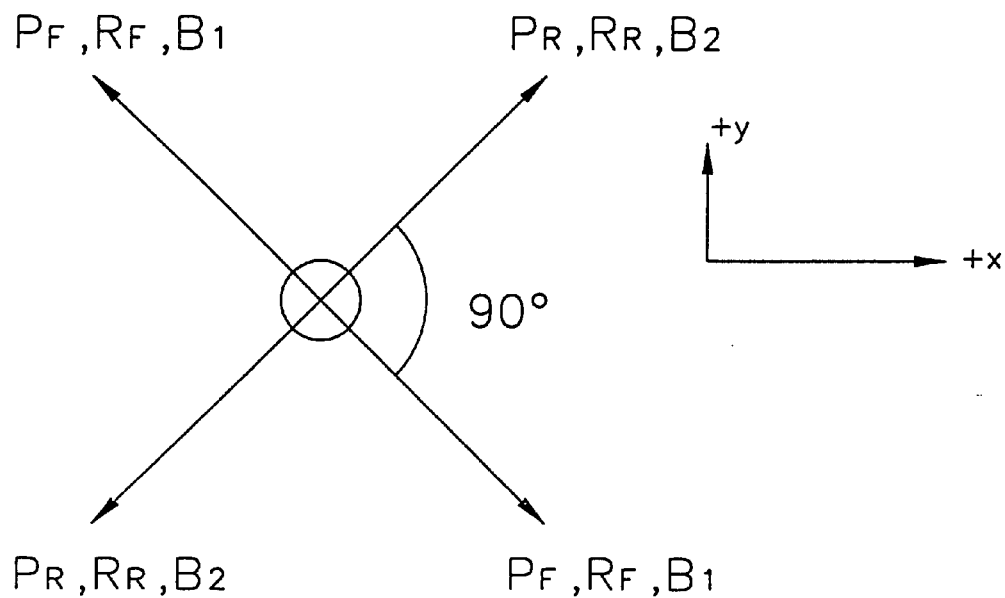
FIG. 11(b) illustrates the angular relationships between the respective optical axes of the first embodiment of this invention.
Figure 11C:
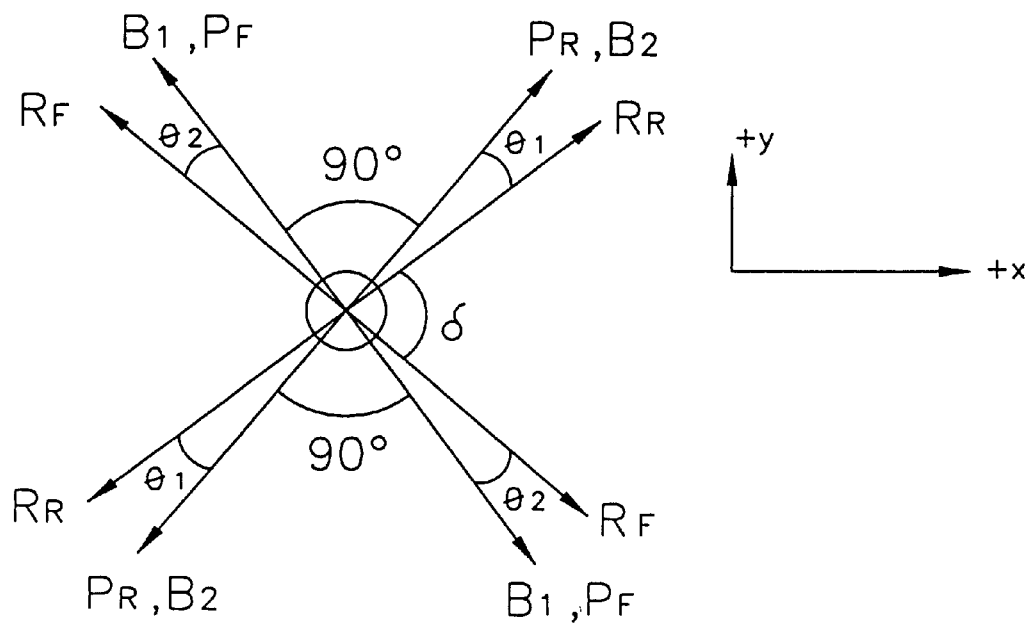
FIG. 11(c) illustrates the angular relationships of another embodiment of this invention as viewed from the point of view of an observer or viewer of the display.

Electrodes provided on each side of the liquid crystal material are conventional in the art and are not shown in the drawings of FIGS. 11(a)–11(c) for the purpose of simplicity.

FIG. 11(b) illustrates the angular relationship between the respective axes of the polarizers, retardation films, and orientation films of the first embodiment of this invention. FIGS. 11(b) and 11(c) are perspective views from the viewer side of the liquid crystal display. As shown in FIG. 11(b), the transmission axis $P_F$ of the front polarizer, the optical axis $R_F$ of the front retardation film, and the orientation direction $B_1$ of the rear orientation film are about parallel one to the others. Also, the transmission axis $P_R$ of the rear polarizer, the optical axis $R_R$ of the rear retardation film, and the direction $B_2$ of the front orientation film are also about parallel one to the others. Therefore, an angle of about 90° is defined between the orientations of these two groups of directions as shown in FIG. 11(b). Preferably, the angular arrangement shown in 11(b) of the first embodiment of this invention provides for a viewing zone substantially symmetrical about the 0° vertical viewing axis or reader.

The +X and +Y directions are illustrated in FIGS. 11(b) and 11(c), and the +Z direction comes out of the figures toward the viewer or reader.

FIG. 11(c) is a perspective view illustrating the angular relationship between the above discussed optical directions in another embodiment of this invention. In this embodiment, the optical axes of the rear and front retardation films 3 and 7 are symmetrically rotated negatively so as to shift the central location of the displays' viewing zone to a position below the 0° vertical viewing axis while substantially preserving its shape. This embodiment of this invention illustrated by FIG. 11(c) utilizes the same parameters as those described with respect to the first embodiment of this invention except for the orientations of the optical axes of the retardation films. As in the first embodiment of this invention, the transmission axes $P_F$ and $P_R$ of the front and rear linear polarizers in this embodiment define an angle of about 90° therebetween. Also, the directions $B_1$ and $B_2$ are substantially perpendicular to one another and are about parallel with the transmission axes $P_F$ and $P_R$ of the front and rear polarizers respectively.

The difference between the first embodiment and this embodiment is that in this embodiment shown in FIG. 11(c) the optical axis $R_R$ of the rear retardation film is rotated so as to define an angle $\Theta 1$ between the transmission axis of the rear polarizer and the optical axis $R_R$ of the rear retardation film. Also, the optical axis $R_F$ of the front retardation film in this embodiment is rotated so as to define an angle $\Theta 2$ between the transmission axis $P_F$ of the front polarizer and the optical axis $R_F$ of the front retardation film.

As illustrated in FIG. 11(c), the optical axis $R_R$ of the rear retardation film is rotated clockwise relative to directions $P_R$ and $B_2$, while the optical axis $R_F$ of the front retardation film is rotated counterclockwise relative to directions $P_F$ and $B_1$.

Preferably, the angles $\Theta 1$ and $\Theta 2$ as shown in FIG. 11(c) are substantially equal to one another thereby defining a viewing zone for the normally white display which is substantially symmetrical about the 0° horizontal viewing axis. Because the optical axis $R_F$ of the front retardation film has been rotated counterclockwise and the optical axis $R_R$ of the rear retardation film has been rotated clockwise to substantially equal extents, the display of this embodiment is said to have its retardation films rotated negatively in a symmetrical manner. The term "symmetrical" means that the angles $\Theta 1$ and $\Theta 2$ are substantially equal to one another. For example, if the normally white display illustrated by FIG. 11(c) were to have its rear and front retardation film axes "rotated −8° symmetrically," the angles $\Theta 1$ and $\Theta 2$ each would be about 4° respectively. Therefore, the angle $\delta$ between directions $R_R$ and $R_F$ would be about 82° when the retardation films of this embodiment were rotated −8° symmetrically. It should then be clear that if the optical axes of the rear and front retardation films were to be rotated −4° symmetrically, the angles $\Theta 1$ and $\Theta 2$ would each be about 2°, and the angle $\delta$ between the optical axes of the rear and front retardation films would be about 86°.

The purpose of rotating the optical axes $R_R$ and $R_F$ of the rear and front retardation films is to shift the central location of the viewing zone vertically while still substantially maintaining its shape. In the liquid crystal display art, different customers often desire different viewing characteristics such as the position of the viewing zone. Because of different requirements for different customers, it is advantageous to have a display which may have its viewing zone shifted vertically in accordance with a customer's needs simply by rotating the optical axes of the rear and front retardation films. By rotating the optical axes $R_R$ and $R_F$ of the retardation films to a predetermined negative extent symmetrically, the viewing zone, while being substantially maintained with respect to shape, is shifted to a position centered substantially below the 0° vertical viewing axis and, therefore, away from the inversion zones present above the 0° vertical viewing axis. Such shifts with respect to viewing zones are disucssed and shown graphically below with reference to this and other embodiments of this invention.

Another embodiment of this invention which is related to the embodiment disclosed in FIG. 11(c) is the situation where the optical axes of the rear and front retardation films are rotated to a predetermined positive value symmetrically. When the optical axes $R_R$ and $R_F$ are rotated, for example, +6° symmetrically, the optical axis $R_R$ is rotated 3° counterclockwise relative to directions $P_R$ and $B_2$, while retardation axis $R_F$ is rotated 3° clockwise relative to directions $B_1$ and $P_F$. Therefore, the rear and front retardation optical axes $R_R$ and $R_F$ define angles $\Theta 1$ and $\Theta 2$ of about 3° between their axes and the transmission axes of their respective adjacent polarizers. In this situation where the optical axes $R_R$ and $R_F$ are rotated +6° symmetrically, the angle $\delta$ is about 94°. When the optical axes of the retardation films are rotated in a positive manner symmetrically, the result is a shifting of the viewing zone to a position centered substantially above the 0° vertical viewing axis.

FIGS. 12–25 are computer simulations of the first embodiment of this invention illustrating the effect of different driving voltages, retardation values, and wavelengths.

Figure 12:
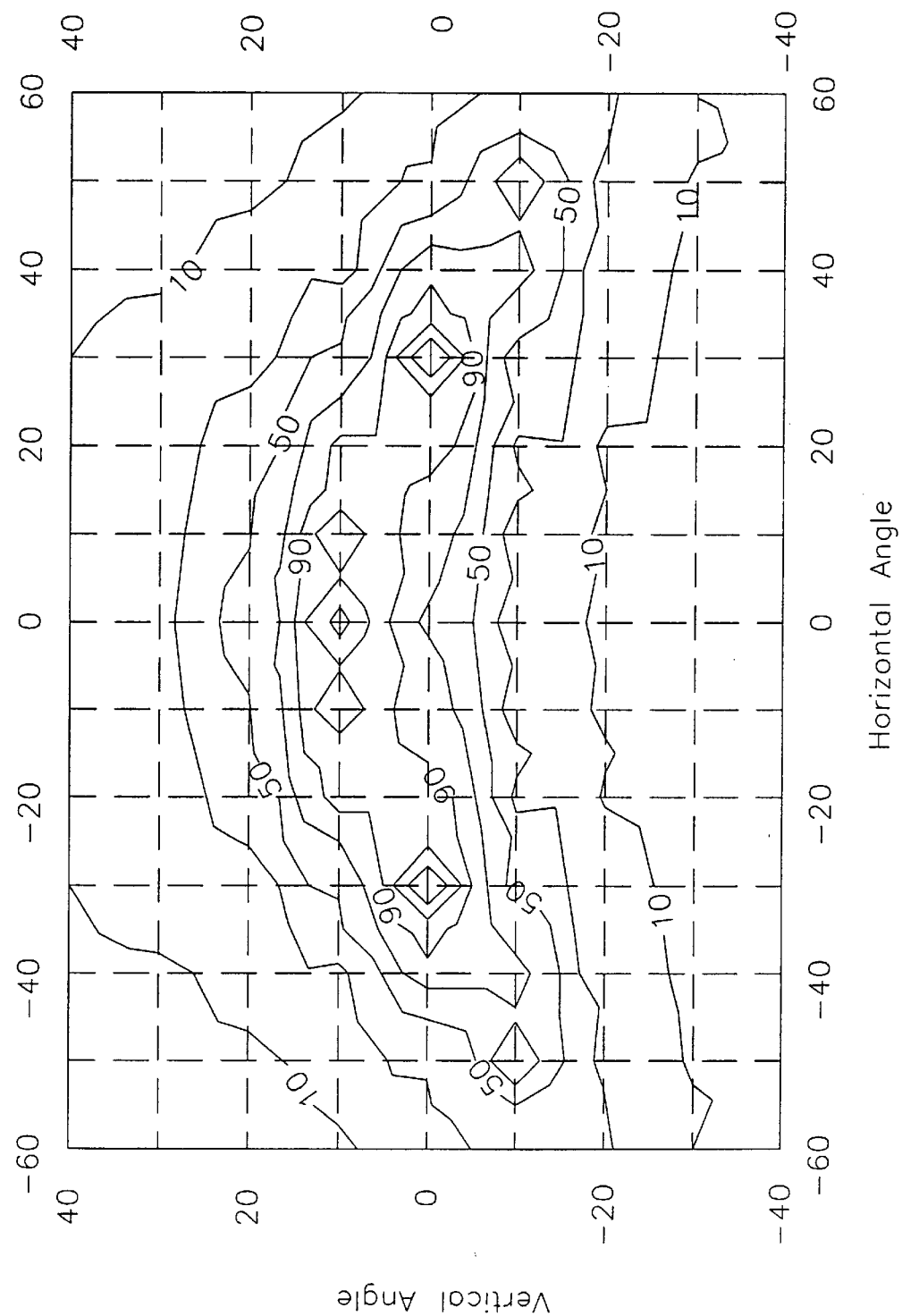
FIG. 12 is a computer simulation contrast ratio curve graph illustrating the contrast ratios of the first embodiment of this invention when 6.8 volts is applied across the liquid crystal material, 120 nm retarders are used, and the red wavelength of 630 nm is used.
Figure 13:
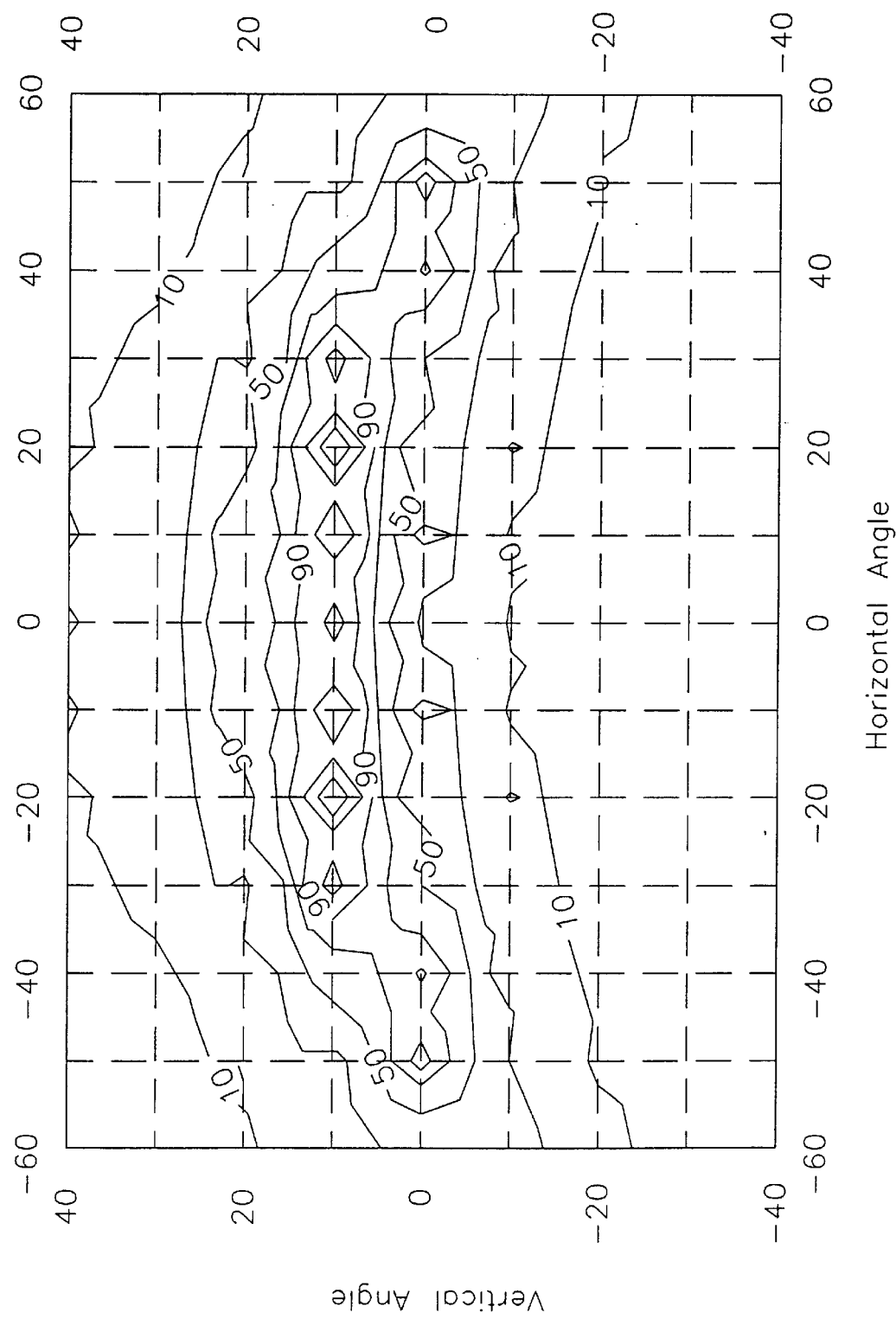
FIG. 13 is a computer simulation contrast ratio curve graph of the first embodiment to this invention when 6.0 volts is applied across the liquid crystal material, 120 nm retarders are used, and the red wavelength of 630 nm is used.

FIGS. 12 and 13 are computer simulation contrast ratio curve graphs of the first embodiment of this invention when the red wavelength of 630 nm is used. With respect to FIGS. 12 and 13, the cell gap "d" is 5.70 µm, and the optical axes $R_R$ and $R_F$ of the rear and front retardation films are parallel to the transmission axes of the rear and front linear polarizers respectively. The rear and front retardation films 3 and 7 each have retardation values of 120 nm in the computer simulation graphs of these Figures, as well as FIGS. 14–19.

In FIG. 12, $V_{ON}$ was 6.8 volts and $V_{OFF}$ was 0.9 volts. As can be seen in FIG. 12, the contrast ratios of the red wavelength are extremely good, especially horizontally. The 30:1 contrast ratio curve extends off the graph in both horizontal directions, while the 10:1 contrast ratio curve extends off the graph in the positive vertical direction. The 30:1 contrast ratio curve extends along the 0° vertical viewing axis a total of about 110° from about −55° to +55° horizontal. Furthermore, the 50:1 contrast ratio curve along the 0° vertical viewing axis extends from about −46° to +46°. These are significant improvements over the prior art.

FIG. 13 is a contrast ratio curve graph which used as parameters those described above with respect to FIG. 12 except that $V_{ON}$ was 6.0 volts. As can be seen in FIG. 13, by lowering the parameter $V_{ON}$, or driving voltage, the viewing zone is diminished vertically and is slightly shifted upward in the positive vertical viewing direction. However, when, in FIG. 13, the driving voltage is 6.0 volts, the 50:1 contrast ratio curve extends along the 0° vertical viewing axis to extents of about +55° horizontal.

Figure 14:
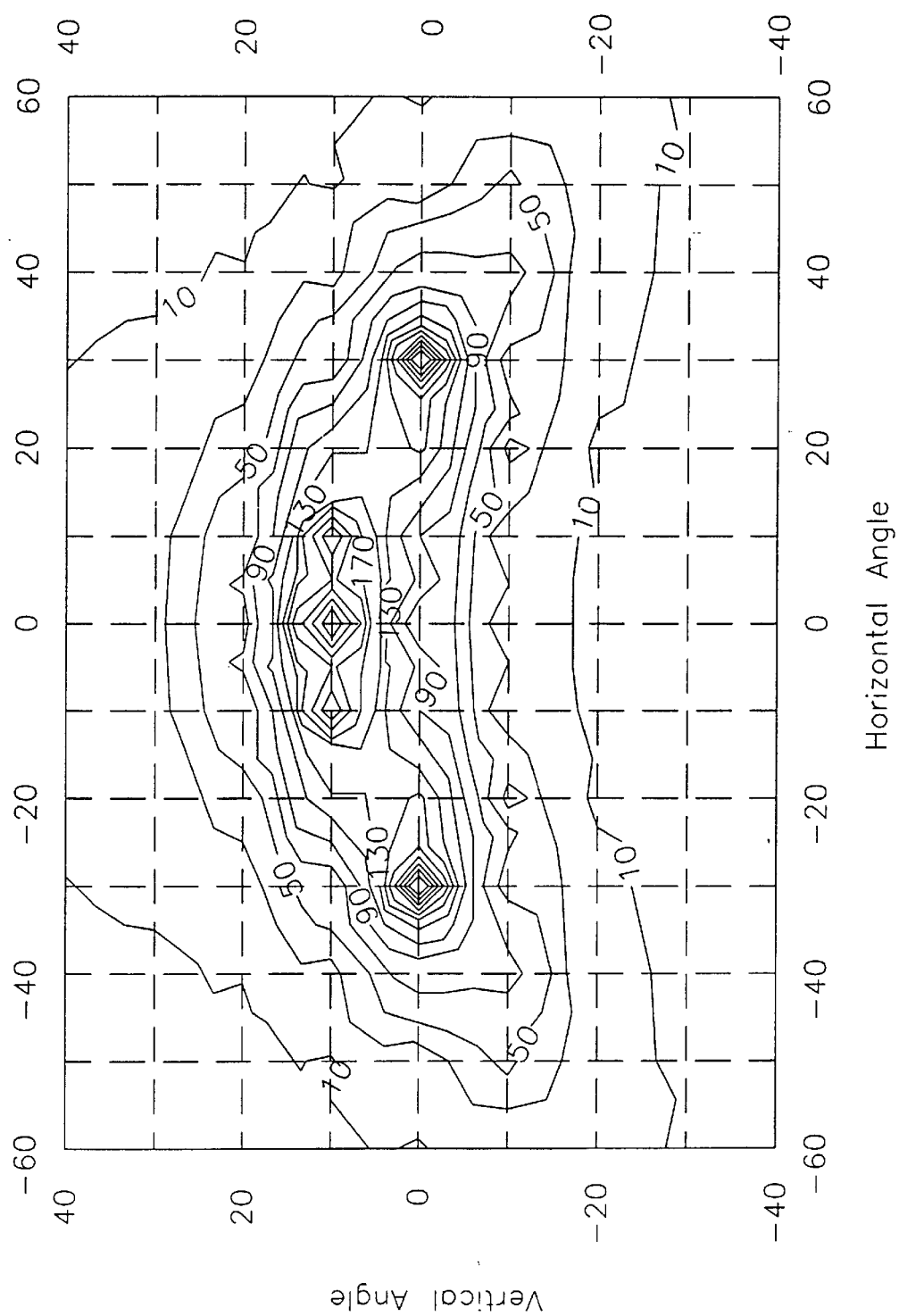
FIG. 14 is a computer simulation contrast ratio graph of a display according to the first embodiment of this invention when a green wavelength of 550 nm is used, 120 nm retarders are used, and 6.8 volts is applied across the liquid crystal material.
Figure 15:
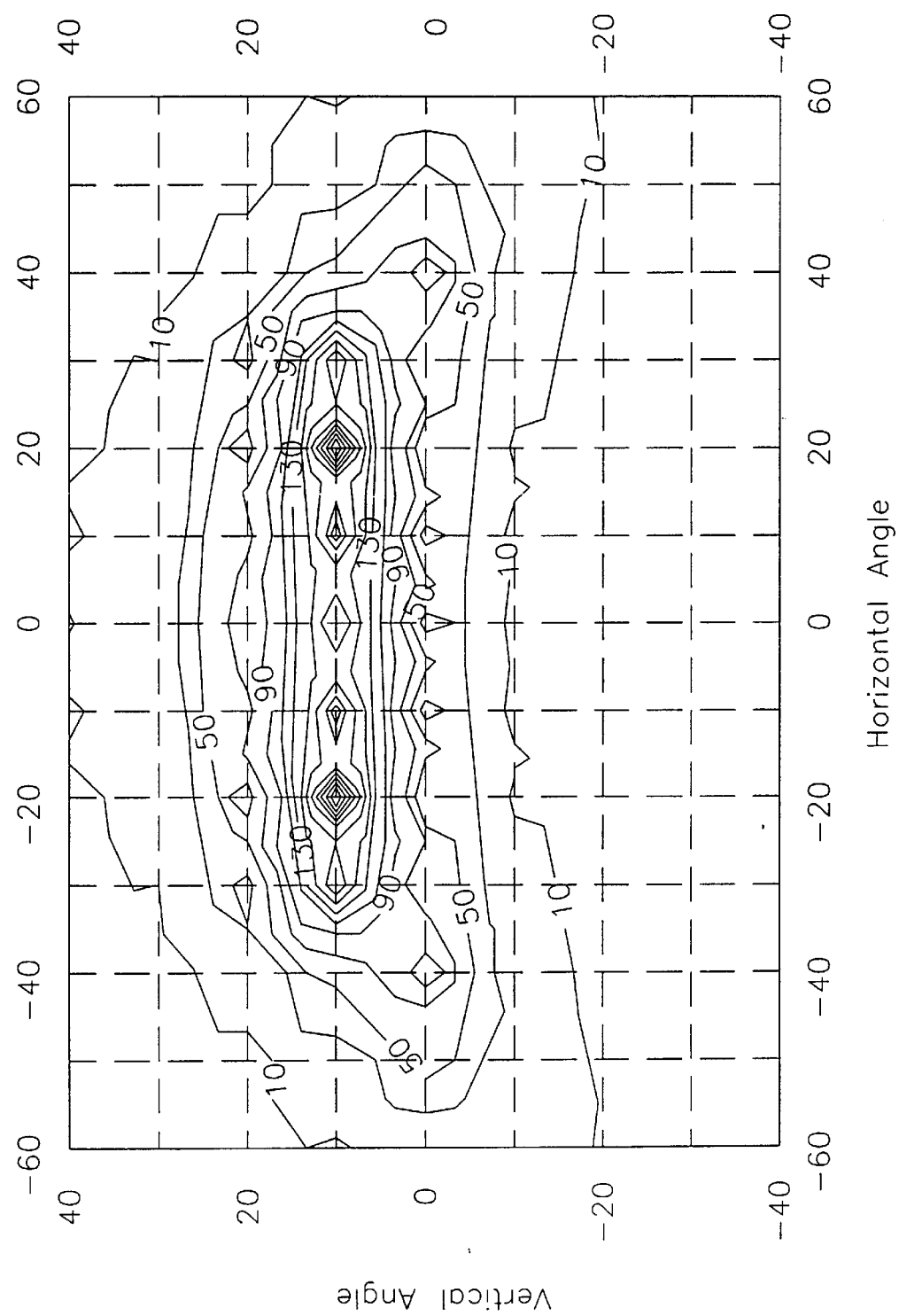
FIG. 15 is a computer simulation contrast ratio curve graph of the display according to the first embodiment of this invention using a green wavelength of 550 nm when 6.0 volts is applied across the liquid crystal material and 120 nm retarders are used.

FIGS. 14–15 are computer simulation contrast (or contour) ratio curve graphs utilizing the green wavelength of 550 nm in the display of the first embodiment of this invention. The cell gap "d" with respect to FIGS. 14–15 was 5.70 μm and the rear and front retardation films 3 and 7 had retardation values of 120 nm. FIG. 14 illustrates the case where $V_{ON}$ was 6.8 volts while FIG. 15 had a $V_{ON}$ of 6.0 volts. As shown in FIG. 14, the 50:1 contrast ratio curve extends horizontally along the 0° vertical viewing axis a total of about 90° from horizontal angles of about −45° to +45°. As can be seen in FIG. 15, by decreasing the driving voltage the viewing zone is constricted slightly vertically and is shifted upward to a position centered substantially above the 0° vertical viewing axis.

Figure 16:
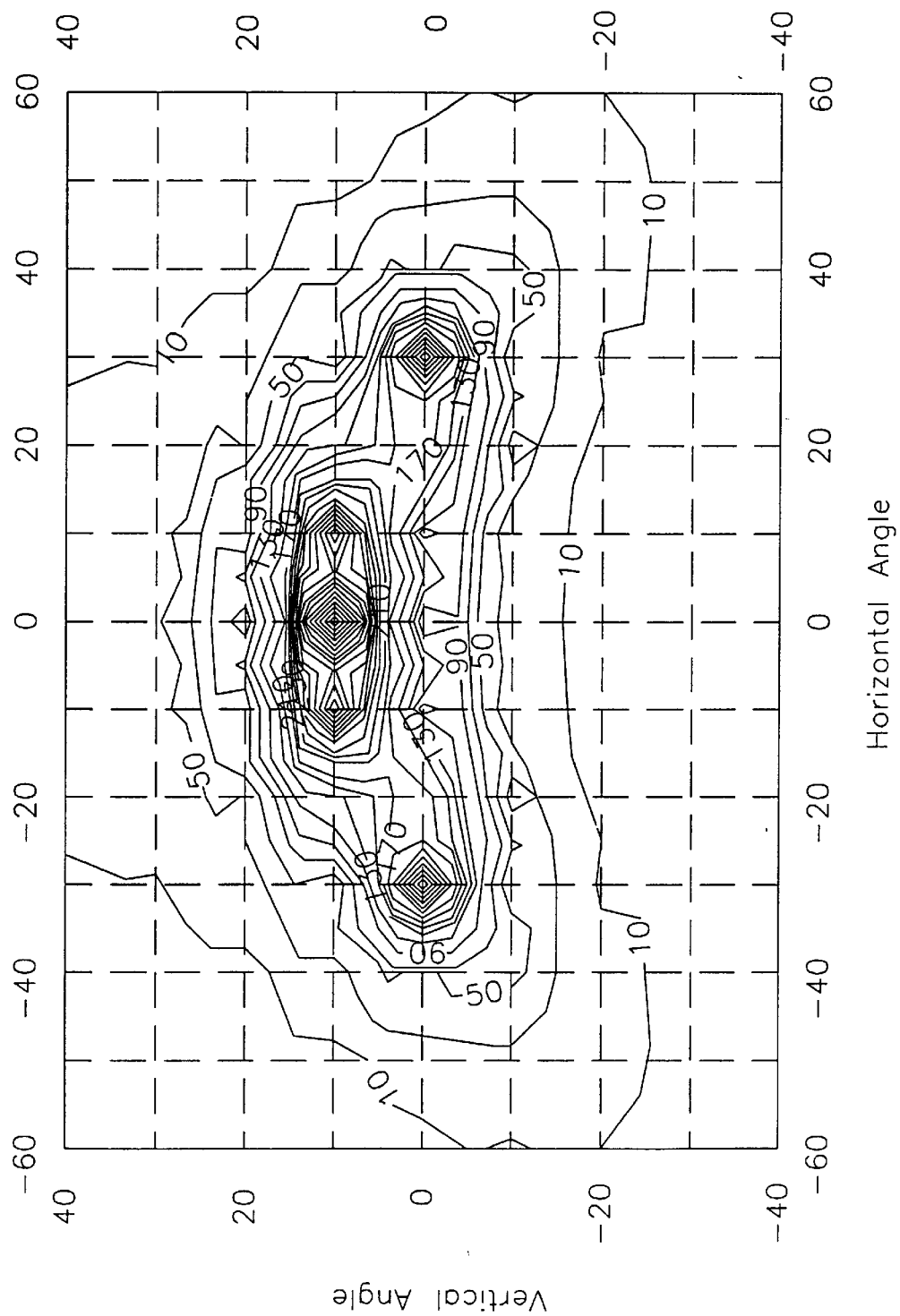
FIG. 16 is a computer simulation graph illustrating the contrast ratio curves of the display according to the first embodiment of this invention when a blue wavelength of 480 nm is used and 6.8 volts is is applied across the liquid crystal material the rear and front retardation films have retardation values of 120 nm.
Figure 17:
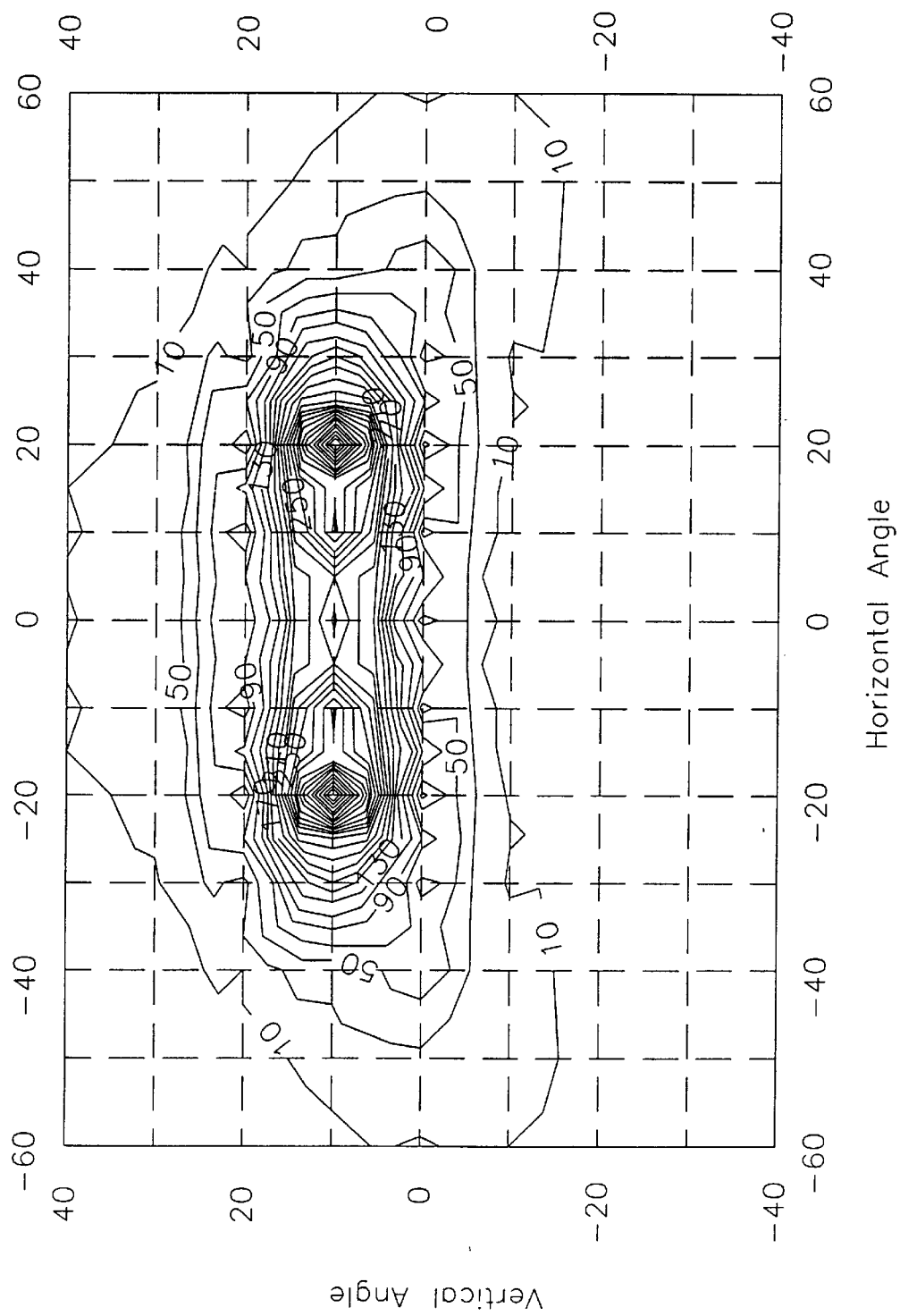
FIG. 17 is a computer simulation contrast ratio curve graph illustrating the contrast ratios of a display according to the first embodiment of this invention when a blue wavelength of 480 nm is used, 120 nm retarders are used, and 6.0 volts is applied across the liquid crystal material.

FIGS. 16–17 are computer simulation contrast ratio curves of the first embodiment of this invention when the blue wavelength of 480 nm was used and the rear and front retardation films had retardation values of 120 nm. In FIGS. 16–17, the cell gap was also 5.70 m. As was the case with respect to the red and green wavelengths, when $V_{ON}$ is decreased from 6.8 volts (FIG. 16) to 6.0 volts (FIG. 17), the viewing zone shifts upward substantially above the 0° vertical viewing axis and shrinks vertically with respect to the overall vertical angles covered by the 10:1 contrast ratio curve.

Figure 3:
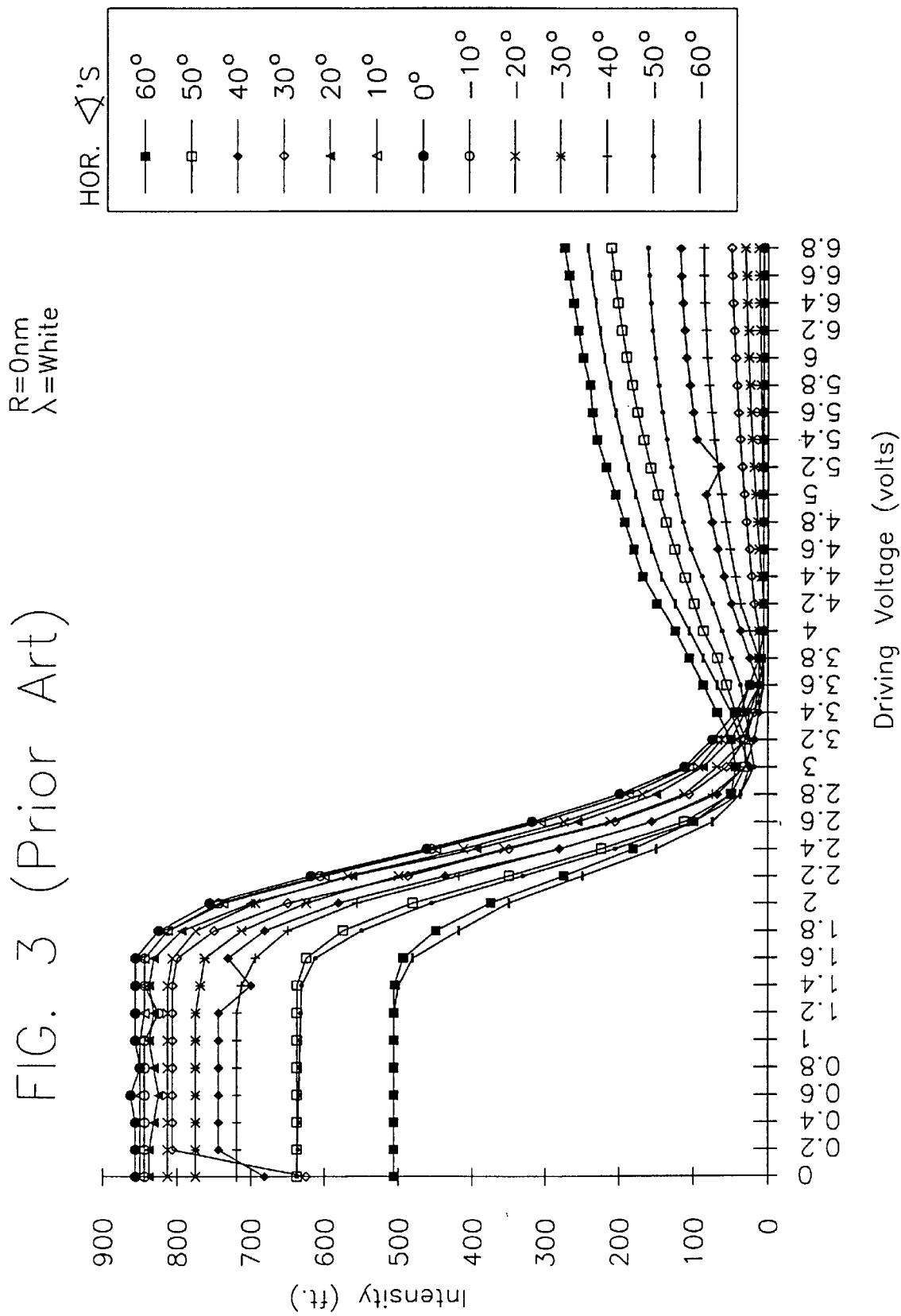
FIG. 3 is an intensity versus driving voltage plot of the prior art light valve of FIGS. 1 and 2. This plot or graph illustrates a fairly large inversion hump over a wide range of horizontal viewing angles at driving voltages of about 3.2 volts and greater.
Figure 18:
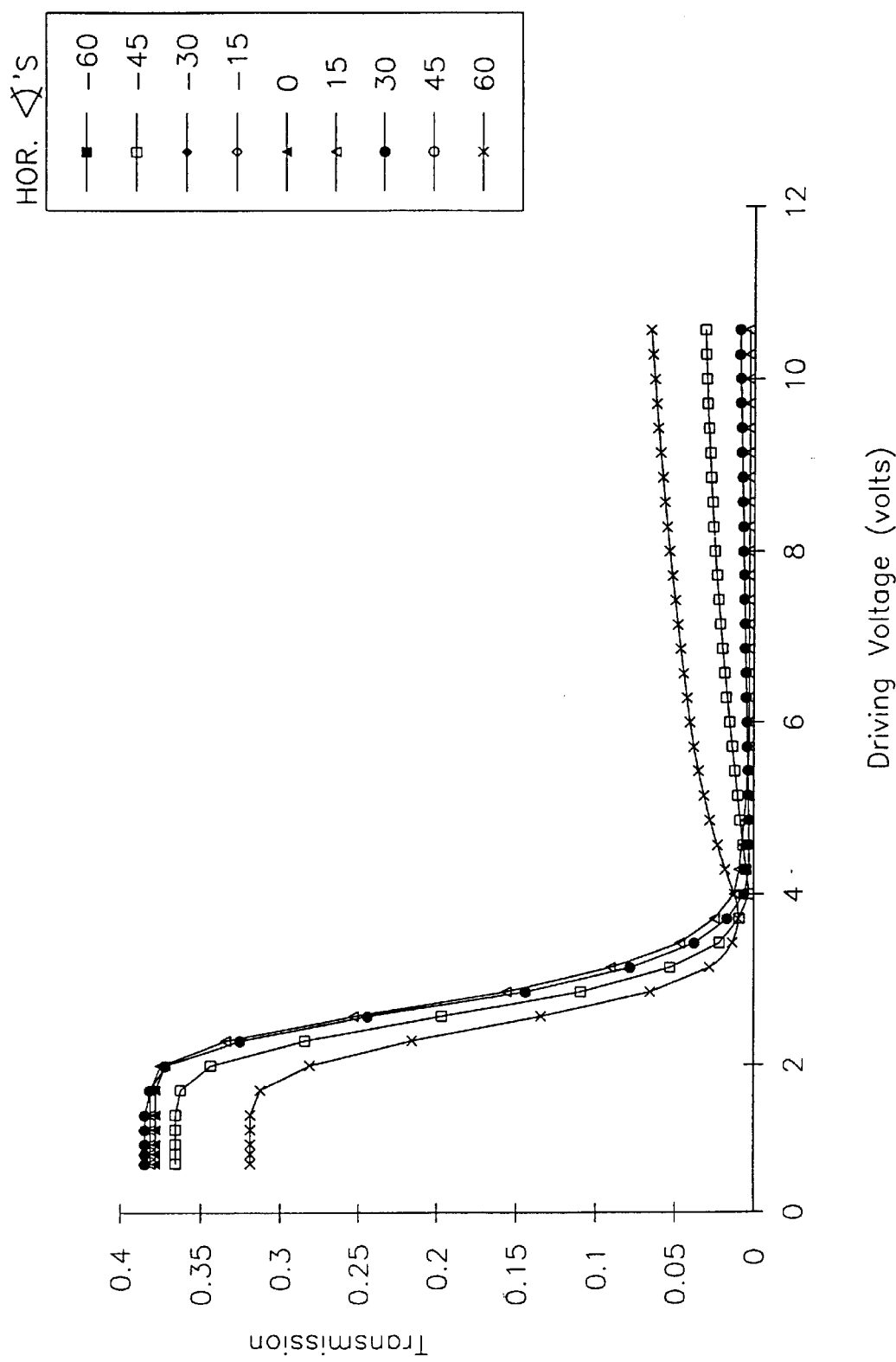
FIG. 18 is a computer simulation transmission versus driving voltage plot of horizontal viewing angles for the first embodiment of this invention when the rear and front retardation films have retardation values of 120 nm.

FIG. 18 is a driving voltage versus transmission graph illustrating the transmission at various driving voltages in a range of horizontal viewing angles (−60° to +60°) along the 0° vertical viewing axis. With the exception of the ±60° curves, there is substantially no effect of inversion upon these transmission versus driving voltage curves throughout the gray level driving voltage zones of about 2–6 volts. In other words, throughout the gray level driving voltage zones, when the driving voltage is increased, the transmission is decreased accordingly, thus, providing for good gray level performance along the 0° vertical viewing axis throughout the horizontal angles shown and defined in FIG. 18. One needs simply to compare the graph of FIG. 18 with the graph of prior art FIG. 3 to see that the arrangements of the optical parameters of the first embodiment of this invention decrease the effect of inversion upon various horizontal viewing angles and provide for an improved gray level performing NW liquid crystal display.

Figure 19:
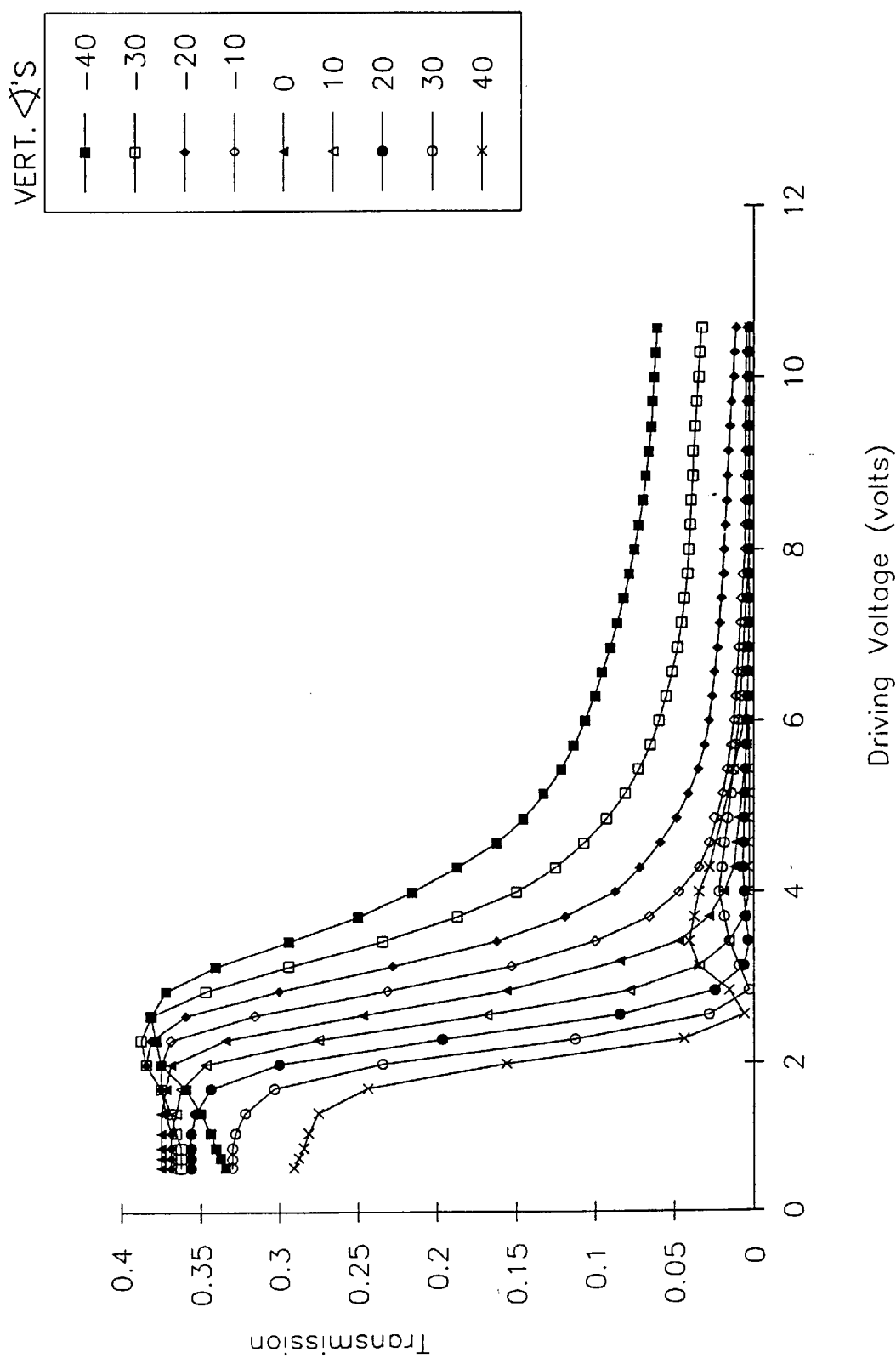
FIG. 19 is a computer simulation transmission versus driving voltage plot of vertical viewing angles for the first embodiment of this invention when the rear and front retardation films have retardation values of 120 nm using white light.

The curves of FIG. 19 representing different vertical viewing angles along the 0° horizontal viewing axis have transmission percentages which generally diminish with increases in driving voltage, possibly with the exception of the +40° vertical viewing angle. The effect of inversion is only seen with respect to the vertical viewing angles of +30° to +40°. In other words, throughout a wide range of gray level driving voltages, when the voltage is increased the transmission is decreased accordingly thus providing for excellent gray level performance throughout the vertical range. The cell gap in FIGS. 18–19 was 5.70 μm. It is noted that white light was used in plotting the driving voltage versus transmission curves of FIG. 18 and FIG. 3. The large inversion humps present in FIG. 3 do not appear in FIGS. 18–19, thus, illustrating an improvement of this embodiment over the prior art.

Figure 20:
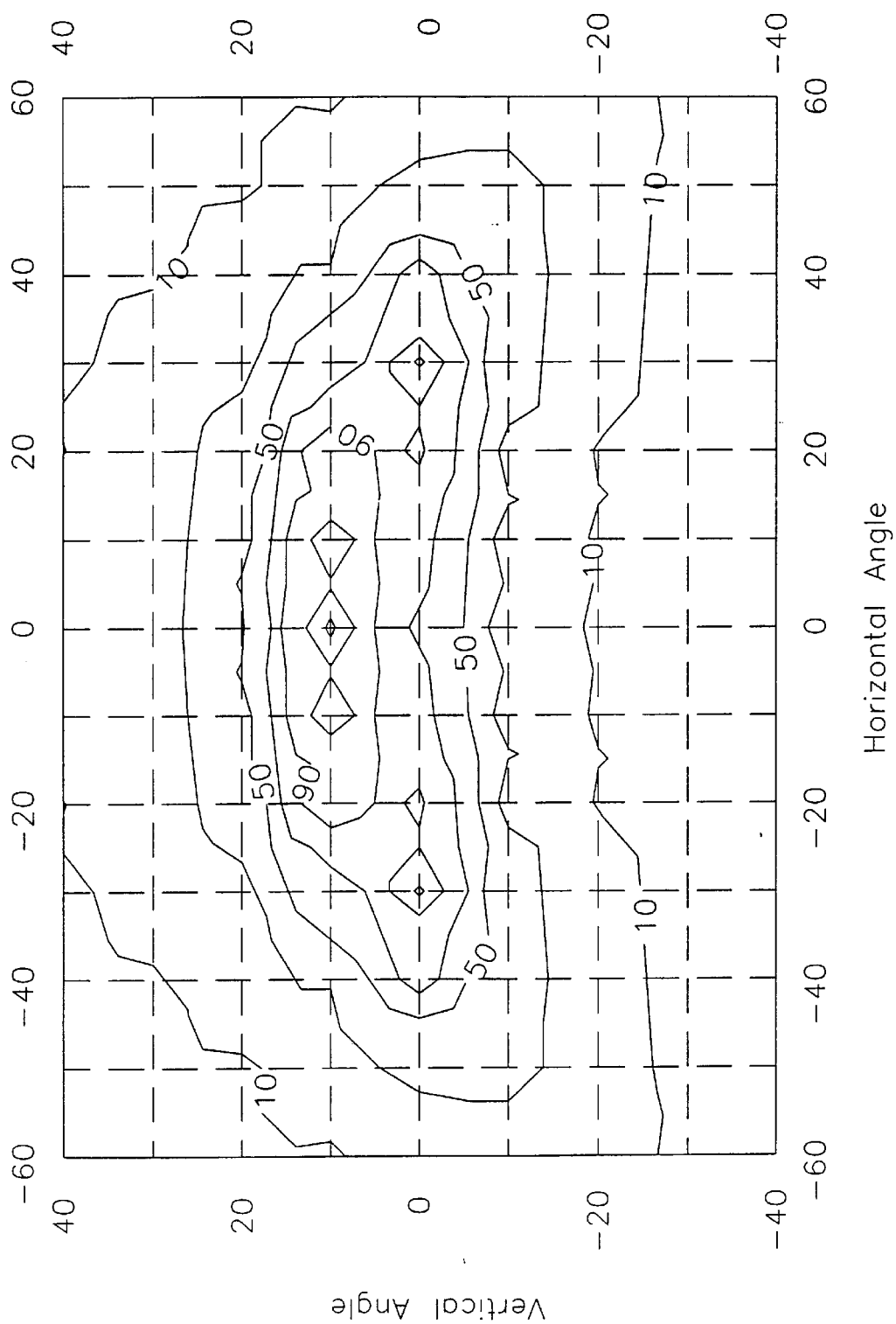
FIG. 20 is a computer simulation contrast ratio curve graph of the first embodiment of this invention when a red wavelength of 630 nm is used, 160 nm retarders are used, and 6.8 volts is applied across the liquid crystal material.
Figure 21:
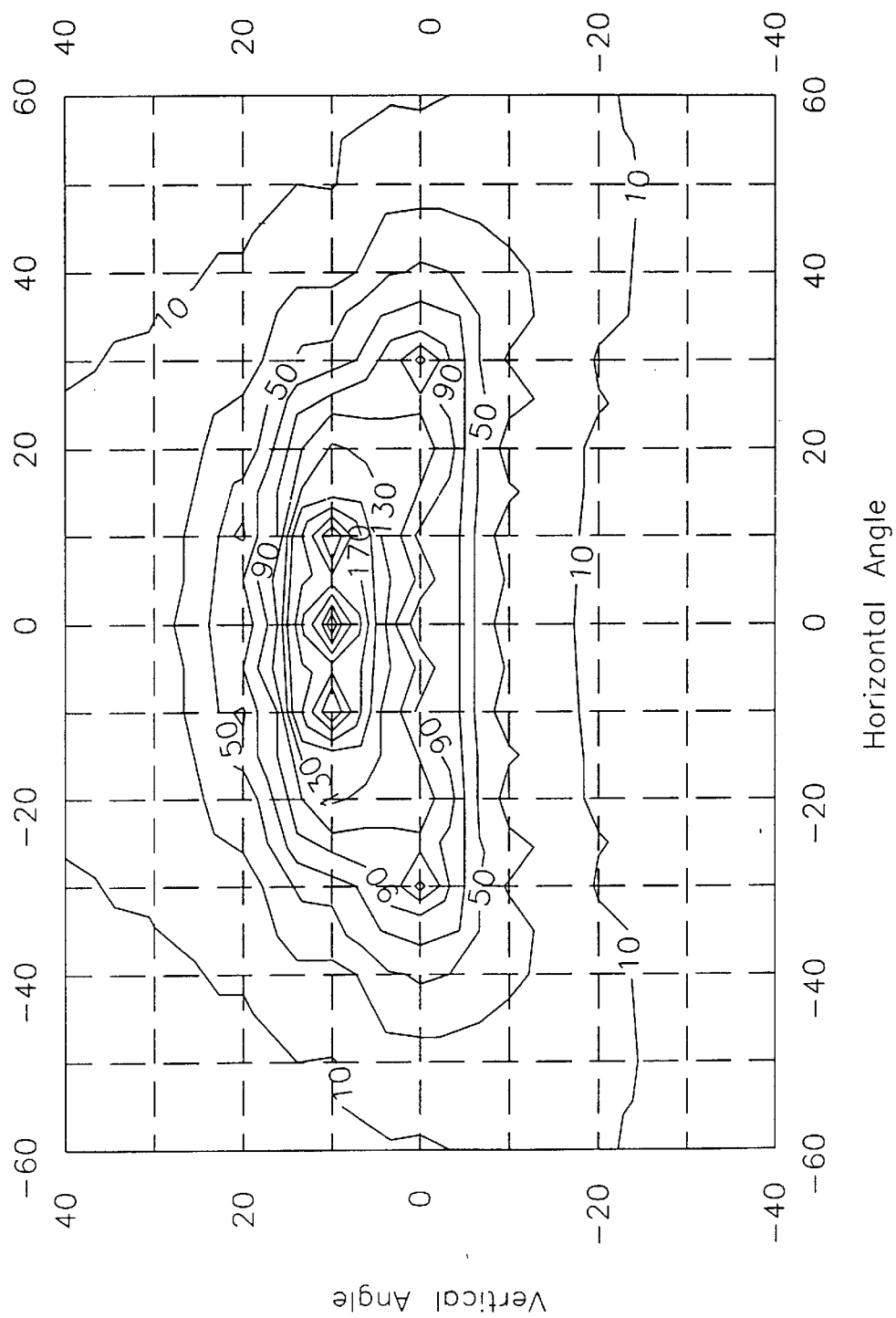
FIG. 21 is a computer simulation contrast ratio curve graph for the first embodiment of this invention when a green wavelength of 550 nm is used, 6.8 volts is applied across the liquid crystal material, and the rear and front retardation films have retardation values of 160 nm.
Figure 22:
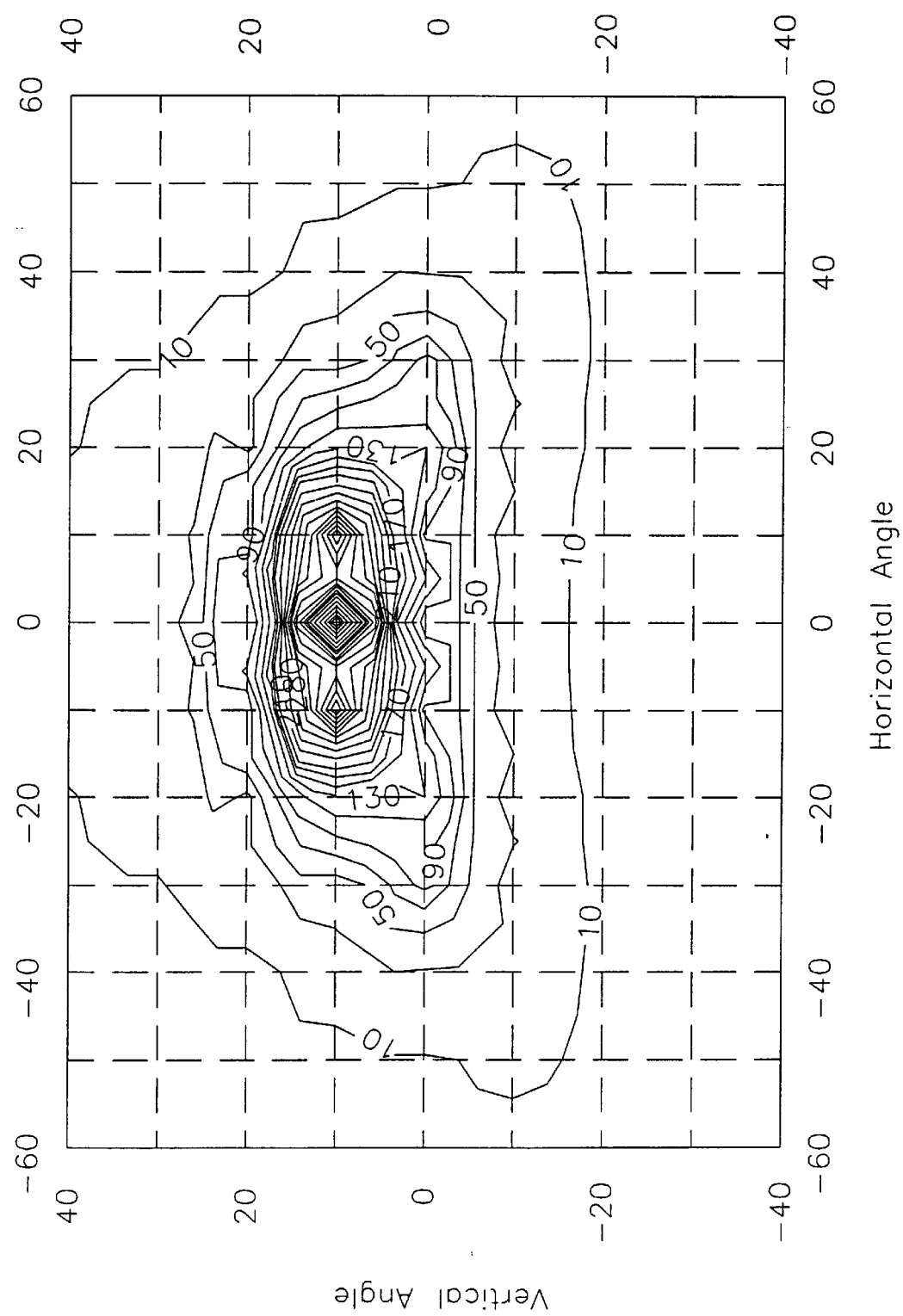
FIG. 22 is a computer simulation contrast ratio curve graph of the first embodiment of this invention when a blue wavelength of 480 nm is used, 6.8 volts is applied across the liquid crystal material, and the rear and front retardation films have retardation values of 160 nm.

FIGS. 20–22 are computer simulation contrast ratio curve graphs of the first embodiment of this invention when the rear and front retardation films 3 and 7 had retardation values of 160 nm, $V_{ON}$ was 6.8 volts, and the cell gap "d" was 5.70 μm.

FIG. 20 illustrates the case where the red wavelength of 630 nm was used. In comparing the case where the LCD of the first embodiment utilized 160 nm retardation films (FIG. 20) with the case where 120 nm retardation films (FIG. 12) were used, the difference is that when rear and front retardation values of 120 nm were used the contrast ratios extended to further extents in both the horizontal and vertical directions. For example, with respect to the red wavelength of 630 nm shown in FIG. 12 (120 nm retardation films) and FIG. 20 (160 nm retardation films) the 50:1 contrast ratio curve in FIG. 12 extended horizontally a total of about 110° from about −55° horizontal to about +55° horizontal, while in contrast to this, 50:1 contrast ratio curve in the 160 nm case (FIG. 20) extended horizontally to angles of about ±45°. However, the boomerang shape of the viewing zone shown in FIG. 12 was substantially eliminated when the 160 nm retardation films were used as shown in FIG. 20. Also, the 30:1 contrast ratio curve in FIG. 20 extended in some places to extents further than that of the 30:1 curve of FIG. 12. In sum, both cases, one with retardation films of 120 nm and the other with retardation films of 160 nm, exhibited excellent results in that their respective viewing zones extended to large horizontal and vertical viewing angles.

FIG. 21 illustrates the case where the green wavelength of 550 nm was used in the first embodiment of this invention and the rear and front retardation films 3 and 7 had retardation values of 160 nm. This graph shows that the use of 160 nm retardation films in the first embodiment of this invention provided a viewing zone which extended to large viewing angles in both the horizontal and vertical directions.

FIG. 22 illustrates the case where the blue wavelength of 480 nm was used in combination with 160 nm retardation films. In the cases where 160 nm retardation films were used, the viewing zones were diminished slightly with respect to the 120 nm cases, however, the contrast ratio curves are still excellent.

Figure 23:
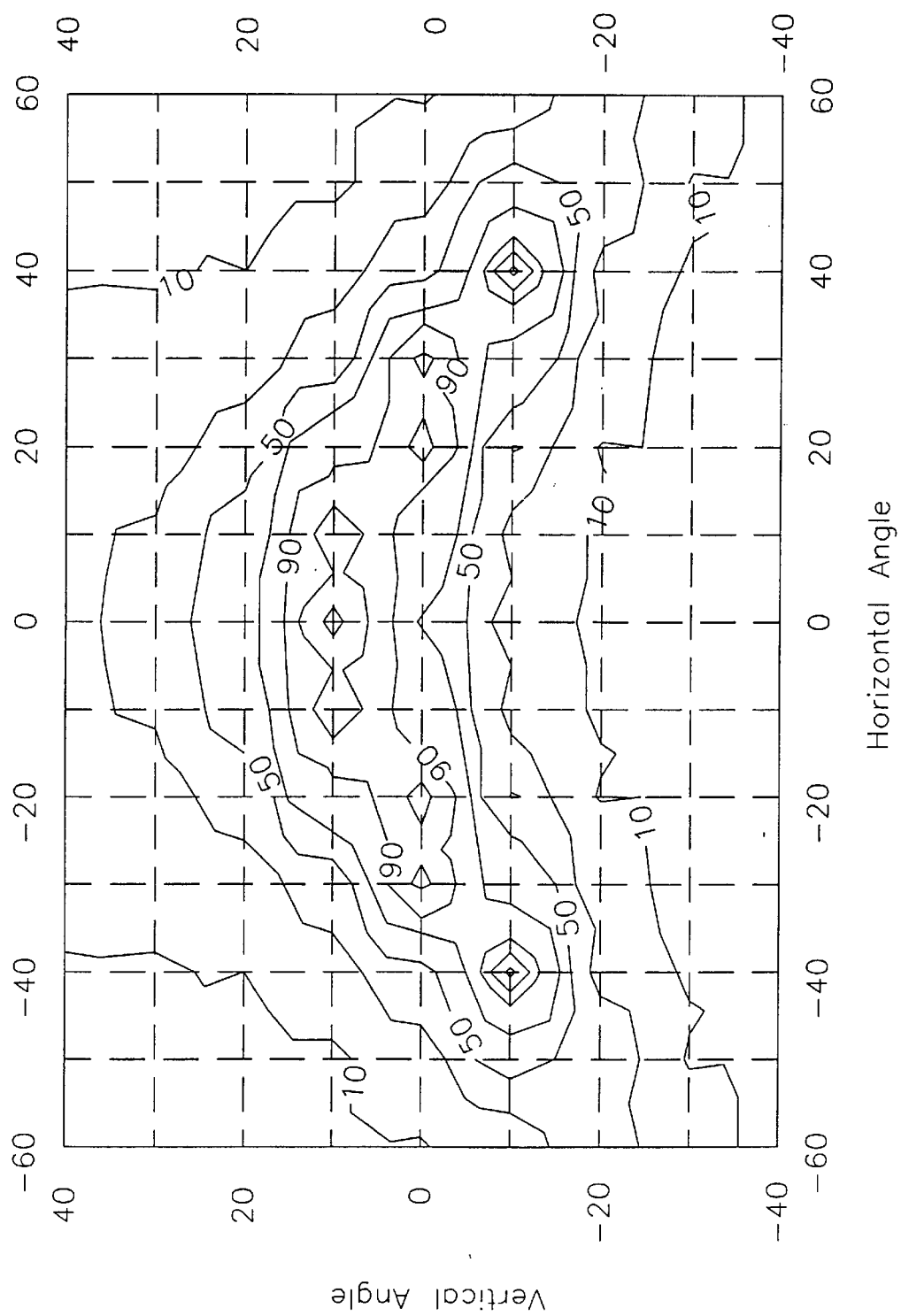
FIG. 23 is a computer simulation contrast ratio curve graph for the first embodiment of this invention when a red wavelength of 630 nm is used, 6.8 volts is applied across the liquid crystal material, and the front and rear retardation films have retardation values of 80 nm.
Figure 24:
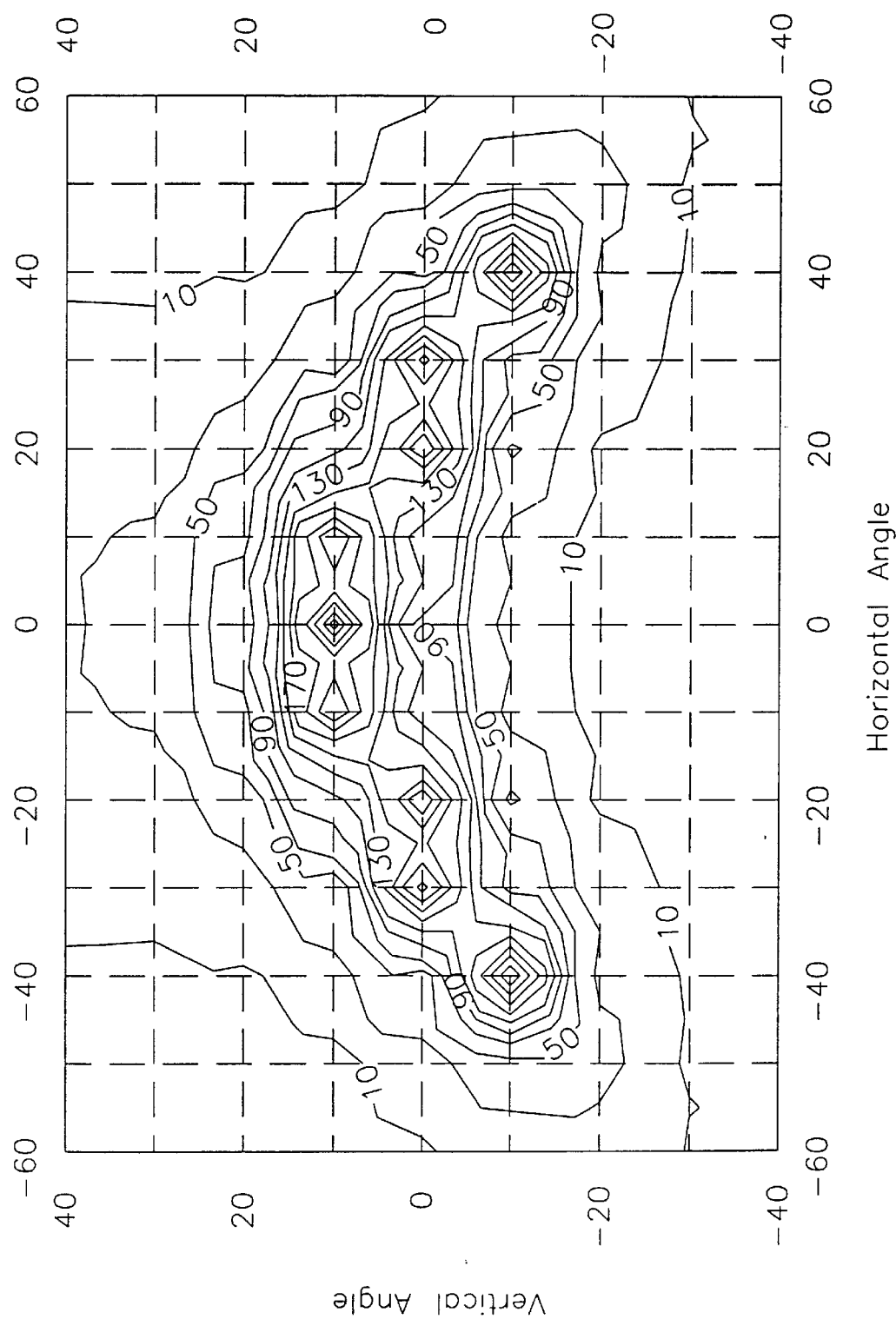
FIG. 24 is a computer simulation contrast ratio curve graph for the first embodiment of this invention when a green wavelength of 550 nm is used, 6.8 volts is applied across the liquid crystal material, and the rear and front retardation films have retardation values of 80 nm.
Figure 25:
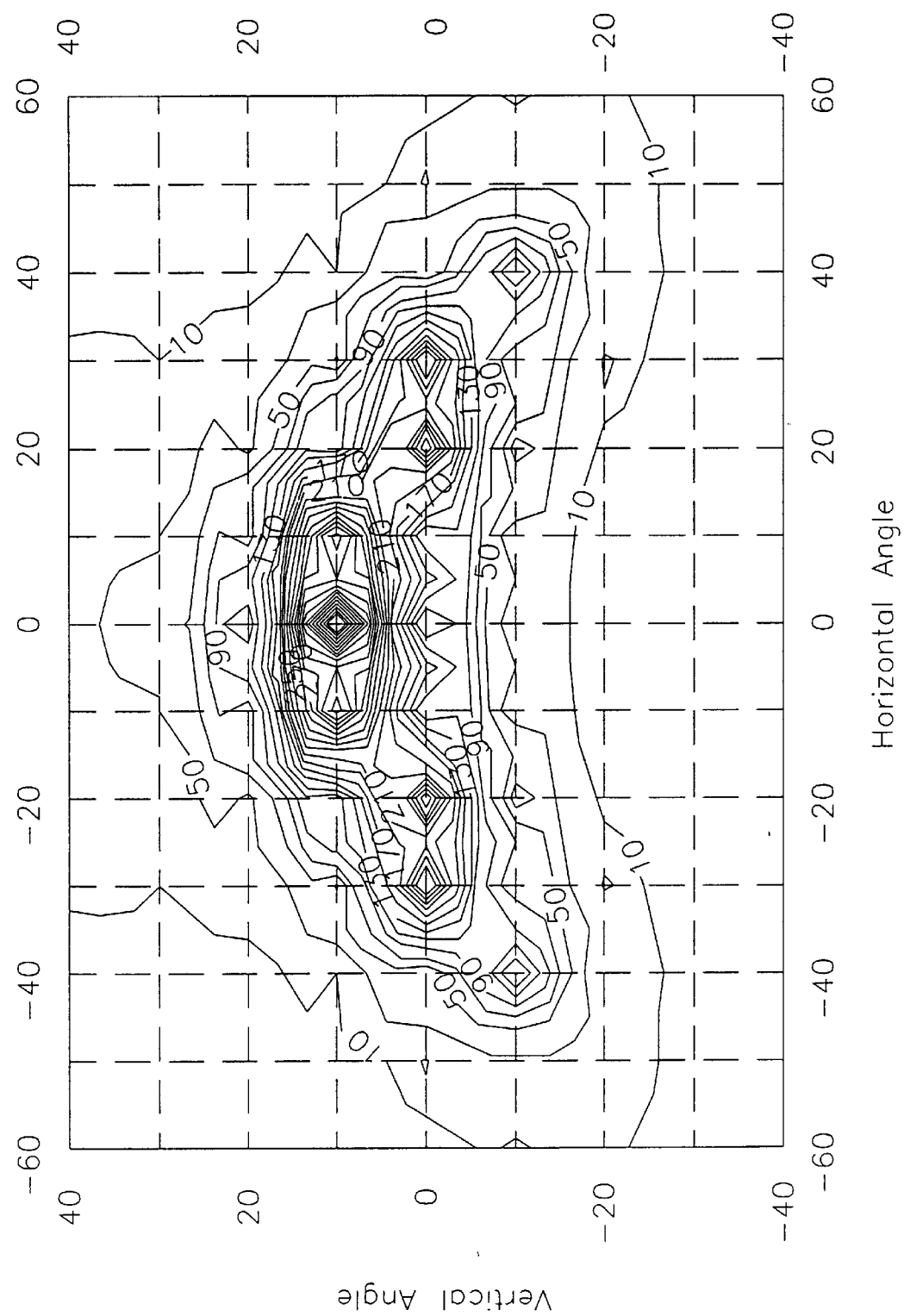
FIG. 25 is a computer simulation contrast ratio curve graph of the first embodiment to this invention when a blue wavelength of 480 nm is used, 6.8 volts is applied across the liquid crystal material, and the rear and front retardation films have retardation values of 80 nm.

FIGS. 23–25 are computer simulation contrast ratio curve graphs of the first embodiment of this invention when the rear and front retardation films 3 and 7 had retardation values of 80 nm, $V_{ON}$ was 6.8 volts, and the cell gap "d" was 5.70 m. FIG. 23 illustrates the case where a red wavelength of 630 nm was used. FIG. 24 illustrates the case where the green wavelength of 550 nm was used, and FIG. 25 illustrates the case where the blue wavelength of 480 nm was used. FIGS. 23–25 all represent excellent contrast ratio curves for the first embodiment of this invention when retardation values of 80 nm were used. The displays of FIGS. 12–25 all utilized uniaxial positively birefringent retardation films.

This invention will now be described with respect to certain examples as follows:

EXAMPLE 1

In this first example, an "X-buffed" light valve having a cell gap "d" of 5.86 μm and a liquid crystal birefringence (ΔN) of 0.084 at room temperature was manufactured and tested as follows. The liquid crystal material used is available commercially from E. Merck Ltd. or its U.S. representative EM Industries, Inc., Hawthorne, N.Y. as Model No. ZLI4718. Data resulting from the light valve of this example is illustrated in FIGS. 26–30.

The light valve pixel of this example was similar to the first embodiment of this invention in that the rear linear polarizer had a transmission axis direction about parallel to the optical axis of the rear retardation film, and the optical axis of the front retardation film was about parallel to the transmission axis of the front or exit linear polarizer. The orientation or buffing direction of the rear orientation film was approximately perpendicular to the optical axis of the rear retardation film, and was approximately parallel to the optical axis of the front retardation film. The optical axes of the rear and front retardation films defined an angle δ of about 90° therebetween. The orientation direction of the front orientation film was approximately parallel to the direction of the optical axis of the rear retardation film, and was substantially perpendicular to the direction of the rear orientation film. White light (RGB tri-peaked) was used when testing the light valve of this example (see FIGS. 26–30). The rear and front retardation films were of the uniaxial type and had positive birefringent values. Also, the rear and front retardation films both had retardation values of 120 nm. The temperature was about 35°–40° C.

Figure 1:
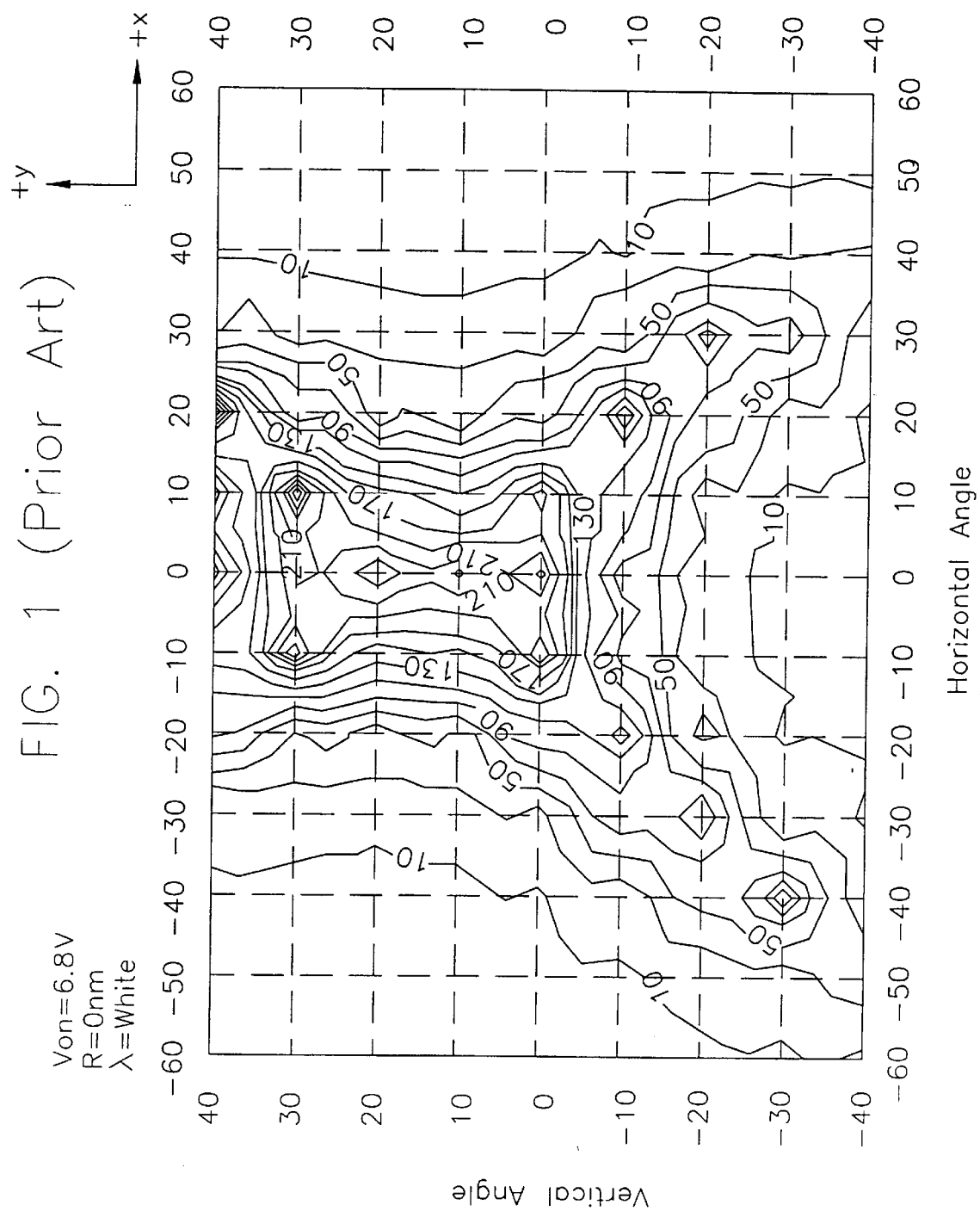
FIG. 1 is a contrast ratio graph utilizing white light for a light valve liquid crystal pixel with a voltage of 6.8 volts applied thereto.
Figure 2:
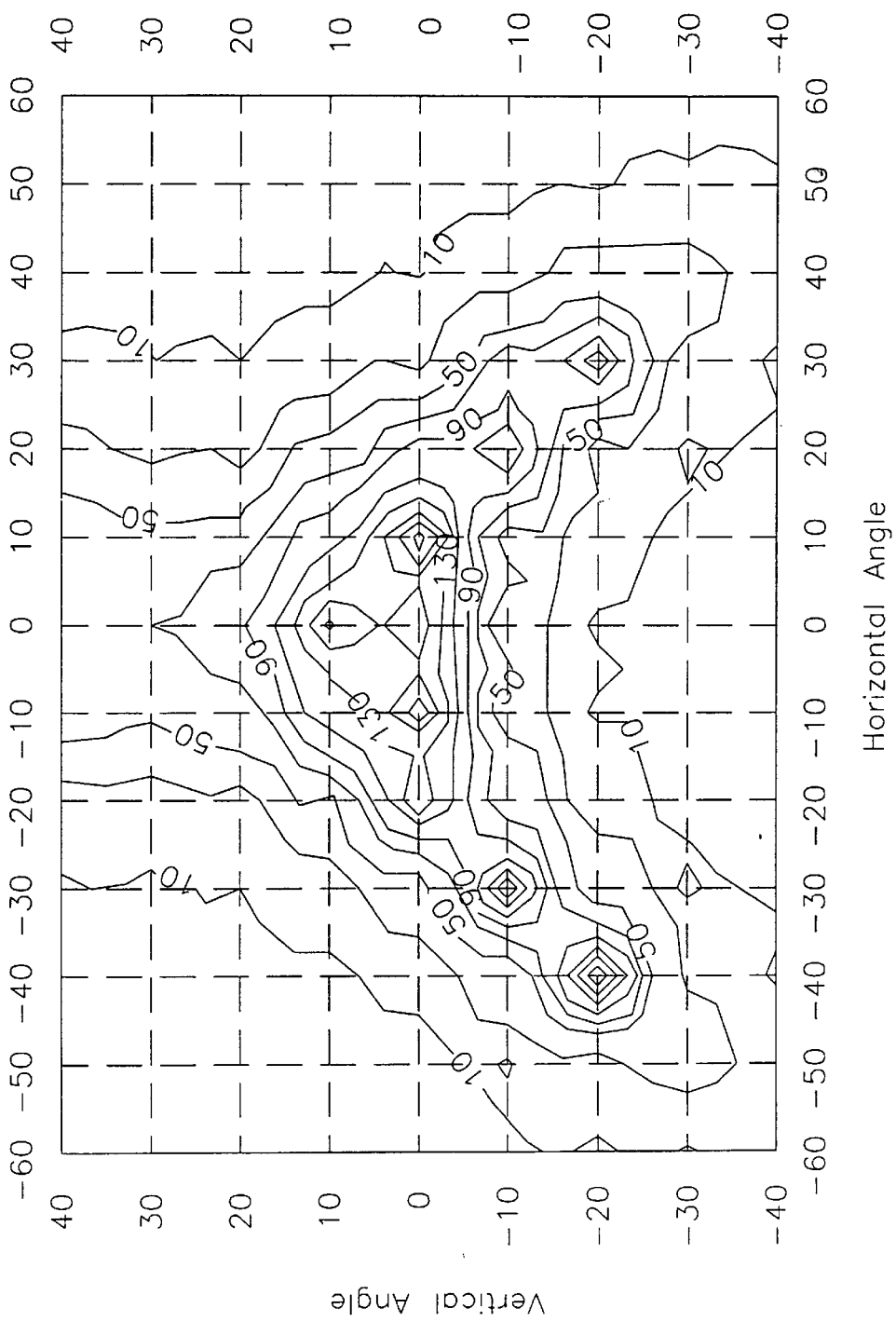
FIG. 2 is a contrast ratio curve graph using white light in the prior art light valve of FIG. 1.
Figure 26:
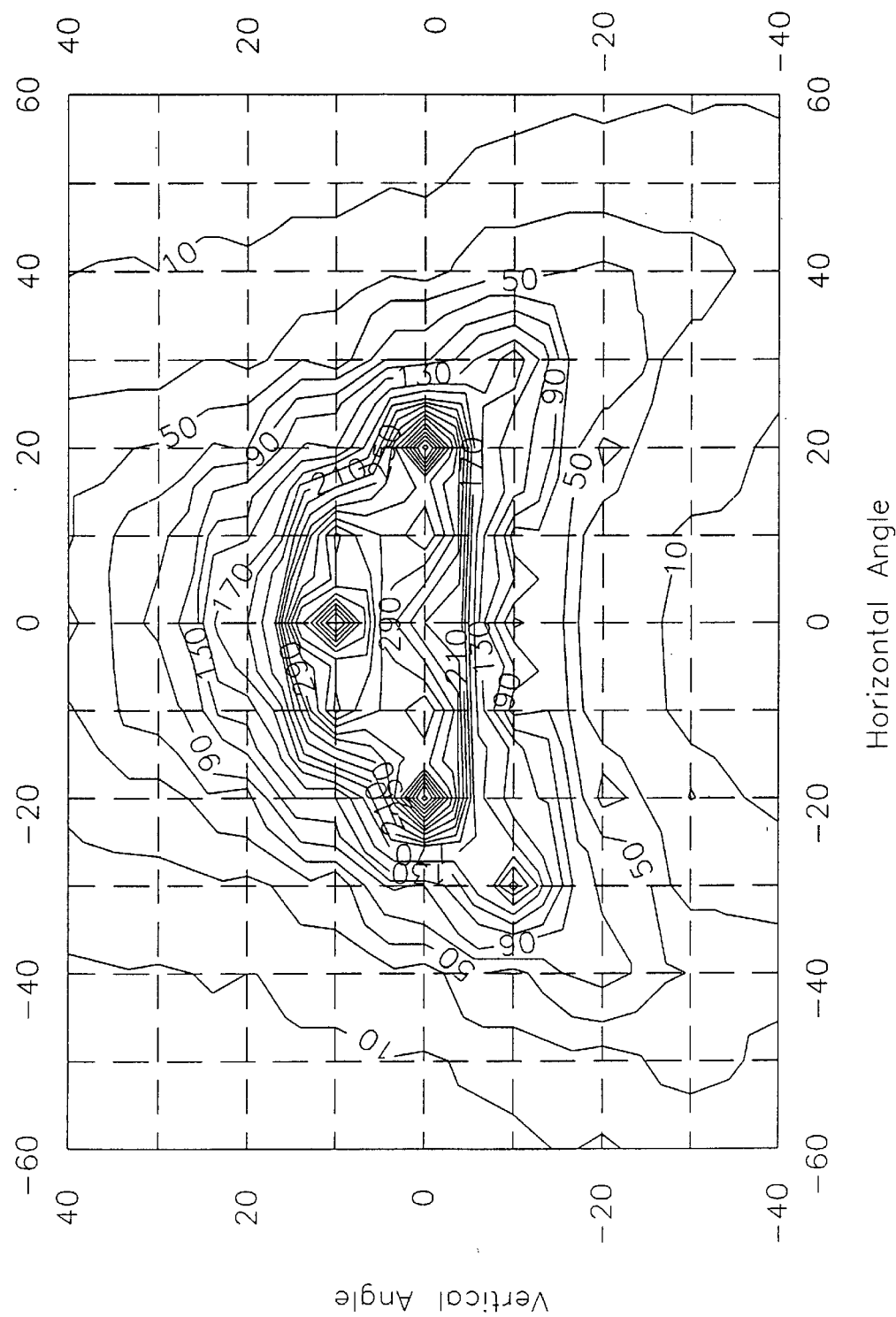
FIG. 26 is a white light measured contrast ratio curve graph of a light valve according to the first embodiment of this invention which utilized uniaxial and positively birefringent rear and front retardation values of 120 nm, and 6.8 volts was applied to the light valve.

FIG. 26 illustrates the experimental data when the driving voltage $V_{ON}$ was 6.8 volts and $V_{OFF}$ was 0.2 volts for this example. As can be seen, the 10:1 contrast ratio curve extends horizontally along the 0° vertical viewing axis to about ±50° horizontal thereby defining a total horizontal viewing range along the 0° vertical viewing axis of about 100°. This 100° range is to be compared with the about 77° range shown in prior art FIG. 1, and the about 65° horizontal range shown in prior art FIG. 5D. In other words, the 10:1 contrast ratio curve of this example at 6.8 volts is substantially improved over displays and light valves of the prior art. In this respect, it is also to be noted that the 50:1 contrast ratio curve shown in FIG. 26 extends along the 0° vertical viewing axis a substantial distance, i.e. over a total angular span of about 75°.

Figure 27:
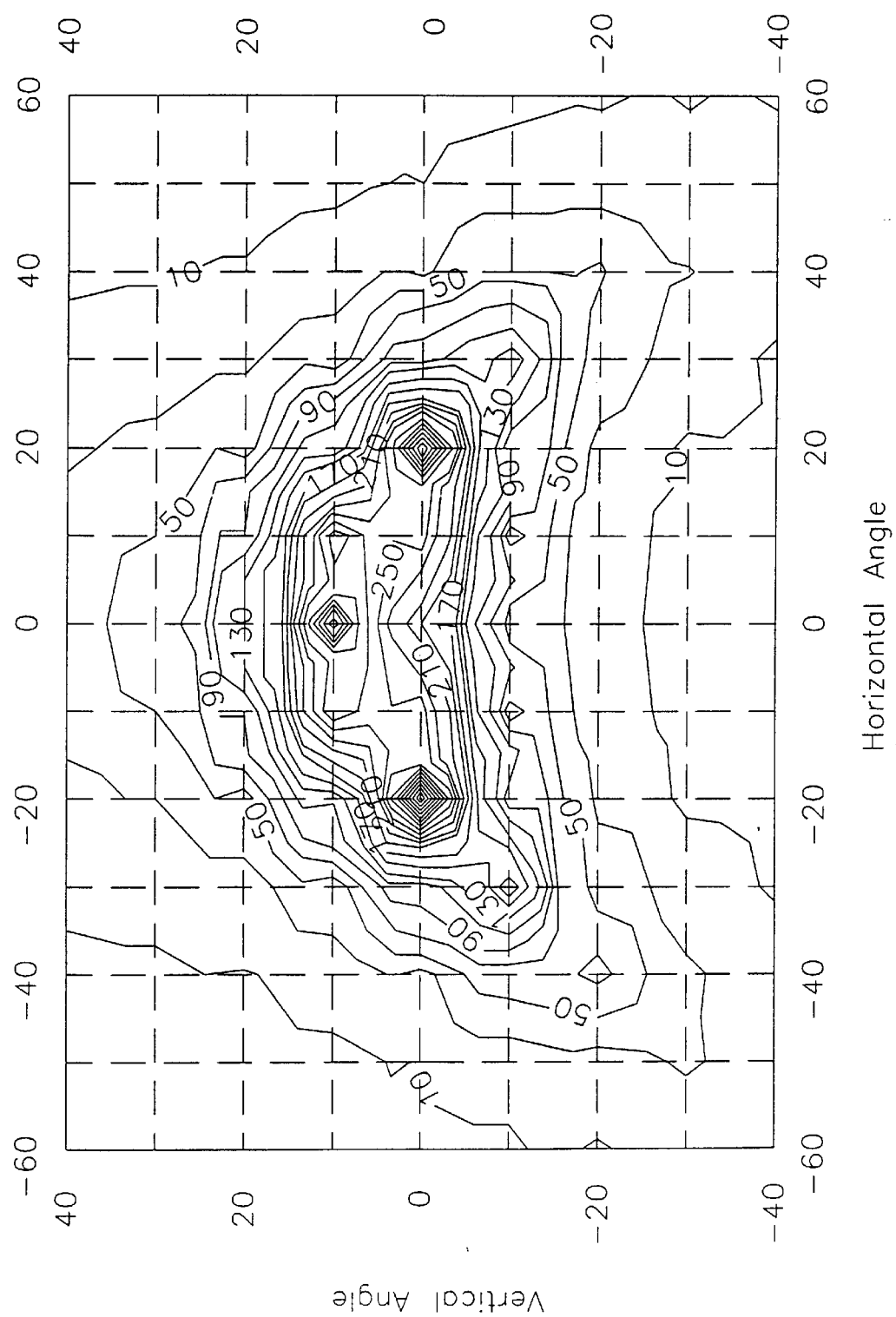
FIG. 27 is a white light measured contrast ratio curve graph of the light valve of FIG. 26 when 6.0 volts was applied to the light valve and uniaxial and positively birefringent rear and front 120 nm retarders were used.

FIG. 27 illustrates the case where $V_{ON}$ was 6.0 volts for the normally white light valve of this first example. When $V_{ON}$ is decreased from 6.8 volts to 6.0 volts, a more realistic $V_{ON}$ was applied to the pixel and the 10:1 contrast ratio curve extended horizontally slightly further than that shown in FIG. 26.

Figure 28:
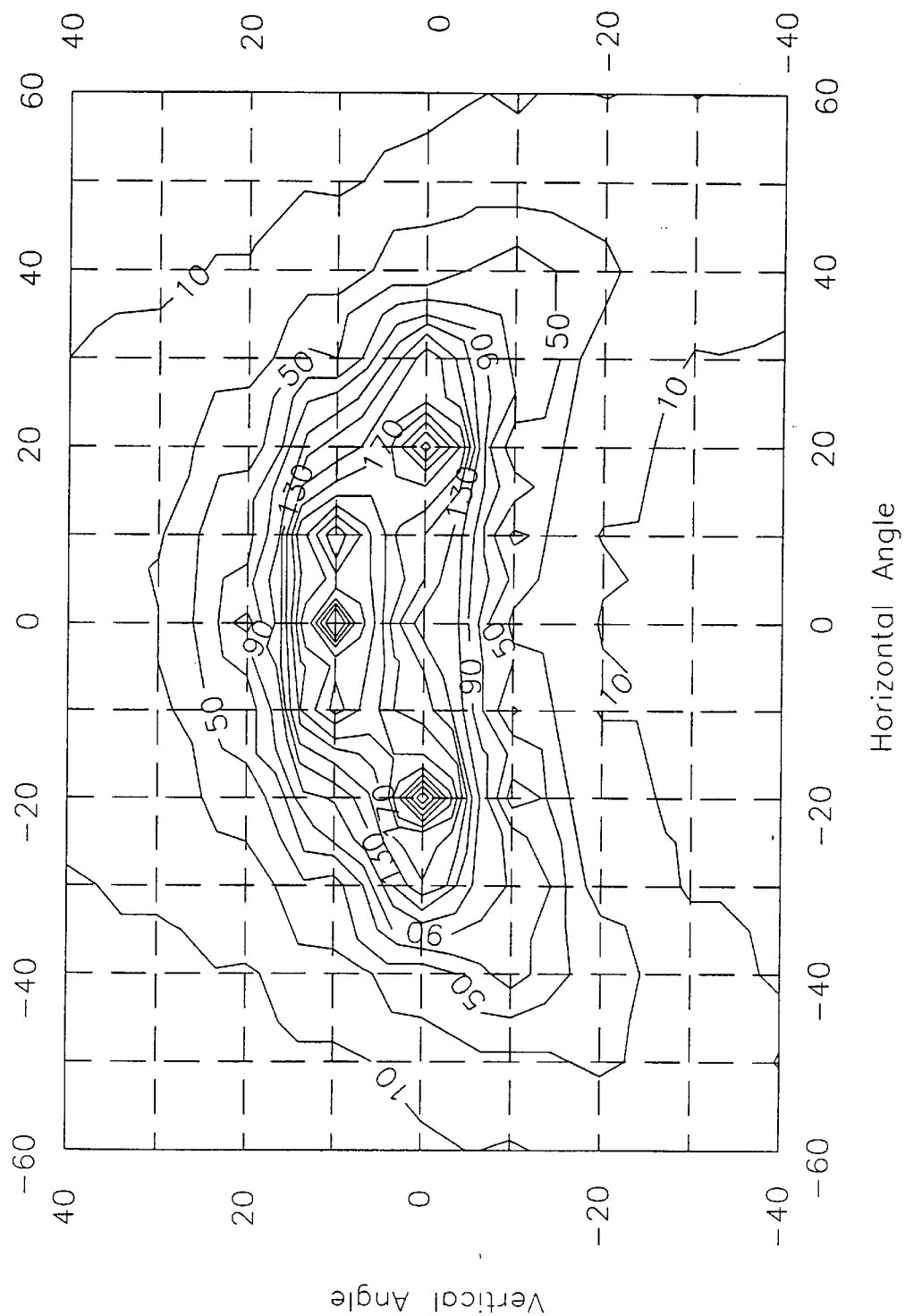
FIG. 28 is a white light measured contrast ratio curve graph of the light valve of FIG. 26 when 5.0 volts was applied thereto, and uniaxial and positively birefringent rear and front 120 nm retarders were used.

FIG. 28 illustrates the case where $V_{ON}$ was decreased to 5.0 volts for the light valve of this first example. In the case where 5.0 volts was applied to the pixel, the 10:1 contrast ratio curve defines a range of about 112° along the 0° vertical viewing axis. This is significantly greater than the range defined by the 10:1 contrast ratio curves of the prior art described and illustrated herein.

Figure 29:
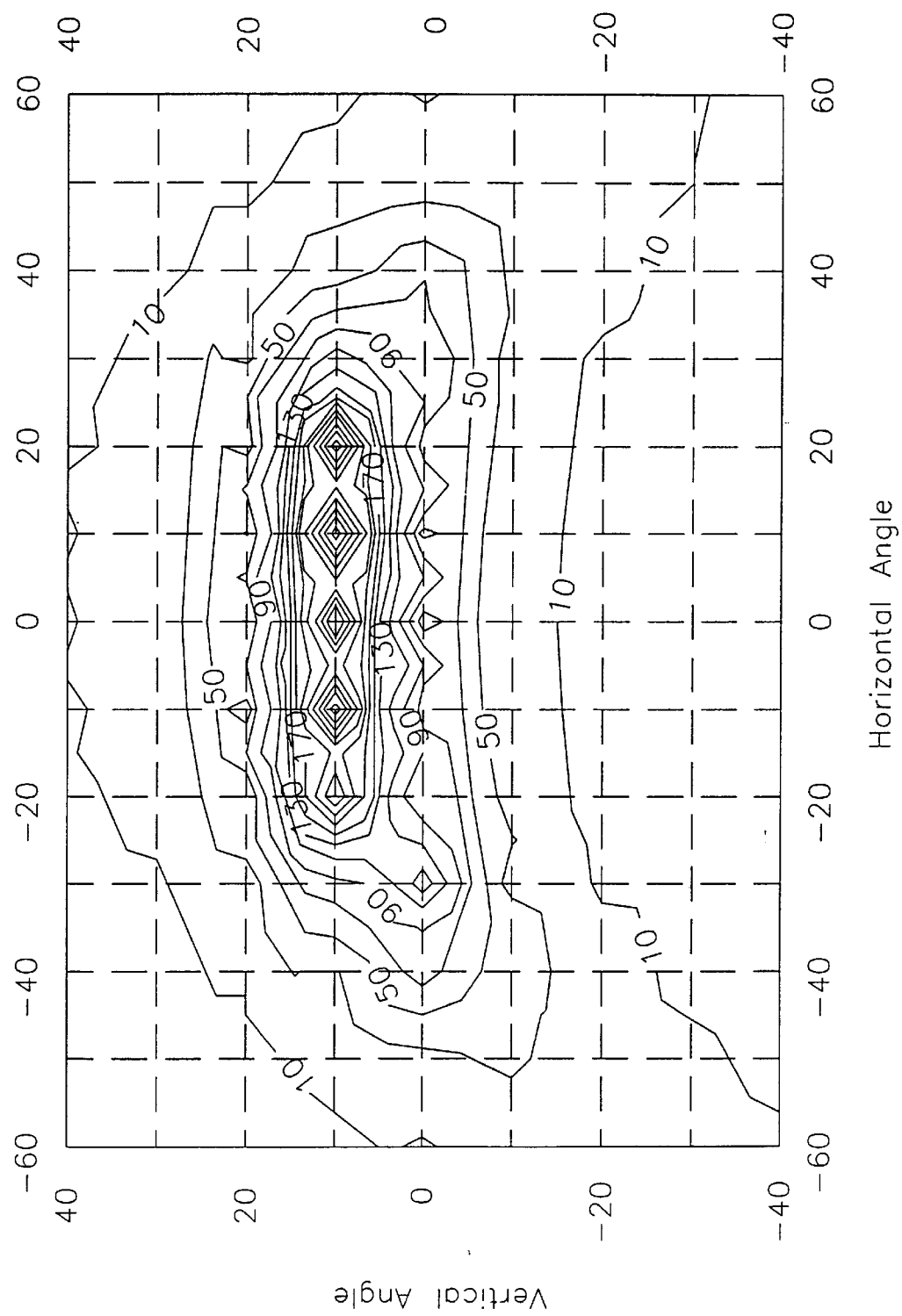
FIG. 29 is a white light measured contrast ratio curve graph of the light valve of FIG. 26 when 4.0 volts was applied thereto, and uniaxial and positively birefringent rear and front 120 nm retardation values were used.

FIG. 29 illustrates the case where $V_{ON}$ was 4.0 volts for the light valve of this first example. When 4.0 volts was applied to the pixel the 10:1 contrast ratio curve substantially extends off the graph in both horizontal directions. However, when the voltage is decreased, as is the case in FIG. 29, the viewing zone shrinks vertically and is shifted slightly upward, a condition generally true with regard to each of the illustrated decreases in voltage.

Figure 30:
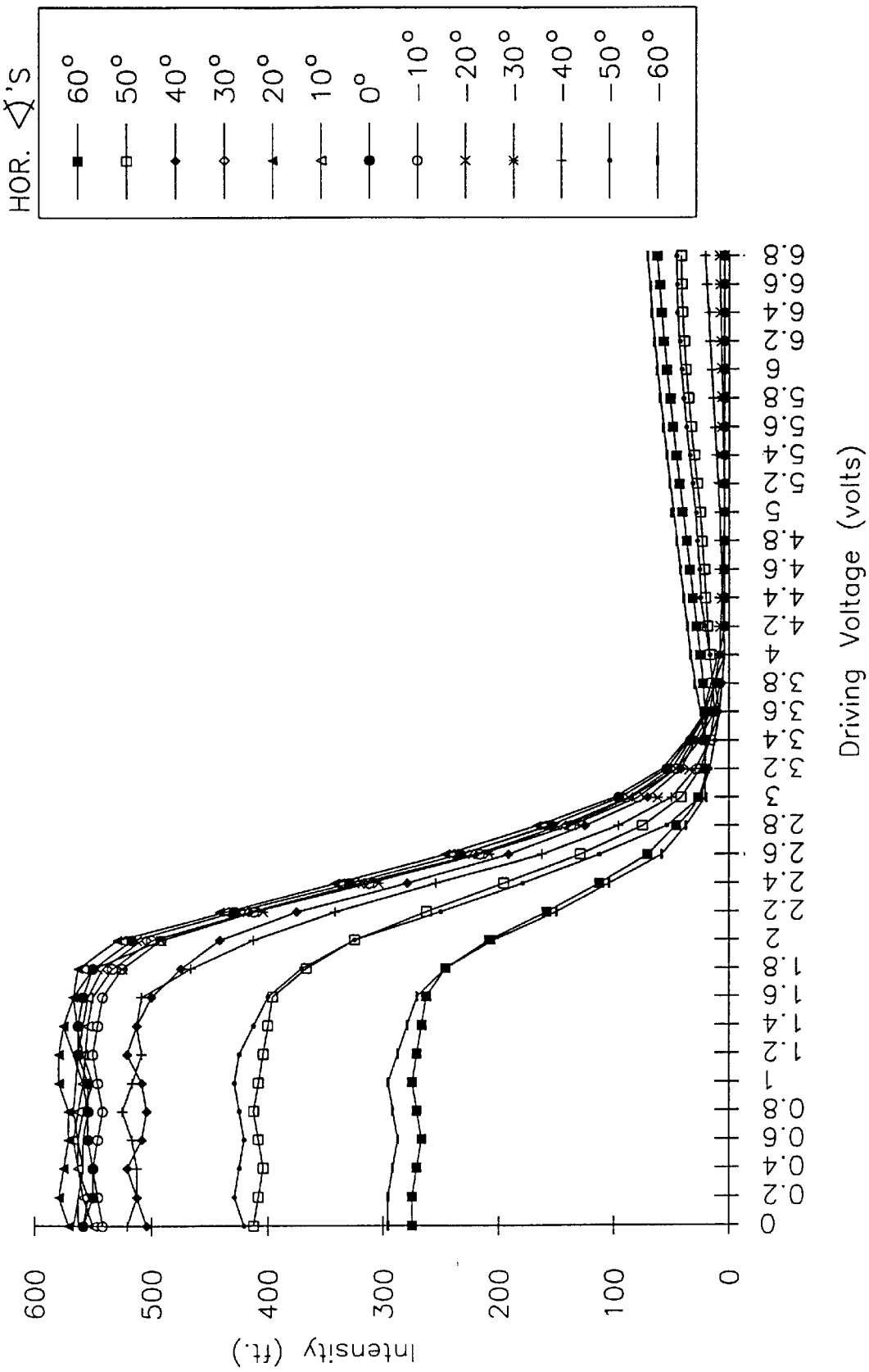
FIG. 30 is a white light measured intensity versus driving voltage plot of the light valve of FIG. 26 when rear and front uniaxial and positively birefringent 120 nm retardation films were used. The plot illustrates the gray level behavior of the light valve pixel at a plurality of horizontal viewing angles along the 0° vertical viewing axis.

FIG. 30 is an intensity versus driving voltage plot for this example illustrating the effects of gray level driving voltages for different horizontal viewing angles ranging from −60° to +60° along the 0° vertical viewing axis. As can be seen in FIG. 30, the gray level performance of this pixel is very good in that the inversion humps are relatively small or non-existent for a wide range of horizontal viewing angles defined herein. In other words, the horizontal gray level performance of this light valve is good because as the driving voltage increases, the intensity for the most part decreases accordingly. Therefore, when the driving voltage of this pixel is increased from one gray level voltage to another the intensity of the pixel generally decreases. The improved results illustrated in the graph shown in FIG. 30 are to be compared to the inferior results illustrated in the prior art graph, FIG. 3, where the inversion humps which begin at about 3.2 volts are relatively large and extend up into the range substantially over 200 fL. In short, the gray level characteristics of the light valve of this example are significantly improved over those of the prior art.

EXAMPLE 2

In this second example, a multi-colored liquid crystal display utilizing TFTs as switching devices in an active matrix array was constructed as follows. The normally white "X-buffed" liquid crystal display had a cell gap "d" of about 5.1 μm for the red subpixel which included a red color filter, and a cell gap "d" of about 5.7 μm for the green and blue subpixels which included green and blue color filters respectively. The difference in cell gap for the different subpixels was due to the different thicknesses of the color filters.

The birefringence of the LC material was 0.084 at room temperature. The liquid crystal material was purchased from Merck, Model No. ZLI4718. The display had a rear is linear polarizer having a transmission axis substantially perpendicular to the transmission axis of the front or exit linear polarizer. A rear retardation film having an optical axis about parallel to the transmission axis of the rear polarizer was sandwiched between the rear polarizer and the liquid crystal material. Likewise, a front retardation film having an optical axis about parallel to the transmission axis of the front polarizer was disposed between the front polarizer and the liquid crystal material. A rear orientation film was provided with an orientation direction about perpendicular to the optical axis of the rear retardation film, and about parallel to the transmission axis of the front polarizer. A front orientation film was provided with an orientation direction substantially parallel to the transmission axis of the rear polarizer, and about perpendicular to the optical axis of the front retardation film.

The optical axes of the rear and front retardation films defined an angle δ of about 90° therebetween. The rear and front retardation films both had retardation values of 120 nm. The front and rear retardation films both had positive birefringent values and were of the uniaxial type purchased from Nitto Denko America Corporation, New Brunswick, N.J. White light was used in testing this display and the measured results are reported in FIGS. 31–35.

Figure 31:
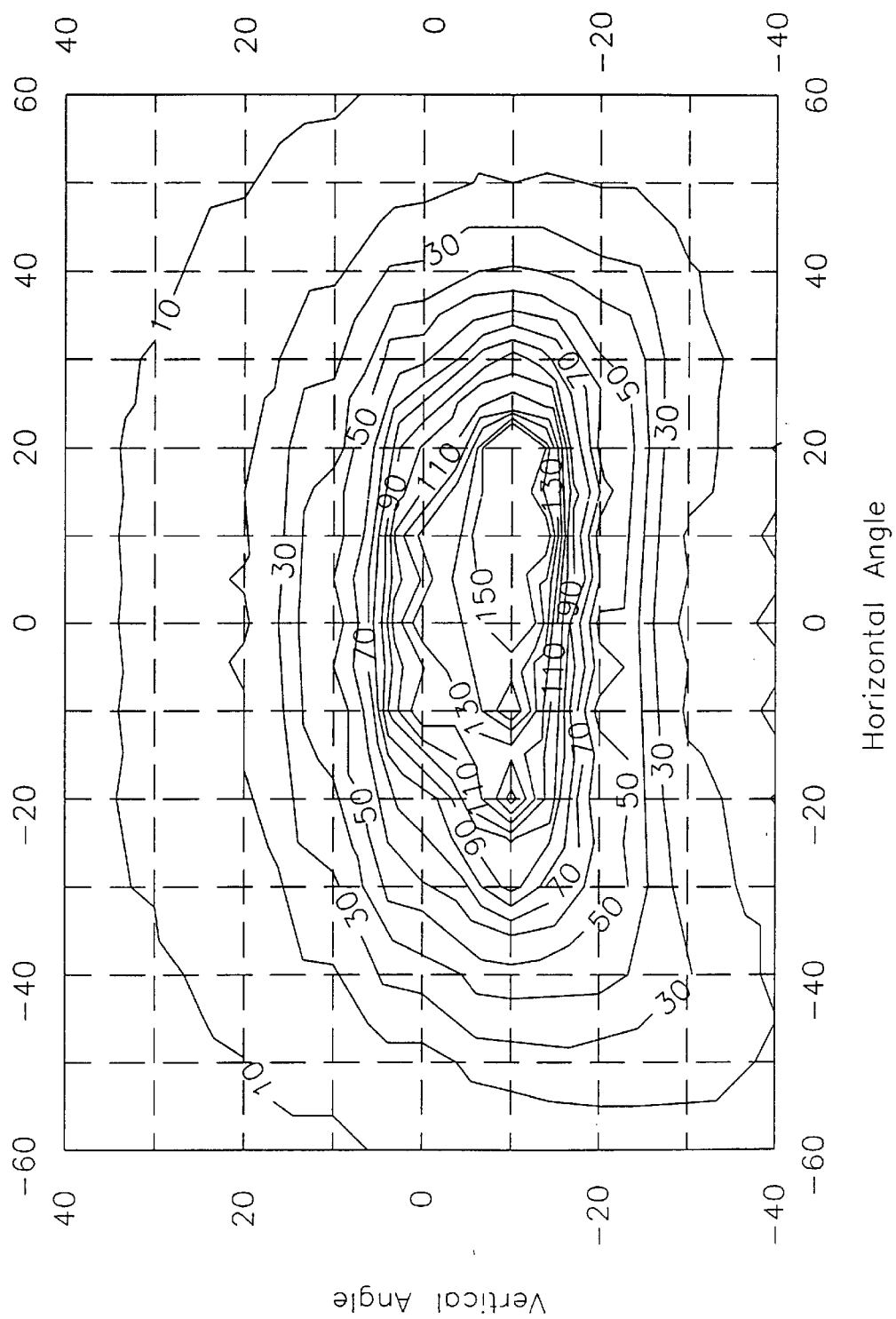
FIG. 31 is a white light measured contrast ratio curve graph for a normally white liquid crystal display according to the first embodiment of this invention when rear and front 120 nm retardation films were used and 6.8 volts was applied to the display.

FIG. 31 illustrates the contrast ratio curves when a $V_{ON}$ of 6.8 volts was applied to this normally white liquid crystal display. As can be seen, the 10:1 contrast ratio curve extends horizontally along the 0° vertical viewing axis a total of at least about 120°. This range is significantly greater than the ranges defined by the 10:1 contrast ratio curves of the prior art discussed above. Likewise, the 30:1 contrast ratio curve of FIG. 31 extends along the 0° vertical viewing axis to horizontal angles of about ±42° horizontal. The 10:1 contrast ratio curve of this example when 6.8 volts was applied to the display extends vertically along the 0° horizontal viewing axis from about −40° to about +35° vertical. Again, this range defined vertically by the 10:1 contrast ratio curve of this example is significantly improved over that of the prior art.

Figure 32:
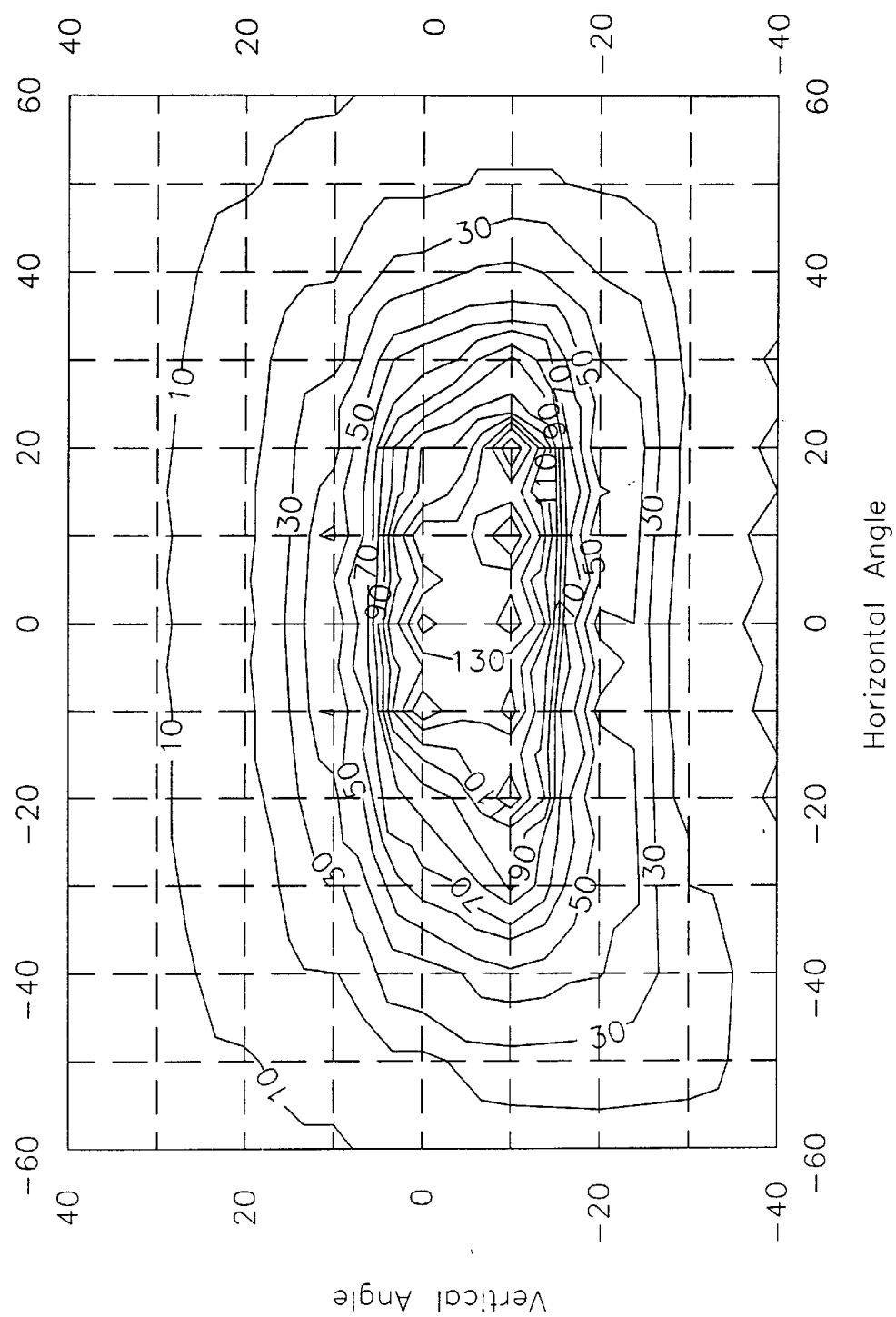
FIG. 32 is a white light measured contrast ratio curve graph of the liquid crystal display of FIG. 31 when rear and front 120 nm retardation films were used and 6.0 volts was applied to the display.

FIG. 32 illustrates the situation where 6.0 volts was applied to the normally white liquid crystal display of this example. As can be seen in FIG. 32, when 120 nm retardation films are used and 6.0 volts is applied to the display, the 10:1 contrast ratio curve still extends at least a total of about 120° horizontally along the 0° vertical viewing axis. This liquid crystal display clearly exhibits excellent contrast ratio curves over very wide ranges of viewing angles.

Figure 33:
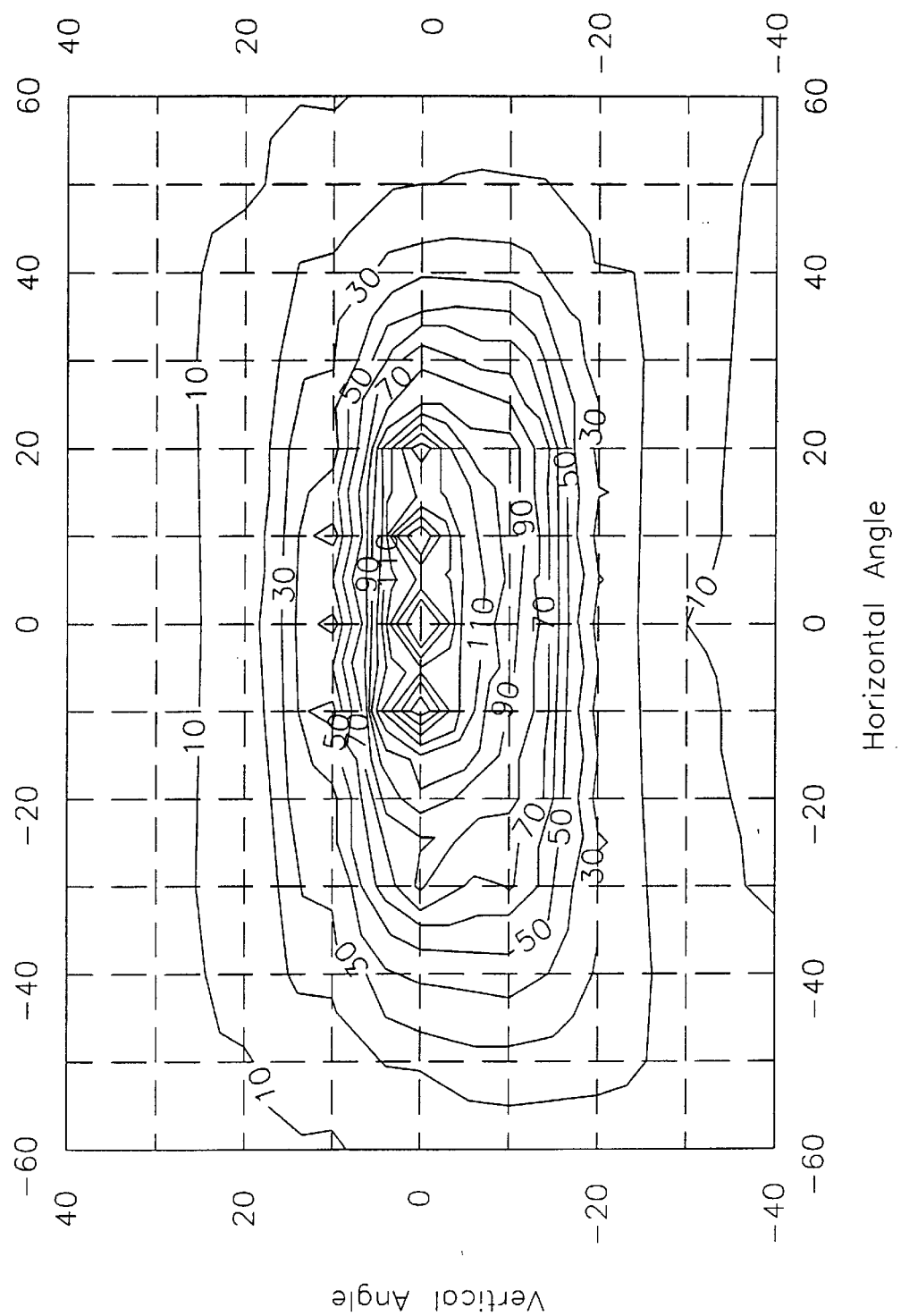
FIG. 33 is a white light measured contrast ratio curve graph of the liquid crystal display of FIG. 31 when rear and front 120 nm retardation films were used and 5.0 volts was applied to the display.

FIG. 33 illustrates the situation where 5.0 volts was applied to the display of this example. As shown the 10:1 contrast ratio curve still extends at least a total of about 120° horizontally along the 0° vertical viewing axis when 5.0 volts was applied to the display. The viewing zone, as previously discussed, decreases vertically as the voltage drops.

Figure 34:
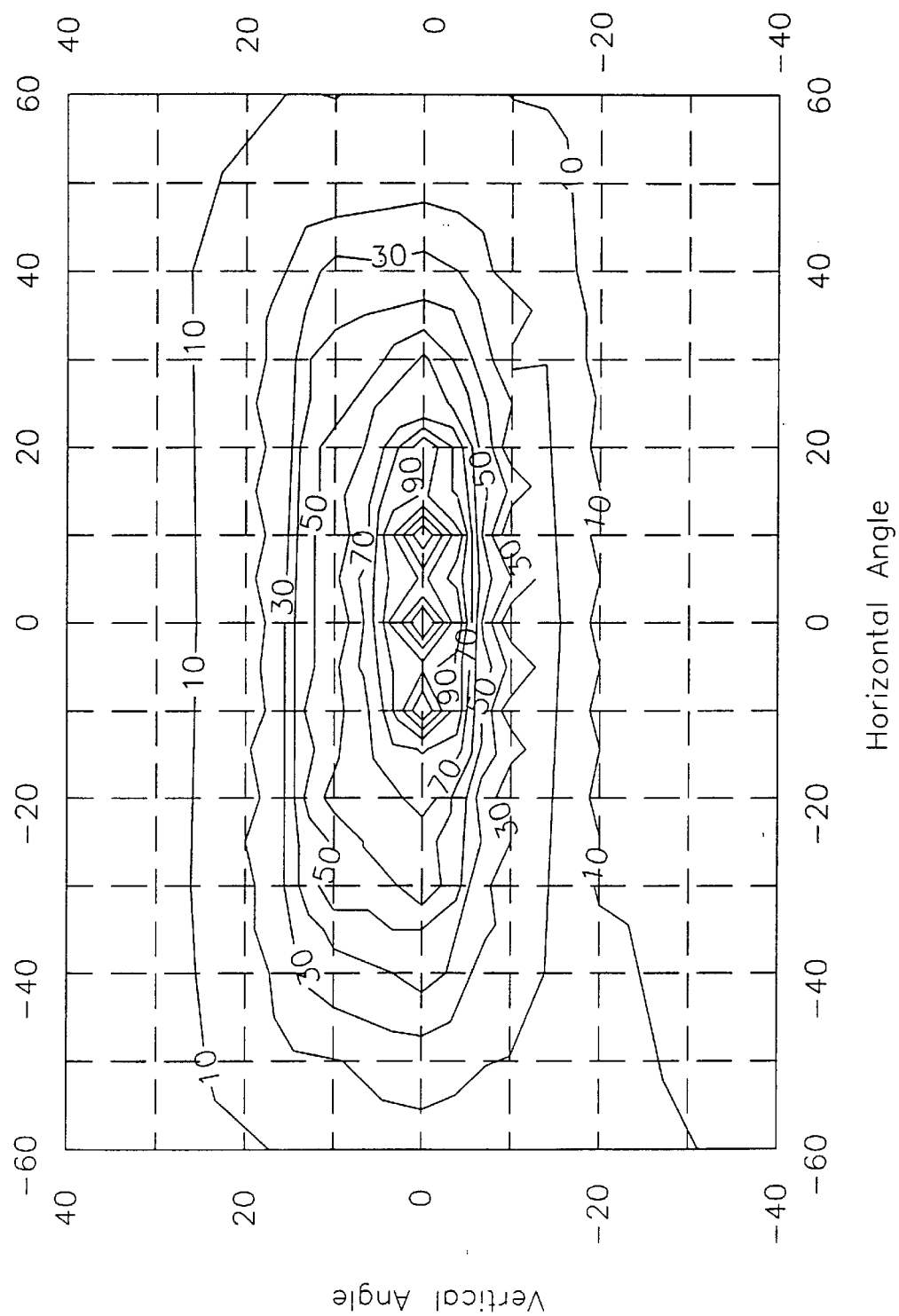
FIG. 34 is a measured contrast ratio curve graph for the normally white liquid crystal display of FIG. 31 when 4.0 volts was applied to the display, white light was used, and the rear and front retardation films were uniaxial and had retardation values of 120 nm.

FIG. 34 illustrates the situation where 4.0 volts was applied to the display of this example. Again, the 10:1 contrast ratio curves still extends off the graph horizontally along the 0° vertical viewing axis defining a range of at least about 120°. Taken together, FIGS. 31–34 illustrate that the inventive normally white display of this example, has excellent contrast ratios over a wide range of driving voltages, especially in the horizontal directions.

Figure 35:
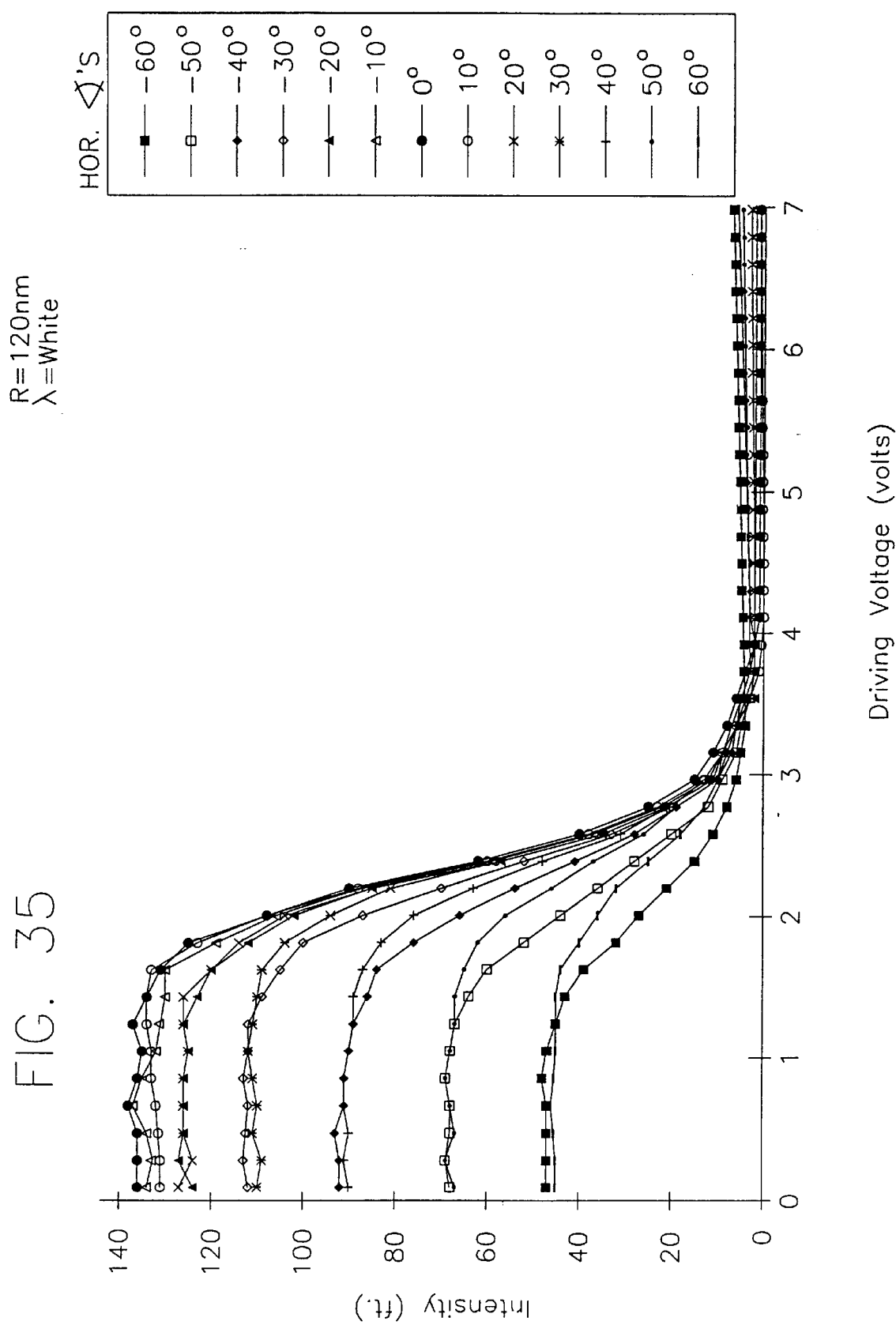
FIG. 35 is a measured intensity versus driving voltage plot showing the results for various horizontal angles along the 0° vertical viewing axis for the normally white liquid crystal display of FIG. 31 when white light was used, and the rear and front retardation values were 120 nm.

FIG. 35 is a driving voltages versus intensity plot for the display of this example when white light was used. This plot is for a range of horizontal viewing angles extending from −60° to +60° along the 0° vertical viewing axis. As shown, there is virtually no inversion at any voltage for the various horizontal viewing angles defined therein. In other words, as the gray level or driving voltages increase, the intensity of light emitted from the display decreases in conjunction therewith, thus, providing excellent gray level performance for the display of this example. The plot of FIG. 35 when compared with that of FIG. 3 highlights how the LCDs of this invention virtually eliminate the inversion humps experienced in the prior art, which allows the displays of this invention to be satisfactorily used throughout a wide range of gray level voltages.

EXAMPLE 3

An "X-buffed" normally white liquid crystal display was constructed having a cell gap of 5.1 μm for the red subpixel including a red color filter, and 5.7 μm for the green and blue subpixels including green and blue color filters respectively. The ΔN of the liquid crystal material was 0.084 at room temperature. The liquid crystal material was Merck's Mode No. ZLI4718. This liquid crystal display was driven by a conventional TFT active matrix array.

The normally white display included a rear polarizer, a rear retardation film, a rear substrate, a rear electrode, a rear orientation film, a liquid crystal layer, a front orientation film, a front electrode, a front substrate, a front retardation film, and a front or exit polarizer in that order. The transmission axis of the rear polarizer was approximately parallel to the optical axis of the rear retardation film and the orientation direction of the front orientation film. The transmission axis of the front polarizer was approximately parallel to the optical axis of the front retardation film and the orientation direction of the rear orientation film. The optical axes of the rear and front retardation films defined an angle of about 90° therebetween. The retardation values for both the rear and front films was 120 nm. The rear and front retardation films were of the uniaxial type and had positive birefringent values.

Figure 36:
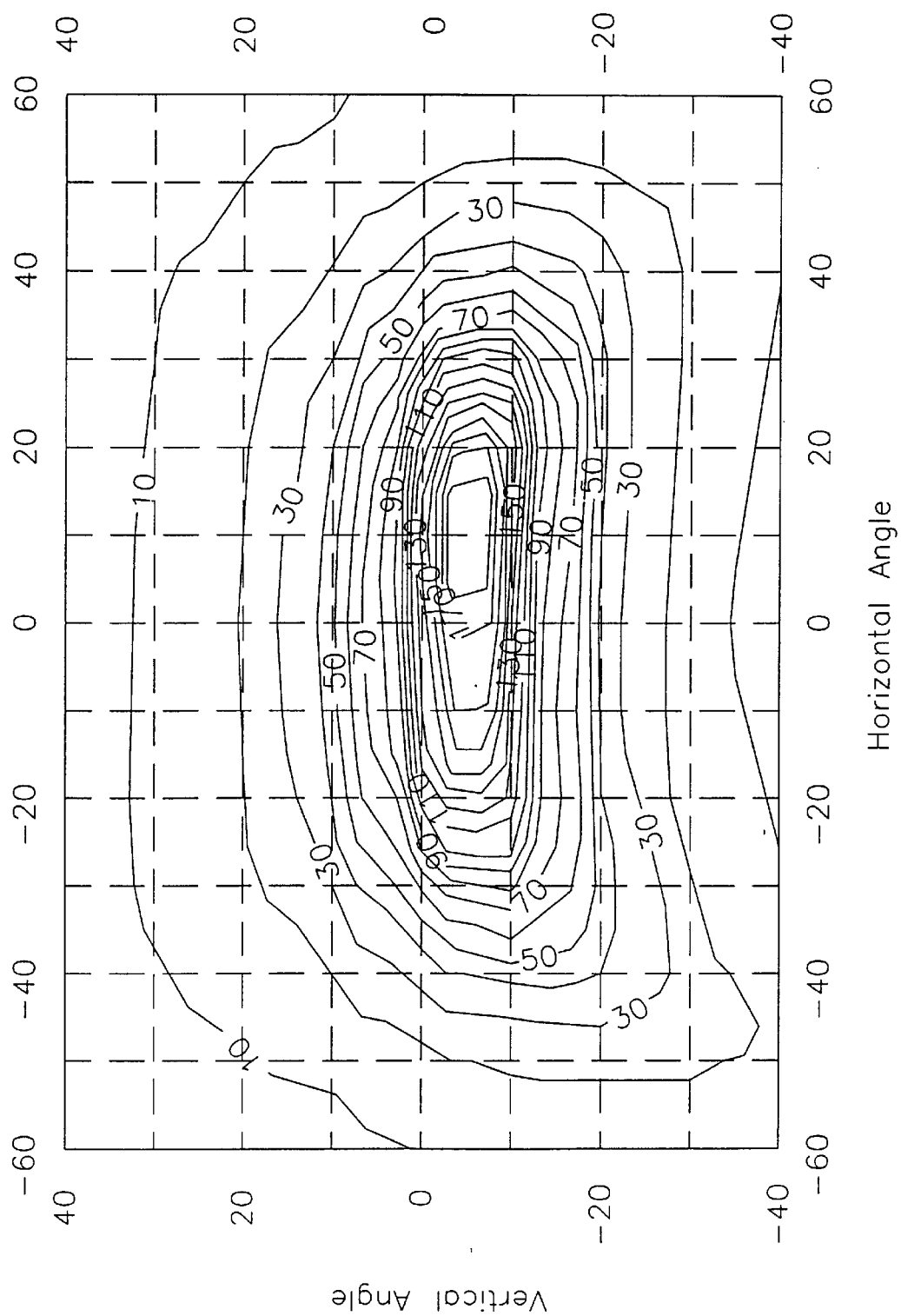
FIG. 36 is a measured contrast ratio curve graph of a liquid crystal display according to the first embodiment of this invention wherein white light was utilized, 120 nm retarders were used, and 6.0 volts was applied to the display.

FIG. 36 illustrates the contrast ratio curves for this example when white light was applied to the display and a driving voltage of 6.0 volts was applied. As can be seen, the 10:1 contrast ratio curve extends along the 0° vertical viewing axis to horizontal angles of at least about ±60°. Also, the 30:1 contrast ratio curve of this example when 6.0 volts was applied to the display extends along the 0° vertical viewing axis to horizontal angles of about ±44°. These are significant improvements over the prior art. Also, the 10:1 contrast ratio curve as shown in FIG. 36 extends along the 0° horizontal viewing axis to vertical angles of about ±33°. White light was used in obtaining the data generated by this graph.

EXAMPLE 4

In this example a normally white "X-buffed" light valve according to this invention was constructed wherein the optical axes of the rear and front retardation films were rotated −8° symmetrically thereby shifting the viewing zone to a position centered substantially below the 0° vertical viewing axis while maintaining its shape or integrity.

In this example, the light valve was constructed as follows. A rear linear polarizer was provided with a transmission axis $P_R$ defining a first direction. A front linear polarizer was provided having a transmission axis $P_F$ defining a second direction substantially perpendicular to the first direction. The orientation of the rear orientation film was substantially parallel to the second direction defined by the transmission axis $P_F$ of the front polarizer. The orientation direction of the front orientation film was substantially parallel to the transmission axis direction defined by the transmission axis $P_R$ of the rear polarizer.

A rear retardation film of the uniaxial type having a positive birefringent value was disposed between the rear polarizer and the rear orientation film. A front retardation film of the uniaxial type having a positive birefringent value was provided between the front polarizer and the front orientation film.

Because the optical axes of the rear and front retardation films were rotated −8° symmetrically, angles Θ1 and Θ2 were 4° respectively with an angle δ of 82° defining the angle between the optical axes of the rear and front retardation films. In other words, the optical axis $R_F$ of the front retardation film was rotated 4° counterclockwise relative to the transmission axis $P_F$ of the front polarizer. Also, the optical axis $R_R$ of the rear retardation film was rotated clockwise 4° relative to the transmission axis $P_R$ of the rear linear polarizer. Accordingly, the axes of the rear and front retardation films defined an angle of 82° therebetween represented by the angle δ in FIG. 11(c).

The rear and front retardation films of this example had retardation values of 120 nm. The liquid crystal material was Model No. ZLI4718 from E. Merck Ltd. The cell gap "d" of a liquid crystal layer was 5.86 μm for the light valve pixel of this example and the LC birefringence was 0.084. The temperature in this example, as in all of the other examples discussed herein, was about 35° C.–40° C. unless otherwise specified.

Figure 37:
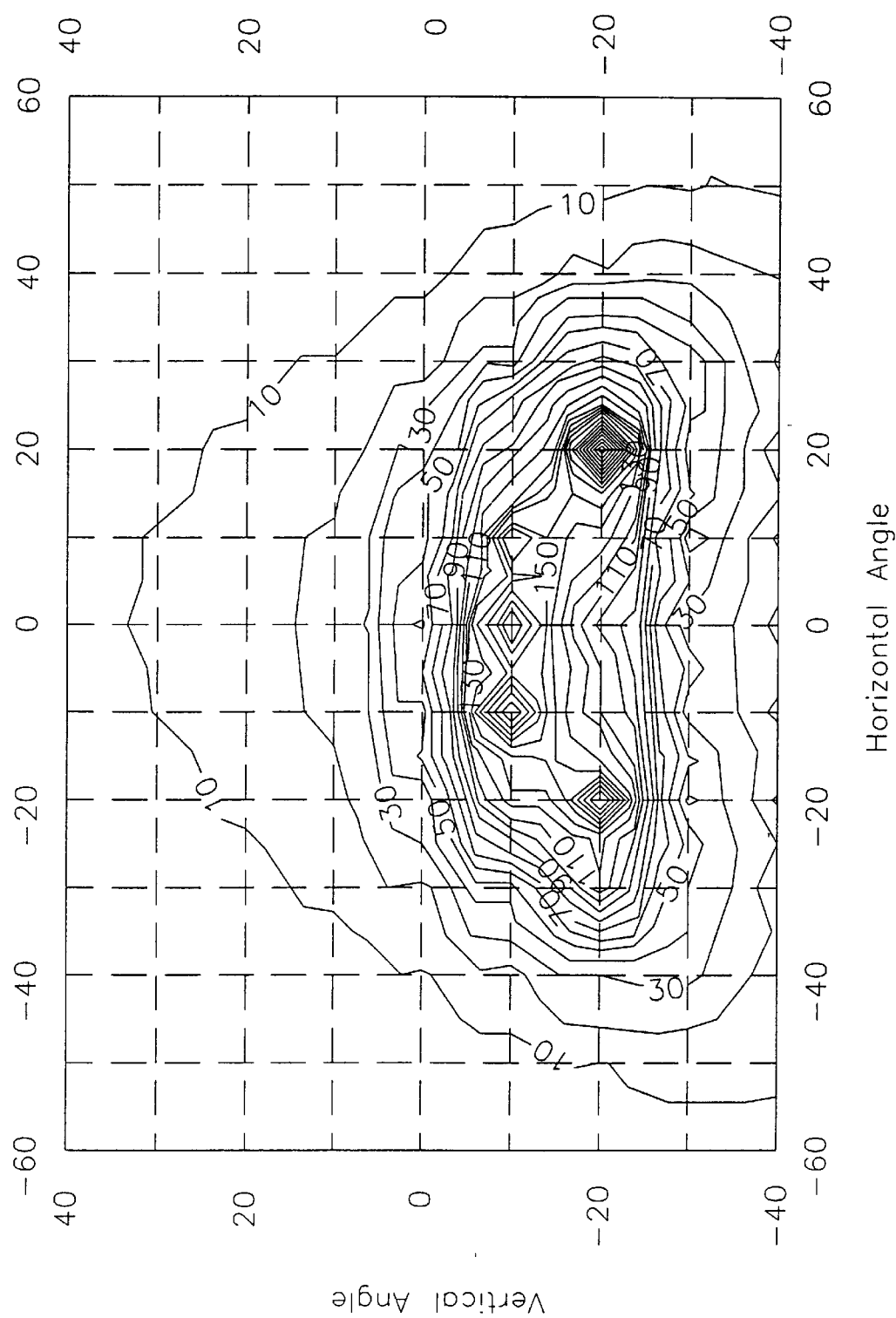
FIG. 37 is a measured contrast ratio curve of a light valve according to another embodiment of this invention wherein white light was used, 6.8 volts was applied to the pixel, the retardation films values were 120 nm, and the retardation films were rotated −8° symmetrically.

FIG. 37 is a contrast ratio curve graph illustrating the viewing zone of the light valve of this example when 6.8 volts and white light was applied thereto. As can be seen, the viewing zone is centered at a position about 10° below the 0° vertical viewing axis (i.e. at about the −10° vertical viewing axis) as a result of the −8° symmetrical rotation of the optical axes of the rear and front retardation films.

This example illustrates the situation where the viewing zone of a display or pixel is shifted to a position substantially below the 0° vertical viewing axis while still substantially maintaining the integrity or symmetry of the overall viewing zone. The symmetry of the viewing zone about the 0° horizontal viewing axis is substantially maintained because the rear and front retardation films had substantially equal retardation values.

FIG. 38A illustrates the viewing zone of the light valve of this example when 5.0 volts and white light was applied thereto. As can be seen in FIG. 38A, the viewing zone is still centered about the −10° vertical viewing axis and is provided with excellent contrast ratios at large viewing angles. As a result oHP LaserJetHPLASERJ.PRStally about the center of the viewing zone.

The advantage associated with the light valve of this example is that the centered position of the viewing zone of a given liquid crystal display or pixel thereof according to certain embodiments of this invention can be shifted vertically from one position to another while substantially maintaining the symmetry of the viewing zone in accordance with the specific needs of different customers. These shifts of the viewing zone are accomplished by simple rotation, preferably symmetrically, of the optical axes of the rear and front retardation films of certain embodiments of this invention.

Figure 38B:
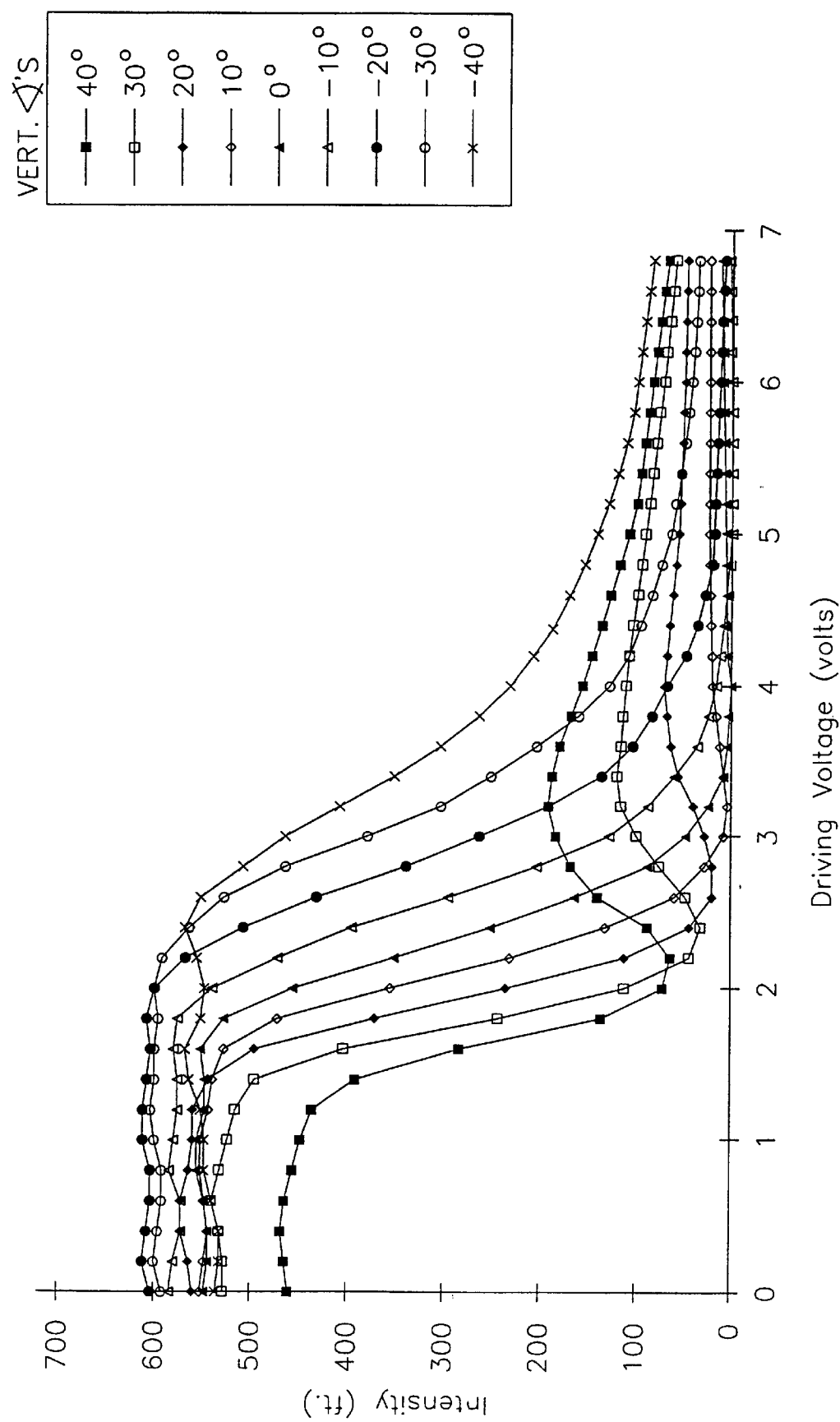
FIG. 38B is a white light measured intensity versus voltage graph for the light valve of FIGS. 37 and 38A.

FIG. 38B illustrates the inversion hump problem associated with the vertical viewing angles above the 0° vertical viewing axis for the display of this example. The viewing zone of the display of this example is centered at a location below the 0° vertical viewing axis remote from these inversion areas illustrated in FIG. 38B. Thus, gray level performance is improved by centering the viewing zone at a position distant the inversion zone thereby limiting inversion effects to remote viewing angles.

EXAMPLE 5

A multi-colored normally white "X-buffed" liquid crystal display was constructed and tested with white light as follows. The display, including a conventional TFT matrix array, included a rear linear polarizer having a transmission axis defining a first direction, a front or exit linear polarizer having a transmission axis defining a second direction wherein the first and second directions were substantially perpendicular to one another, a rear retardation film between the rear polarizer and the liquid crystal layer and having an optical axis substantially parallel to the transmission axis of the rear polarizer, a front retardation film having an optical axis substantially parallel to the transmission axis of the front polarizer, a rear orientation film having an orientation direction substantially perpendicular to the first direction defined by the transmission axis of the rear polarizer, a front orientation film having an orientation direction substantially perpendicular to the transmission axis of the front polarizer, and finally a liquid crystal layer sandwiched between the orientation films. The rear and front retardation films had positive birefringent values and were of the uniaxial type. Furthermore, the rear and front retardation films each had a retardation value of 120 nm.

The optical axes of the rear and front retardation films were rotated −3° symmetrically. Therefore, with reference to FIG. 11(c), angles Θ1 and Θ2 were each 1.5°, and angle δ was 87° in the display of this example.

Figure 39:
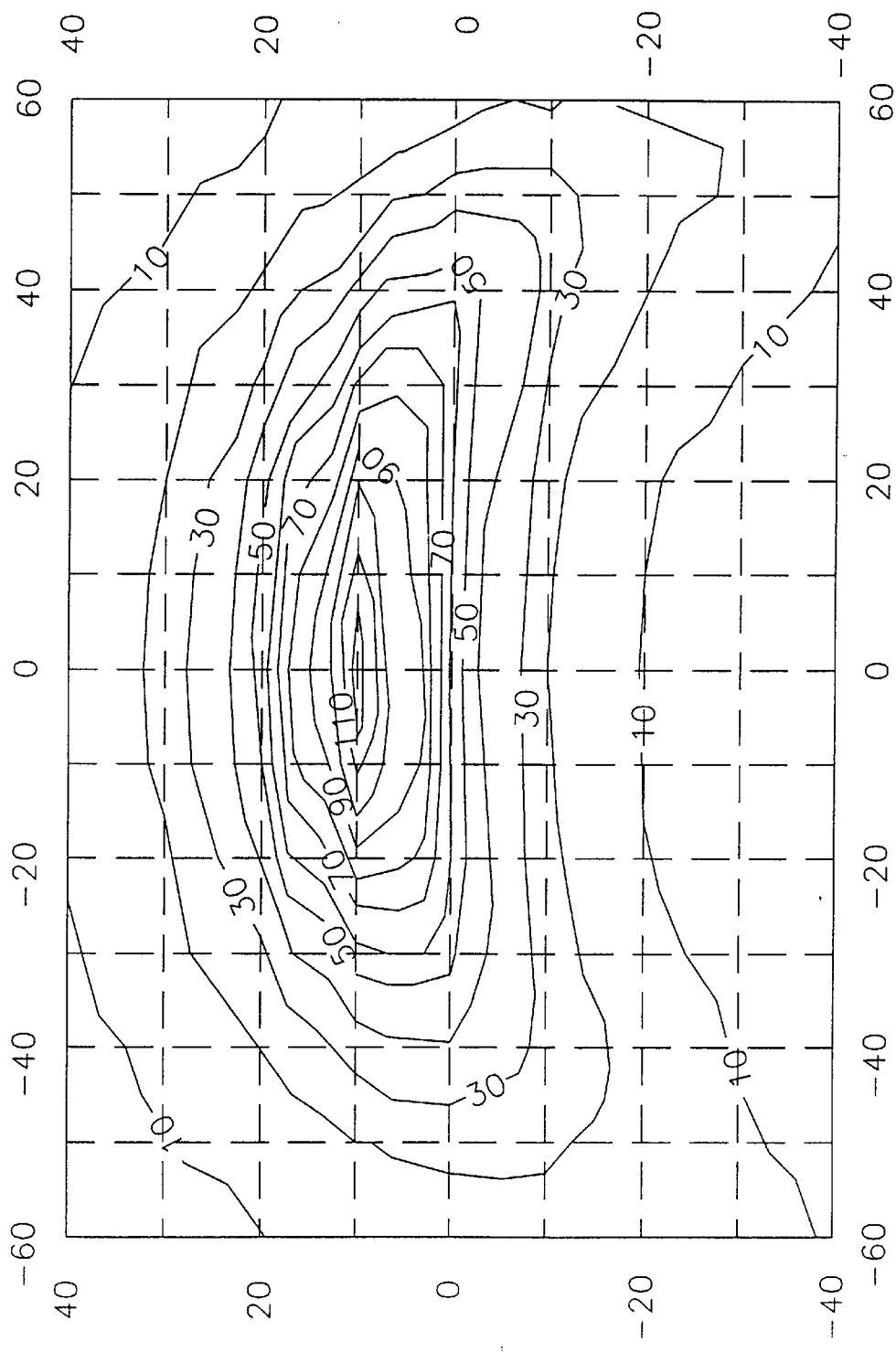
FIG. 39 is a measured contrast ratio curve of a liquid crystal display according to this invention wherein white light was used, 120 nm retardation films were used, 6.0 volts was applied to the display, and the retardation films were rotated −3° symmetrically, and the cell gap "d" was about 5.1 μm in the red subpixel and about 5.7 μm in the green and blue subpixels due to color filter thicknesses.

FIG. 39 is a white light contrast ratio curve graph showing the measured results when the liquid crystal display of this example had a voltage of 6.0 volts applied to the active matrix, $V_{OFF}$ was 0.2 V, and $V_{COMM}$ was 8.14 V. The contrast ratios as shown in FIG. 39 are excellent in that the 10:1 contrast ratio curve extends significantly beyond a horizontal range of 120° along the 0° vertical axis. Furthermore, the 30:1 contrast ratio along the 0° vertical viewing axis defines a total range of about 100° which is significantly more than that of the prior art. The 10:1 contrast ratio curve in the vertical direction covers a range along the 0° horizontal viewing axis of between about −20° vertical and at least about 40° vertical.

As can be seen in FIG. 39, the −3° symmetrical rotation of the retardation films was not enough to shift the viewing zone below the 0° vertical viewing angle axis. This may be due to manufacturing derivations associated with certain optical elements of this display. Nevertheless, the viewing zone and contrast ratios are excellent, both horizontally and vertically.

The cell gap "d" of the display manufactured in this example was 5.1 μm in the red subpixel where a red color filter was provided, and 5.7 μm in both the green and blue subpixels where green and blue color filters were provided respectively. The difference in cell gap "d" between the subpixels is a result, as in the other examples herein, of the different thicknesses of the color filters. In other words, because the red color filter has a thickness greater than the green and blue color filters, the cell gap "d" in the red subpixel is less than that in the green and blue subpixels. The LC material birefringence was 0.084 at room temperature. The left handed liquid crystal material was Merck's Model No. ZLI4718.

EXAMPLE 6

In this example, an "X-buffed" NW light valve pixel was constructed and tested using white light. A rear linear polarizer was provided having a transmission axis defining a first direction and a front linear polarizer was provided having a transmission axis defining a second direction wherein the first and second directions were substantially perpendicular to one another, thus, defining a normally white light valve. A rear retardation film having an optical axis approximately parallel to the transmission axis of the rear polarizer was provided between the rear polarizer and a rear orientation film. The rear orientation film had a buffing or orientation direction substantially parallel to the direction defined by the transmission axis of the front polarizer. A front retardation film having an optical axis about parallel to the transmission axis of the front polarizer was disposed between the front polarizer and a front orientation film. The front orientation film had an orientation or buffing direction substantially perpendicular to that of the rear orientation film.

Figure 6:
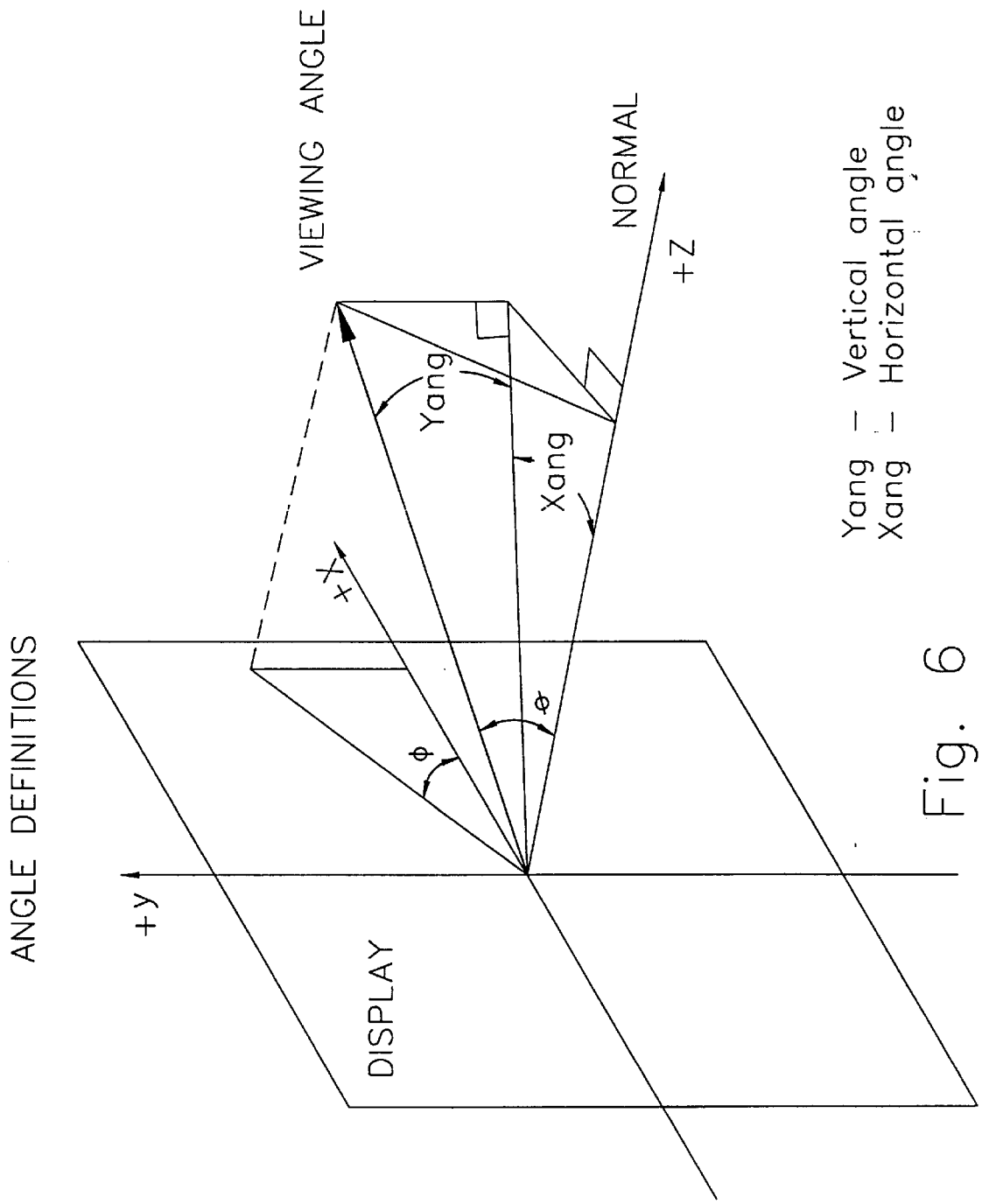
FIG. 6 is a graph illustrating the angular relationship between the horizontal and vertical viewing angles discussed herein, and their relationship with the conventional liquid crystal display angles φ and Θ.
Figure 7:
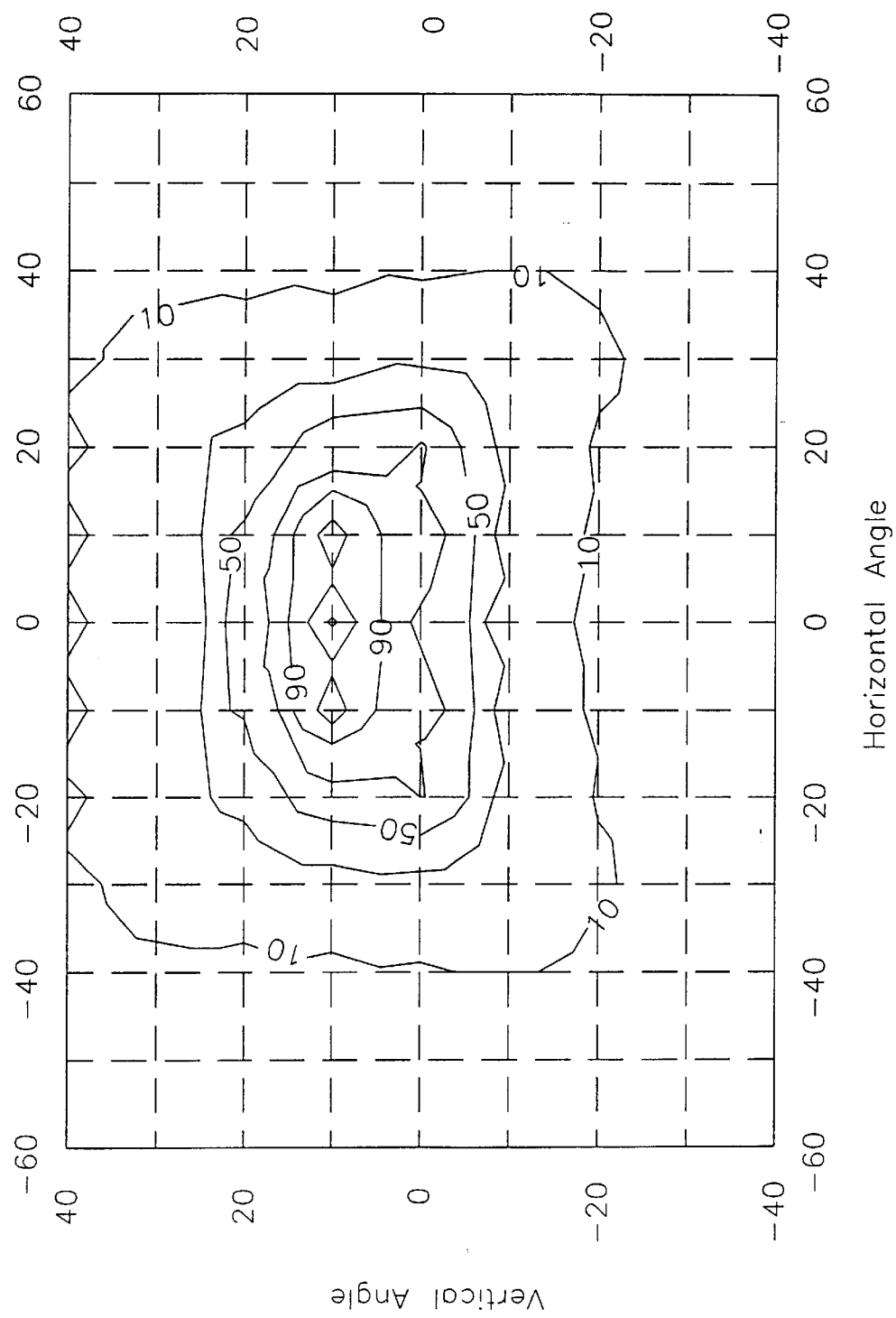
FIG. 7 is a computer simulation contrast ratio curve graph of a normally white liquid crystal display having front and rear retardation films with retardation values of 320 nm. The display simulated by FIGS. 7–10 is not prior art to the present invention, but is merely used for the purpose of later comparison to certain embodiments of this invention.
Figure 8:
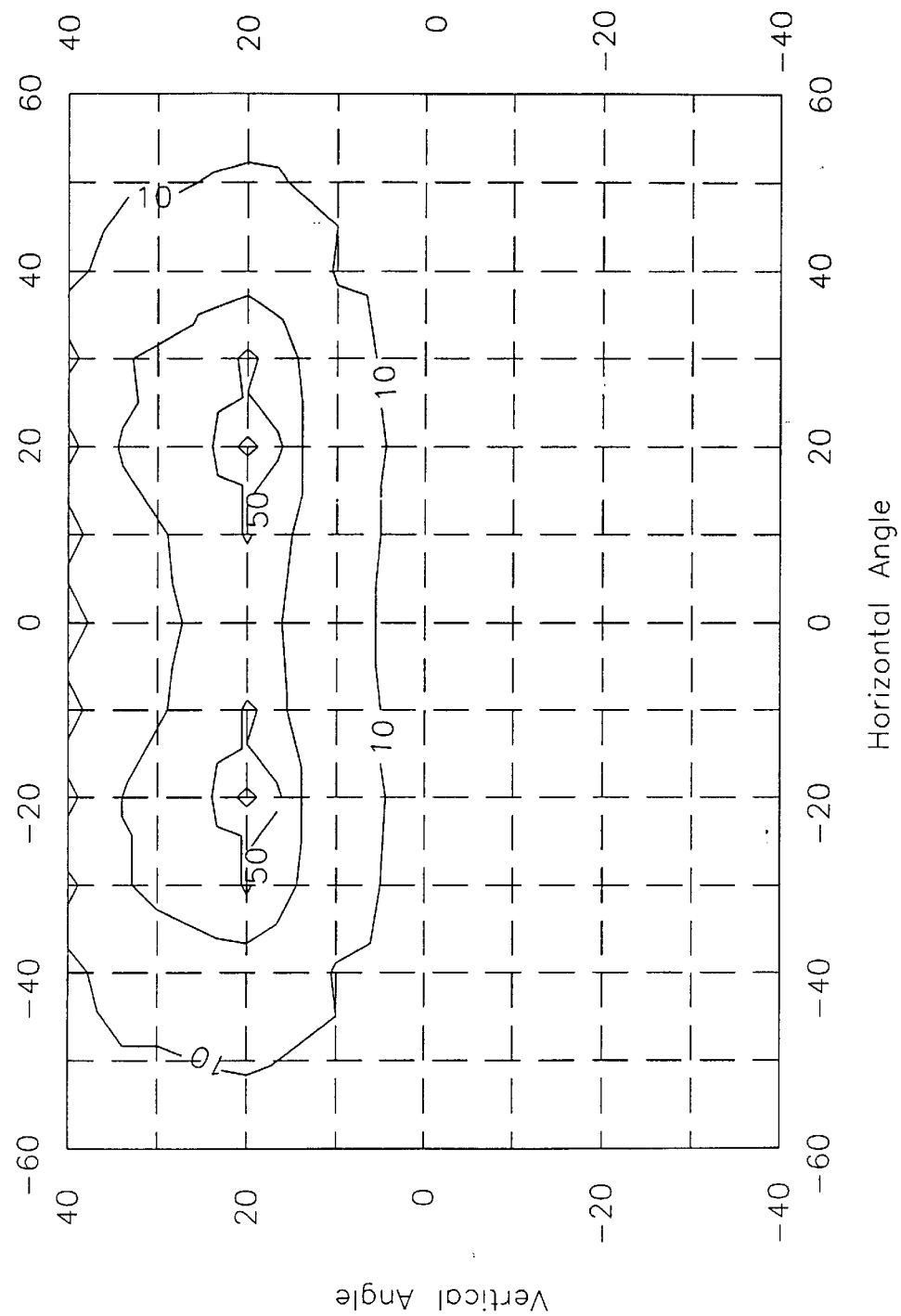
FIG. 8 is a computer simulation contrast ratio graph of the display of FIG. 7 wherein 5.0 volts are applied across the display and the 630 nm wavelength is used.
Figure 9:
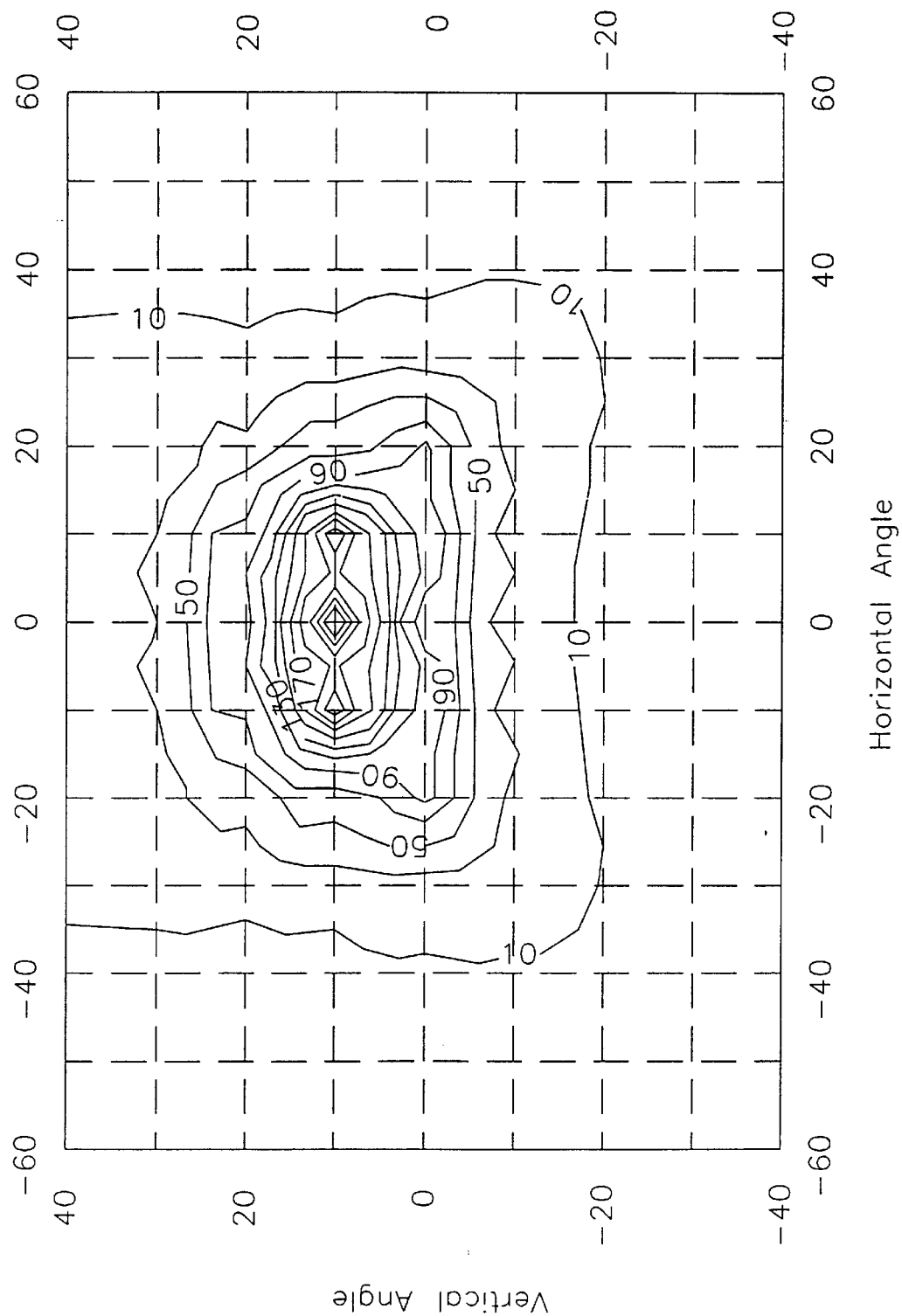
FIG. 9 is a computer simulation contrast ratio curve graph of the display of FIGS. 7–8 using a green wavelength of 550 nm and applying a voltage of 6.8 volts across the liquid crystal material.
Figure 10:
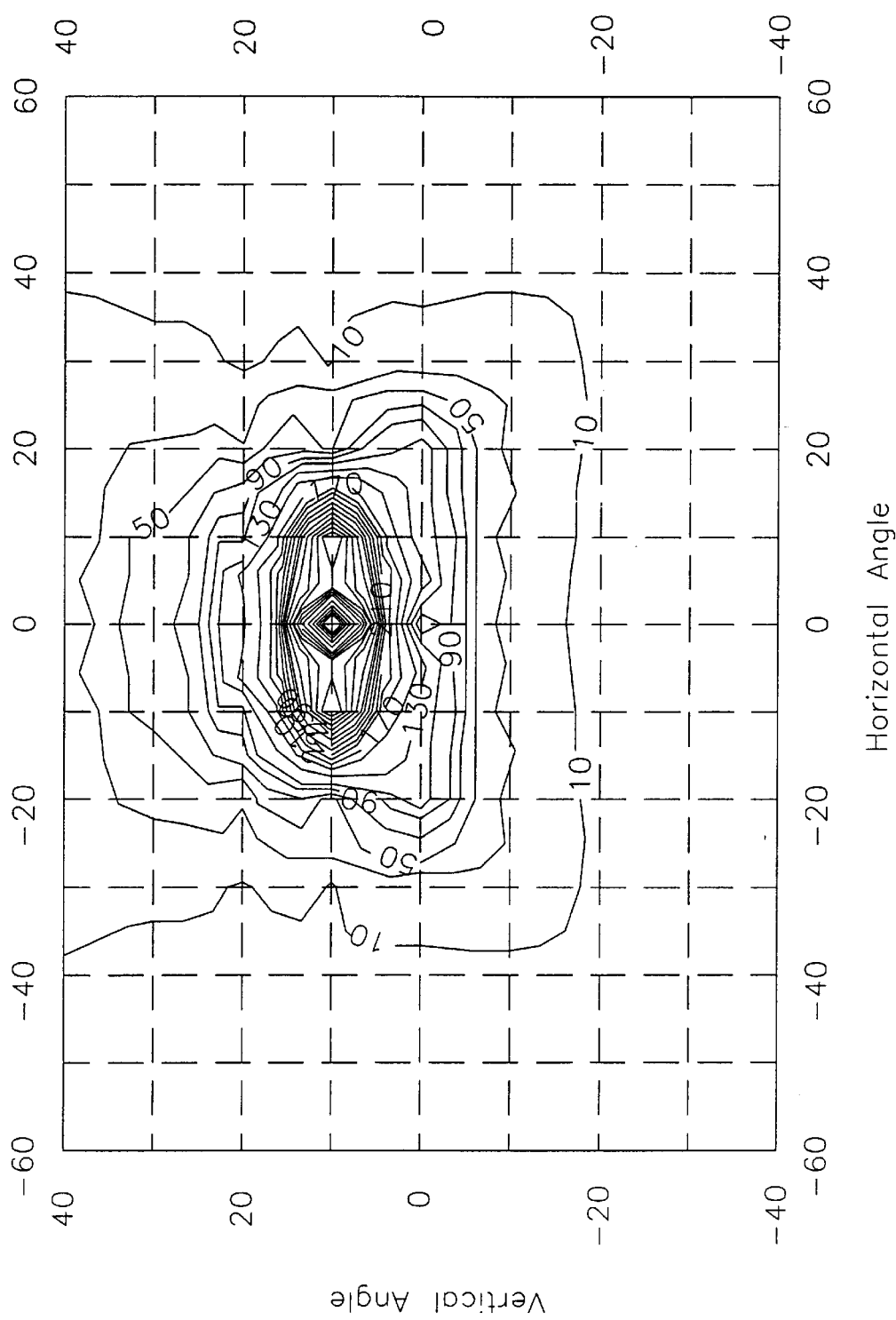
FIG. 10 is a computer simulation contrast ratio curve graph of the display of FIGS. 7–9 using a blue wavelength of 480 nm and applying 6.8 volts across the liquid crystal material.

In this example, the rear and front retardation films were of the biaxial type. Biaxial retardation films can be characterized by two separate retardation values: $d \cdot \Delta_{ZX}$ and $d \cdot \Delta_{ZY}$. The local X optical axes of the rear and front biaxial retardation films in this light valve were oriented about parallel to their closest adjacent polarizer transmission axis. The local X axis of a biaxial retardation film herein means the axis in the direction having the highest index of refraction ($n_X$ is always the largest index of refraction and $n_Z$ is the lowest). The X, Y, and Z directions (axes) of the biaxial retardation films herein are separate and distinguished from the X, Y, and Z directions (FIG. 6) of the display. In this example, the axis having the retardation value of $d \cdot \Delta_{ZX} = -168$ nm had the highest or largest index of refraction. Both the rear and front biaxial retardation films were obtained from Allied Signal Corporation as Sample No. 4.0. The indices of refraction of the biaxial retardation films of this example were $n_X = 1.4305$; $n_Y = 1.4275$; and $n_Z = 1.4261$. The liquid crystal material had a birefringence of 0.084 at room temperature and was Merck's Model No. ZLI4718. The films therefore had retardation values d·Δ$_{ZX}$=–168 nm and d·ΔZY=–53.3 nm.

FIG. 45 is a contrast ratio curve graph illustrating the measured results of the light valve of this example. In FIG. 45, V$_{ON}$ was 6.0 V and V$_{OFF}$ was 0.2 V. As shown, the 10:1 contrast ratio curve extends horizontally off the graph along the 0° vertical viewing axis, thus, defining a horizontal viewing range of greater than about 120°. Furthermore, the 30:1 contrast ratio curve defines a total viewing range along the 0° vertical viewing axis of about 95°–100°. This is a significant improvement over the prior art. The 10:1 contrast ratio curve in the vertical direction along the 0° horizontal viewing axis covers a range of about 75°.

This example illustrates that when a light valve according to this invention is provided with biaxial rear and front retardation films, excellent viewing zone and contrast ratios result and constitute a significant improvement over the prior art.

EXAMPLE 7

Figure 40:
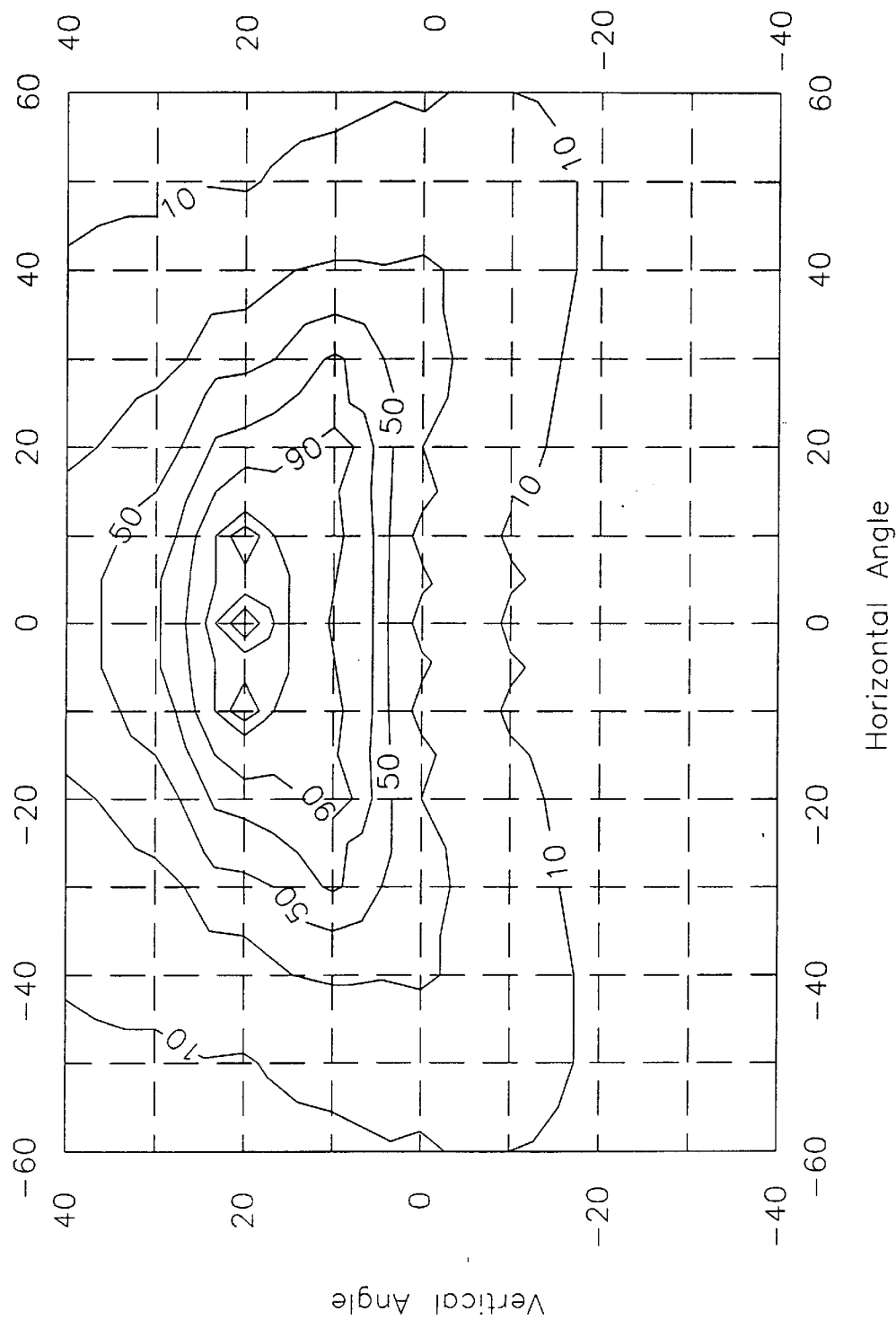
FIG. 40 is a computer simulation contrast ratio curve graph of a normally white liquid crystal display according to another embodiment of this invention wherein the retardation films are rotated +4° symmetrically, 160 nm retardation films are used, a green 550 nm wavelength is used, and 6.8 V is applied.

FIG. 40 is a computer simulation contrast ratio curve graph illustrating a simulated liquid crystal display according to another embodiment of this invention where the optical axes of the rear and front retardation films are rotated +4° symmetrically. Due to this positive rotation, the center of the viewing zone is shifted to a position substantially above the 0° vertical viewing axis. As shown, the viewing zone of this display is centered about the +20° vertical viewing axis because of the +4° symmetrical rotation of the retardation films.

With reference to FIG. 11(c), the axis R$_F$ of this embodiment is rotated or oriented clockwise relative to P$_F$ and B$_1$ defining an angle of 2° therebetween. Also, axes R$_R$ of this embodiment is oriented counterclockwise 2° relative to P$_R$ and B$_2$. As a result, the angle δ between the optical axes of the retardation films is 96° due to the +4° symmetrical rotation of the retardation film axis. The display of this embodiment would be desirable in situations where a viewing zone centered above the 0° vertical viewing axis was desired. The simulation of FIG. 40 used a V$_{ON}$ of 6.8 V, a green wavelength of 550 nm, and 160 nm retarders. The transmission axes of the polarizers as opposed to the optical axes of the retardation films may instead be rotated to shift the location of the viewing zone in certain other embodiments of this invention. However, rotation of the polarizer axes does not provide as good of results as does the rotation of the retarder axes.

EXAMPLE 8

FIG. 43 is a computer simulation of a liquid crystal display according to yet another embodiment of a NW "X-buffed" LCD of this invention. This embodiment is similar to that illustrated and described in the first embodiment of this invention except that the rear and front retardation films 3 and 7 are negatively birefringent and uniaxial. The optical axes of these retardation films are oriented in the "Z" direction, or in other words, in a direction approximately perpendicular to the planes defined by the retardation films. The display of this embodiment, simulated by FIG. 43, had a cell gap of 5.70 μm, utilized a wavelength of 550 nm in testing the display, a V$_{ON}$ of 6.0 volts, was "X-buffed," and a temperature of about 30° C.

The rear and front retardation films of this embodiment had retardation values of d·ΔZX=d·ΔZY=–160 nm. These films are "uniaxial" because d·Δ$_{ZX}$=d·Δ$_{ZY}$. The retardation value d·Δ$_{ZX}$ is defined as meaning d·(n$_Z$–n$_X$) where "n" is the index of refraction of a particular axis and "d" is the thickness of the retardation film. The retardation films of this embodiment were negative because the parameter n$_X$ was greater than the parameter n$_Z$. The X, Y, and Z directions of the biaxial retardation films herein are separate and distinguished from the X, Y, and Z directions defining the coordinates of the display.

The term n$_X$ herein always represents the largest index of refraction, and n$_Z$ always represents the smallest. The rear and front polarizers had transmission axes which are substantially perpendicular to one another. The rear retardation film was disposed between the rear polarizer and the rear orientation film, and the front retardation film is between the front polarizer and the front orientation film. The negatively birefringent uniaxial retardation films of this embodiment are obtainable from the University of Akron and are disclosed in U.S. Pat. No. 5,071,997 as soluble polyimides and/or copolyimides.

As can be seen in FIG. 43, this embodiment achieves outstanding contrast ratios at very large viewing angles. For example, the 50:1 contrast ratio curve on the 0° vertical viewing axis defines a range of almost 100° horizontally. This is a significant improvement over the prior art.

EXAMPLE 9

FIG. 44 is a computer simulation contrast ratio graph of another NW embodiment of this invention which utilizes biaxial front and rear retardation films each having retardation values d·Δ$_{ZX}$=–160 nm and d·Δ$_{ZY}$=–60 nm. Because the retardation values are negative, the films have negative birefringence. d·Δ$_{ZX}$ is defined as d·(n$_Z$–n$_X$) wherein n$_X$ is the largest index of refraction in the film and n$_Z$ is the smallest. Therefore, d·Δ$_{ZX}$ is always the largest retardation value herein. The graph of FIG. 44 was plotted using the parameters of V$_{ON}$=6.0 volts, a LC birefringence of 0.084, a V$_{OFF}$ of 0.9 V, a cell gap of 5.70 μm, a temperature of about 30° C., an "X-buffed" configuration, and a wavelength of 550 nm. The local X' is the axis with the largest index of refaction, or n$_X$. The local X' optical axis of each retardation film is oriented substantially parallel to the adjacent polarizer transmission axis. In other words, the local X' axis of the rear retardation film is substantially parallel to the transmission axis of the rear polarizer, and the local X' optical axis of the front biaxial retardation film is substantially parallel to the front polarizer transmission axis. The local X' optical axis in this embodiment has the aforesaid retardation value of d·Δ$_{ZX}$=–160 nm, because n$_X$ was the largest index of refraction. The rear and front polarizer axes define an angle of about 90° therebetween. The axis with the smallest index of refraction, or n$_Z$, is oriented about perpendicular to the planes defined by the retardation films. As shown in FIG. 44, the embodiment of this invention using the aforesaid biaxial retardation films achieves excellent contrast ratios at large viewing angles. Again, the 50:1 contrast ratio curve along the 0° vertical viewing axis defines a range of about 100° horizontally.

The specific electrodes and substrates present in the displays and light valves of the above described examples are conventional and were not described or shown for purposes of simplicity.

Figure 41:
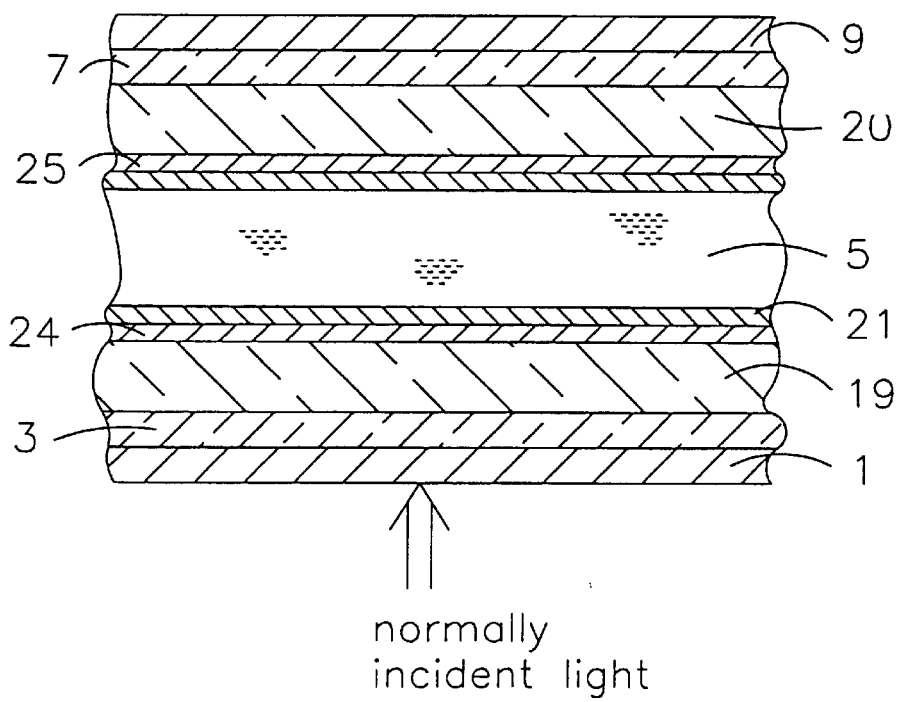
FIG. 41 is a cross-sectional view of a liquid crystal display pixel according to certain embodiments of this invention.

FIG. 41 is a cross-sectional view of the structural arrangement of a typical liquid crystal display pixel envisioned by this invention. For example, the optical arrangement shown and described in FIGS. 11(a)–11(c) may be used in conjunction with the structural arrangement shown in FIG. 41. Normally incident light enters the pixel and first proceeds through rear linear polarizer 1 and is polarized thereby. After proceeding through the polarizer 1, the normally incident light proceeds through the rear retardation film 3 and the rear transparent substrate 19. The transparent substrates 19 and 20 are preferably made of glass, but also may be made of plastic, quartz, or the like. After proceeding through the rear transparent substrate 19, the light then enters the lower pixel electrode 24 and passes therethrough without being substantially optically affected. The light then proceeds through the rear orientation film 21, a liquid crystal layer 5, the front orientation film 22, and the front electrode layer 25. After proceeding through electrode 25, the light then propagates through the front transparent substrate 20, front retardation film 7, and finally comes to the front or exit linear polarizer 9. When the pixel is in the OFF state, the light proceeds through the linear polarizer 9 toward a viewer. However, when the pixel is in the ON or energized state, the exit polarizer 9 absorbs the light of the pixel and the display appears darkened. Also, color filters (not shown) may be provided at any point between the transparent substrates, and preferably between the front substrate 20 and the electrode layer 25 thereby creating a multicolored pixel including a plurality of colored subpixels. It is understood, of course, that retardation films 3 and 7 may also serve as the buffing layers. In such an embodiment films 3 and 7 are replaced and relocated into the location of buffing films 21 and 22 respectively. It is further understood that retarder films 3 and 7 when not replacing buffing films 21 and 22 may be relocated so as to be between their respective driving electrode (24 and 25) and glass substrate (19 and 20) respectively. By arranging the optical elements of this structural arrangement (FIG. 41) as taught by certain optical embodiments of this invention, the aforesaid improved contrast ratios over predetermined ranges of viewing angles may be achieved.

An alternative structural arrangement envisioned by this invention, is a normally white pixel similar to the one shown in FIG. 41, except that the rear and front retardation films 3 and 7 are disposed between the substrates 19 and 20. The rear retardation film is sandwiched between, for example, the rear substrate 19 and the rear electrode 24, and the front retardation film is disposed between the front substrate 20 and the front electrode 25. All embodiments of this invention may be practiced in such a structural arrangement with excellent contrast ratios over a large range of viewing angles being realized.

Furthermore, the retardation films according to certain embodiments of this invention may be personalized or patterned according to wavelength or color of each pixel or subpixel as taught in U.S. Pat. No. 5,499,126, the disclosur of which is incorporated herein by reference. In other words, a retardation film within a red subpixel may have a retardation value different than a retardation film in a green or blue subpixel.

Figure 42:
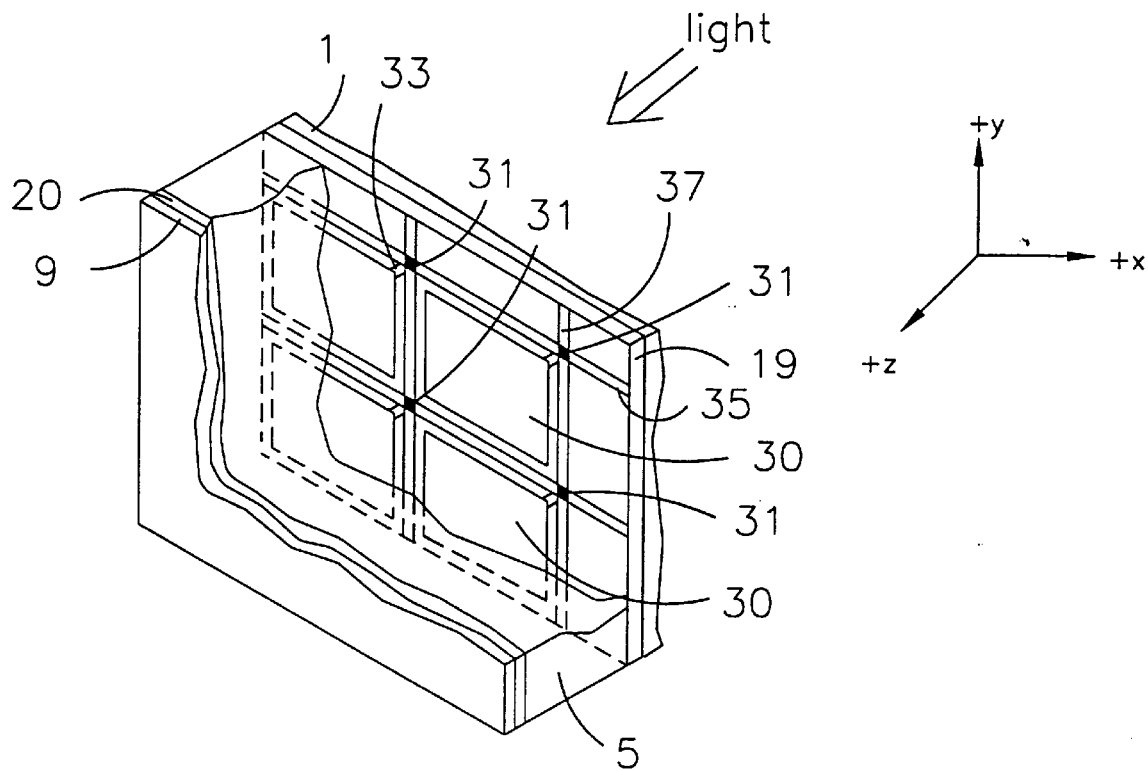
FIG. 42 is a partial cut-away view illustrating an active matrix liquid crystal display including a plurality of pixels according to certain embodiments of this invention.

FIG. 42 is a partial cut-away view of a typical active matrix liquid crystal pixel array as envisioned by this invention. Herein, the rear and front retardation films, which are not specifically shown in FIG. 42, are sandwiched between their adjacent polarizers 1 and 9, and their adjacent substrates 19 and 20. The individual pixels 30 shown in FIG. 42 are driven by conventional TFTs 31 which act as switching devices to selectively drive each pixel 30. Conventional transparent ITO electrodes 33 connect the individuals TFTs 31 to their respective pixels 30. Parallel conductive row lines 35 drive either the gate or drain electrodes of the TFTs 31. Column lines 37 drive the other of the gate and drain electrodes of a TFTs thereby selectively driving the individual pixels 30 when a specific TFT has both its gate and drain electrodes energized.

The simulations, light valves, and displays of FIGS. 7–45 herein were twelve o'clock buffed. Therefore, the rear orientation or buffing directions went from the lower right to the upper left, and the front orientation or buffing direction went from the upper right to the lower left.

The pretilt angle of the displays, light valves, and simulations of FIGS. 1–3 and 7–45 herein is about 3°, and the value of "d/p" (thickness/natural pitch of the liquid crystal material) of the liquid crystal layer of these Figures is set to about 0.25.

The computer simulations in FIGS. 1–45 herein were conducted using simulation software written by Dr. Dwight Berreman, Scotch Plains, N.J. The software is described and referenced in one of Dr. Berreman's publications titled "Numerical Modelling of Twisted Nematic Devices," Phil. Trans. R. Soc. Lond. A309, 203–216 (1983) which was printed in Great Britain.

FIGS. 46–49 illustrate another embodiment of this invention, wherein a single layer or film portion may be used to function as both a negative birefringent retarder and an orientation (i.e. buffing) film. As shown in FIG. 46, the LCD includes polarizers 1 and 9, optional retarders 3 and 7 discussed above, electrodes 24 and 25 for applying voltage to liquid crystal layer 5, and layers or films 101 and 102 which function as both negatively birefringent retarders and orientation/buffing films. This results in a simplified process relative to the prior art for multi-layer retardation film fabrication, as the negative retarder is both a retarder and an orientation film.

Negative or C-type retarders are known. Negative retardation is where $n_z-n_x$ or $n_y<0$ (see FIG. 48). Negative retardation originating from a C-plate and positive retardation originating from elongated molecules in a twisted nematic (TN) cell can partially cancel each other so that a larger viewing cone may be achieved.

FIG. 47 illustrates a polyimide molecule that can function as a negative or C-plate retarder material. When the molecular rigid parts (phenyl ring, imide, etc.) in such a polyimide lie down in-plane (x-, y-direction) to some degree, a polarized light traveling along z-direction will primarily interact with Π-electrons in the x-y plane (see FIG. 48) resulting in an extraordinary refractive index. Since in this case the polyimide is by no means an any liquid crystalline phase, x-axis and y-axis are optically indistinguishable, i.e. $n_x$ equals or substantially equals within 5–10% $n_y$. On the other hand, a polarized light propagating either along the x-axis or y-axis is unlikely to couple with Π-electrons in the x-y plane, so a resultant refractive index in nevertheless ordinary. Therefore, when the polyimide molecules (usually with a large degree of polymerization) are laying down in plane, a negative birefringence (delta n<0) or C-type retardation is realized. Some types of polyimides can be used as an alignment or buffing/orientation layer after a known buffing process and it is thus possible to combine a C-type retardation film with an orientation layer. Among potential polyimide samples, Licralign AM-4252 from EM Industries may be used and has excellent optical transparency to visible wavelengths. AM-4252 is intended for use in LCDs requiring tilt angles in the 3–5 degree range, superior voltage holding ratio, very low residual DC and low temperature processing, e.g. 180–220 degrees C. This is polyimide material has a 2–3% solid content in a solvent of 80% γ-butyrolacton and 20% butyl-cellosolve, and its typical viscosity at 23 degrees C is between 20–30 cps.

In an example, AM-4252 polyimide material was spin-coated onto a 350×400 glass substrate and cured at 200 degrees C for about 30 minutes. Due to its low viscosity with a low solid content, the coating process was repeated a few times to obtain a desirable thickness. The final thickness was measured to be about 5 um with a Tencor profilometer. The plate was then scribed into 2'×2' pieces ready for optical evaluation. One sample plate, sandwiched between two crossed polarizers, was first placed on a light table. It was visually evaluated. The C-plate layer had an off-angle birefringence appearance estimated around 100 nm retardation factor. The delta n was between about 0.02 and 0.03. The two C-plates were further assembled with a TN light valve according to the disclosure of U.S. Pat. No. 5,657,140 where the configuration had C and A (positive uniaxial) retardation plates on each side of the LC layer. The light valve was separated by 4.75 um spacers, filed with ZLI-4718 LC, and driven at about 5.5 volts. The hemispherical contrast plot measured by Eldim EZContrast indicates the viewing cone shown in FIG. 49. By rotating the film, no major difference in the hemispherical plot was observed, thereby indicating no substantial A- or O-components in the film. The film was thus characterized by substantially C-plate (or negative uniaxial) retardation. The retardation values discussed above in other embodiments of this invention were found to be preferable. These negative polyimide films, as shown in FIG. 46 by layers 101 and 102 may be put on LCD substrate in the position normally occupied by orientation films, and then films 101 and 102 may be buffed just like typical orientation films. The result is a pair of orientation films 101 and 102 that also function as retarders. Still further, by buffing these films' surface, these new types of C-plate retarders can be integrated into A- or O-type retardation films. In other words, A- and/or O-type retardation films may be applied to these negative polyimides so that layers 101 and 102 each include (i) a negatively substantially uniaxial birefringent portion; and then (a) a positively uniaxial birefringent portion (A-plate), and/or (b) an oblique or tilted (and possibly twisted) birefringent portion (e.g. see U.S. Pat. Nos. 5,504,603, 5,583,679, and 5,559,618, the disclosures of which are incorporated herein by reference). Thus each combination orientation layer/retarder may include up to three differently characterized birefringent portions, with the negatively birefringent polyimide portion being buffed to act as the orientation film positioned next to the LC layer.

Once given the above disclosure, many other features, modifications, and improvements will become apparent to the skilled artisan. Such other features, modifications, and improvements are, therefore, considered to be a part of this invention, the scope of which is to be determined by the following claims:

We claim:

1. A normally white liquid crystal display including a plurality of pixels, comprising:

a twisted nematic liquid crystal layer which twists at least one normally incident visible wavelength of light about 80–100 degrees as it passes therethrough;

a first orientation or buffing layer located on a first side of the liquid crystal layer and in contact with said liquid crystal layer;

a second orientation or buffing layer located on a second side of the liquid crystal layer opposite said first side, said second orientation or buffing layer in contact with said liquid crystal layer so that said liquid crystal layer is located between said first and second orientation or buffing layers; and wherein each of said first and second orientation or buffing layers is a polyimide and has a negative birefringence.

2. The display of claim 1, wherein each of said first and second orientation or buffing layers has a retardation value of from about −80 to −200 nm.

3. The display of claim 1, wherein the thickness of each of said first and second orientation or buffing layers has a thickness of from about 2 to 6 $\mu$m.

4. The display of claim 3, wherein each of said first and second orientation or buffing layers has a thickness of from about 3.5 to 5.5 $\mu$m.

5. The display of claim 1, wherein each of said first and second orientation or buffing layers includes a first negatively birefringent portion and one of (i) a positively birefringent portion, and (ii) a tilted oblique axis inclusive birefringent portion.

6. The display of claim 5, wherein each of said first negatively birefringent portion and said one of portion are separate layers that are positioned immediately adjacent one another.

7. The display of claim 1 wherein each of said first and second orientation or buffing layers includes only one surface of which that is buffed so as to be in immediate contact with the adjacent liquid crystal material.

8. The display of claim 7, further comprising first and second positively uniaxial retardation films.

9. The display of claim 7, further including first and second retarders oriented so that the display can achieve a white light contrast ratio of at least about 10:1 over a horizontal angular span of at least about 120 degrees and over a vertical angular span of greater than about 50 degrees.

10. The display of claim 9, wherein said display can achieve a contrast ratio of at least about 30:1 over a horizontal angular span of at least about 80 degrees and over a vertical angular span of at least about 30 degrees.

11. A method of making a liquid crystal display comprising the steps of:

providing first and second substrates;

spin-coating a negatively birefringent polyimide onto each of said substrates and allowing the spin-coated polyimide to cure, and thereafter repeating said spin-coating step on each of the substrates in order to obtain a desired thickness of the polyimide layer on each substrate so that the thickness of the polyimide layer on each substrate is from about 2.0 to 6.0 $\mu$m;

aligning molecules along one surface of each of the polyimide layers so that a surface of each polyimide layer can function as an orientation film;

providing a liquid crystal layer between the first and second substrates, and between the corresponding polyimide layers so that the aligned surface of each polyimide layer contacts the liquid crystal layer; and wherein each of the polyimide layers functions as both an orientation layer for the liquid crystal molecules and as a negatively birefringent retardation film which enhances viewing characteristics of the display.

12. The method of claim 11, wherein each of the polyimide orientation layers has a retardation value of from about −80 to −200 nm.

13. The method of claim 11, wherein the viscosity of each of the polyimide layers is from about 20 to 30 cps.

14. The method of claim 11 wherein the polyimide material in each of the polyimide layers has a 2–3% solid content in a solvent of 80% γ-butyrolacton and 20% Butyl Cellosolve.

15. The method of claim 11, wherein each of the polyimide layers is characterized by $n_x=n_y$ and by $n_z-n_x<0$.

* * * * *